(12) United States Patent
Sychev et al.

(10) Patent No.: US 12,069,250 B2
(45) Date of Patent: Aug. 20, 2024

(54) DISTRIBUTED DECODING REFRESH IN VIDEO CODING

(71) Applicant: Huawei Technologies Co., Ltd., Shenzhen (CN)

(72) Inventors: Maxim Borisovitch Sychev, Moscow (RU); Ye-Kui Wang, San Diego, CA (US); Fnu Hendry, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 230 days.

(21) Appl. No.: 17/472,262

(22) Filed: Sep. 10, 2021

(65) Prior Publication Data
US 2021/0409698 A1  Dec. 30, 2021

Related U.S. Application Data

(63) Continuation of application No. PCT/RU2020/050045, filed on Mar. 11, 2020.

(60) Provisional application No. 62/817,394, filed on Mar. 12, 2019.

(51) Int. Cl.
| | |
|---|---|
| *H04N 19/11* | (2014.01) |
| *H04N 19/172* | (2014.01) |
| *H04N 19/44* | (2014.01) |

(52) U.S. Cl.
CPC .......... *H04N 19/11* (2014.11); *H04N 19/172* (2014.11); *H04N 19/44* (2014.11)

(58) Field of Classification Search
CPC ....... H04N 19/44; H04N 19/177; H04N 19/11
See application file for complete search history.

(56) References Cited

U.S. PATENT DOCUMENTS

| | | |
|---|---|---|
| 2009/0245371 A1 | 10/2009 | Choi et al. |
| 2013/0114670 A1 | 5/2013 | Chen et al. |
| 2013/0114715 A1 | 5/2013 | Srinivasan et al. |
| 2014/0168362 A1 | 6/2014 | Hannuksela et al. |

(Continued)

FOREIGN PATENT DOCUMENTS

| | | |
|---|---|---|
| EP | 3177020 A1 | 6/2017 |

(Continued)

OTHER PUBLICATIONS

"Series H: Audiovisual and Multimedia Systems, Infrastructure of audiovisual services—Coding of moving video, High efficiency video coding," ITU-T H.265(Dec. 2016), total 664 pages, International Telecommunication Union (Dec. 2016).

(Continued)

*Primary Examiner* — On S Mung
(74) *Attorney, Agent, or Firm* — Leydig, Voit & Mayer, Ltd.

(57) ABSTRACT

A method of video encoding a sequence of pictures, the method being implemented in an encoding device and comprising: obtaining an intra prediction picture comprising at least two sub-units; obtaining a first encoded other picture, wherein the intra prediction picture and the first encoded other picture have the same Picture Order Count, POC, value; obtaining encoded other pictures different from the intra prediction picture and the first encoded other picture; and distributing the at least two sub-units of the intra prediction picture over one or more sub-units of the encoded other pictures and/or over one or more sub-units of the first encoded other picture.

20 Claims, 19 Drawing Sheets

(56) References Cited

U.S. PATENT DOCUMENTS

2015/0181233 A1* 6/2015 Ramasubramonian ............
H04N 19/70
375/240.16
2016/0173904 A1 6/2016 Park et al.

OTHER PUBLICATIONS

Wang et al., "AHG14/AHG17: DDR-Distributed decoding refresh," Joint Video Experts Team (JVET) of ITU-T SG 16 WP 3 and ISO/IECJTC 1/SC 29/WG11, 14th Meeting: Geneva, CH, Document: JVET-N0116-v1, (Date Saved: Mar. 13, 2019), total 3 pages (Mar. 19-27, 2019).
Hannuksela et al., "Isolated Regions in Video Coding," IEEE Transactions on Multimedia, vol. 6, No. 2, pp. 259-267, Institute of Electrical and Electronics Engineers, New York, New York (Apr. 2004).
Thiesse et al., "Improved Cyclic Intra Refresh," Joint Video Experts Team (JVET) of ITU-T SG 16 WP 3 and ISO/IEC UTC 1/SC 29/WG 11, 11th Meeting: Ljubljana, SI, Document: JVET-K0212-v2, total 8 pages (Jul. 10-18, 2018).
Thiesse et al., "AHG14: Intra Refresh Test conditions and Anchors generation Proposal," Joint Video Experts Team (JVET) of ITU-T SG 16 WP 3 and ISO/IEC JTC 1/SC 29/WG 11, 12th Meeting: Macao, CN, Document: JVET-L0160, total 4 pages (Oct. 3-12, 2018).
Pettersson et al., "AHG14: Normative Recovery Point Indication," Joint Video Experts Team (JVET) of ITU-T SG 16 WP 3 and ISO/IEC JTC 1/SC 29/WG 11, 14th Meeting: Marrakesh, MA, Document: JVET-M0529-v1, total 8 pages (Jan. 9-18, 2019).
Bross et al., "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Document: JVET-M1001-v6, total 298 pages (Jan. 9-18, 2019).
"Line Transmission of Non-Telephone Signals, Video Codec for Audiovisual Services At p×64 kbits," ITU-T Recommendation H.261 (Mar. 1993), total 29 pages, International Telecommunication Union, Geneva, Switzerland (Mar. 1993).
"Series H: Audiovisual and Multimedia Systems, Infrastructure of audiovisual services—Coding of moving video, Information technology—Generic coding of moving pictures and associated audio information: Video: Frame backing arrangement signalling for 3D content, Amendment 4," ITU-T H.262 (Feb. 2012), total 238 pages, International Telecommunication Union, Geneva, Switzerland (Feb. 2012).
"Series H: Audiovisual and Multimedia Systems, Infrastructure of audiovisual services—Coding of moving video, Video coding for low bit rate communication," ITU-T H.263(Jan. 2005), total 226 pages, International Telecommunication Union, Geneva, Switzerland (Jan. 2005).
"Series H: Audiovisual and Multimedia Systems, Infrastructure of audiovisual services—Coding of moving video, Advanced video coding for generic audiovisual services," ITU-T H.264(Apr. 2017), total 812 pages, International Telecommunication Union, Geneva, Switzerland (Apr. 2017).
"Series H: Audiovisual and Multimedia Systems Infrastructure of audiovisual services—Coding of moving video, High efficiency video coding," ITU-T H.265(Feb. 2018), total 692 pages, International Telecommunication Union, Geneva, Switzerland (Feb. 2018).
Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Document: JCTVC-K1003_v13, Total 316 pages, Geneva, Switzerland (Oct. 10-19, 2012).

* cited by examiner

DISTRIBUTED DECODING REFRESH IN VIDEO CODING

CROSS-REFERENCE TO RELATED APPLICATIONS

This application is a continuation of International Application No. PCT/RU2020/050045, filed on Mar. 11, 2020, which claims priority to U.S. Provisional Patent Application No. 62/817,394 filed on Mar. 12, 2019. The disclosures of the aforementioned applications are hereby incorporated by reference in their entireties.

TECHNICAL FIELD

In general, this disclosure describes methods for supporting distributed decoding refresh in video coding. More specifically, the proposed methods allow intra refresh capability in low delay configurations and to enable random access without having to use intra random access point (IRAP) pictures, by distributing coded video data units of an intra coded picture among coded data units of other pictures, thus achieving a smooth bit rate. The description of the techniques are based on the under-development video coding standard Versatile Video Coding (VVC) by the joint video experts team (JVET) of ITU-T and ISO/IEC. However, the techniques also apply to other video codec specifications.

BACKGROUND

The following abbreviations are used herein:
CTB Coding Tree Block
CTU Coding Tree Unit
CU Coding Unit
CVS Coded Video Sequence
JVET Joint Video Experts Team
MCTS Motion-Constrained Tile Set
MTU Maximum Transfer Unit
NAL Network Abstration Layer
POC Picture Order Count
RBSP Raw Byte Sequence Payload
SPS Sequence Parameter Set
VVC Versatile Video Coding
WD Working Draft
DDR Distributed Decoding Refresh
Video Coding Basics Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Video Coding Standards

Video coding standards include ITU-T H.261, ISO/IEC MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. At the time of writing, the latest Working Draft (WD) of VVC included in JVET-M1001-v5, which is publicly available herein:

http://phenix.it-sudparis.eu/jvet/doc_end user/documents/13_Marrakech/wg11/JVET-M1001-v6.zip.

Intra Random Access Point (IRAP) Pictures and Leading Pictures

In HEVC, the following pictures are considered as intra random access point (IRAP) pictures: IDR, BLA and CRA pictures together are considered as intra random access point (IRAP) pictures. For VVC, during the $12^{th}$ WET meeting in October 2018, it was agreed to have both IDR and CRA pictures as IRAP pictures.

An IRAP picture provides the following two important functionalities/benefits. Firstly, the presence of an IRAP picture indicates that the decoding process can start from that picture. This functionality allows a random access feature in which the decoding process starts at position in a bitstream, not necessarily the beginning of a bitstream, as long as an IRAP picture is present at that position. Secondly, the presence of an IRAP picture refreshes the decoding process such that coded pictures starting at the IRAP picture, excluding RASL pictures, are coded without any reference to previous pictures. Having an IRAP picture present in a bitstream consequently would stop any error that may occur during decoding of the coded pictures prior to the IRAP picture to propagate to the IRAP picture and pictures that follow the IRAP picture in decoding order.

While an IRAP picture provides important functionalities, it comes with a penalty to the compression efficiency. The presence of an IRAP picture would cause a surge in bit-rate. This penalty to the compression efficiency is due to two reasons: firstly, as an IRAP picture is an intra-predicted picture, the picture itself would require relatively more bits to represent it when compared to other pictures that are inter-predicted pictures; secondly, since the presence of an IRAP picture would break temporal prediction (this is because the decoder would refresh the decoding process, in which one of the actions of the decoding process for this is to remove previous reference pictures in the DPB), it would cause the coding of pictures that follow the IRAP picture in the decoding order less efficient (i.e., needs more bits to represent) because they have less reference pictures for their inter-prediction coding.

Among the picture types that are considered IRAP pictures, an IDR picture in HEVC has different signalling and derivation when compared to other picture types. Some of the differences are as follows:

For signalling and derivation of POC value of an IDR picture, the most significant bit (MSB) part of the POC is not derived from a previous key picture but simply set to be equal to 0.

For signalling information needed for reference picture management, a slice header of an IDR picture does not contain information needed to be signalled to assist reference picture management. For other picture types (i.e., CRA, Trailing, TSA, etc), information such as a reference picture set (RPS) described in the section below or other form of similar information (e.g., reference picture lists) is needed for the a reference pictures marking process (i.e., the process to determine the status of reference pictures in the DPB, either used for reference or unused for reference). However, for an IDR picture, such information is not needed to be signalled because the presence of an IDR picture indicates that the decoding process shall simply mark all reference pictures in the DPB as unused for reference.

In addition to the IRAP pictures concept, there are also leading pictures that, if present, are associated with an IRAP picture. Leading pictures are pictures that follow its associated IRAP picture in decoding order but precede the IRAP picture in output order. Depending on the coding configuration and picture referencing structure, leading pictures are further identified into two types. The first type is the leading pictures that may not be decoded correctly if the decoding process starts at its associated IRAP picture. This may happen because these leading pictures are coded with a reference to pictures that precede the IRAP picture in the decoding order. Such leading pictures are called random access skipped leading (RASL) pictures. The second type is the leading pictures that shall be decoded correctly even if decoding process starts at its associated IRAP picture. This is possible because these leading pictures are coded without referencing directly or indirectly to pictures that precede the IRAP picture in the decoding order. Such leading pictures are called random access decodable leading (RADL) pictures. In HEVC, when RASL and RADL pictures are present, it is constrained that for RASL and RADL pictures that are associated with the same IRAP picture, the RASL pictures shall precede the RADL pictures in output order.

In HEVC and VVC, IRAP pictures and leading pictures are given different NAL unit types so that they can be easily identified by system level applications. For example, a video splicer needs to understand coded picture types without having to understand too much detail of syntax element in the coded bitstream, particularly to identify IRAP pictures from non-IRAP pictures and to identify leading pictures, including determining RASL and RADL pictures, from trailing pictures. Trailing pictures are those pictures that are associated with an IRAP picture and follow the IRAP picture in output order. A picture associated with a particular IRAP picture is such a picture that follows the particular IRAP picture in decoding order and precede any other IRAP picture in decodeing order. For this, giving IRAP and leading pictures their own NAL unit type help such applications.

For HEVC, NAL unit types for IRAP pictures include:

BLA with leading picture (BLA_W_LP): NAL unit of a Broken Link Access (BLA) picture that may be followed by one or more leading pictures in decoding order.

BLA with RADL (BLA_W_RADL): NAL unit of a BLA picture that may be followed by one or more RADL pictures but no RASL picture in decoding order.

BLA with no leading picture (BLA_N_LP): NAL unit of a BLA picture that is not followed by leading picture in decoding order.

IDR with RADL (IDR_W_RADL): NAL unit of an IDR picture that may be followed by one or more RADL pictures but no RASL picture in decoding order.

IDR with no leading picture (IDR_N_LP): NAL unit of an IDR picture that is not followed by leading picture in decoding order.

CRA: NAL unit of a Clean Random Access (CRA) picture that may be followed by leading pictures (i.e., either RASL pictures or RADL pictures or both).

RADL: NAL unit of a RADL picture.

RASL: NAL unit of a RASL picture.

For VVC, as per writing of this document, the NAL unit types for IRAP pictures and leading pictures are as follows:

IDR with RADL (IDR_W_RADL): NAL unit of an IDR picture that may be followed by one or more RADL pictures but no RASL picture in decoding order.

IDR with no leading picture (IDR_N_LP): NAL unit of an IDR picture that is not followed by leading picture in decoding order.

CRA: NAL unit of a Clean Random Access (CRA) picture that may be followed by leading pictures (i.e., either RASL pictures or RADL pictures or both).

RADL: NAL unit of a RADL picture.

RASL: NAL unit of a RASL picture.

RADL and RASL pictures allow reducing the bitrate overhead before and after a random access point, but require some look-ahead approach (the delay to refer to future pictures in output order). For a low delay configuration, IRAP pictures lead to high bitrate spikes and huge increasing of delay. To solve this issue the Progressive Intra Refresh/ Gradual Decodeing Refresh approaches were developed.

Progressive Intra Refresh/Gradual Decoding Refresh

For low delay applications, it is desirable to avoid coding a picture as an IRAP picture due to its relatively bigger bit-rate requirement compared to non-IRAP (i.e., P-/B-) pictures which consequently causes more latency/delays. However, totally avoiding the use of IRAP may not be possible in all low delay applications; for example, for conversational applications such as multi-party teleconferencing it is necessary to provide regular points in which new user can join the teleconferencing.

For providing access to a bitstream which allows a new user to join a multi-party teleconferencing application, instead of using IRAP pictures for such need, one possible strategy is to use a progressive intra refresh technique (PIR) to avoid having a peak in bit-rate. PIR may also be referred to as gradual decoding refresh (GDR). For the rest of this document, the term PIR and GDR may be used interchangeably.

FIG. 18 illustrates how GDR works. The GDR technique works over more than one picture starting from the picture where one region of the picture where all coded blocks in the region are coded as intra-predicted blocks, which is considered as refreshed region/clean region, and the blocks in the rest of the picture may be coded as inter-predicted blocks, which is considered un-refreshed region/dirty region. In the next picture, the region coded as intra-predicted blocks only moves in consistent direction (e.g., from left to right) which shrinks the region which may be coded as inter-predicted blocks. The collocated region that in a previous picture was coded with intra-predicted blocks only now can be coded as inter-predicted blocks and together with the region coded only as intra-coded blocks considered as refreshed region. Not that the region that is coded as inter-predicted blocks may only refer to refreshed region in the reference picture.

In HEVC, the GDR technique was supported non-normatively using a recovery point SEI message and a region refresh information SEI message. These two SEI messages do not define how GDR is performed but simply provide a mechanism to indicate the first and the last pictures in the GDR period (i.e., provided by recovery point SEI message) and a region that is refreshed (i.e., provided by region refresh information SEI message).

In practise, the GDR is performed by using two techniques together: they are contraint intra prediction (CIP) and encoder constraints for motion vectors. CIP can be used for GDR purposes, particularly to code the region which is coded only as intra-predicted blocks because it allows the region not using samples from an un-refreshed region for reference. However, the use of CIP causes severe coding performance degradation because the constraint to intra blocks must be applied not only for intra blocks in the refreshed region but also to all intra blocks in the picture. Encoder constraints for motion vectors is done by restricting the encoder from using any samples in the reference pictures that are located outside a refreshed region. Such constraint causes non-optimal motion search. FIG. 19 illustrates the reason for non-optimality in motion search when using encoder restriction for supporting GDR. During a motion search process, the encoder is constrained to not select any motion vector which resulted in some of samples of the reference block located outside the refreshed region, even if that reference block is the best reference block in rate-distortion cost criteria.

JVET contributions JVET-K0212 and JVET-L0160 describe implementations of GDR based on the use of the CIP and encoder constraints approach. The implementation can be summarized as follows:
  AU/Picture level modifications:
    Recovery Point Indication SEI
  Tile/CTU/sub-picture level modifications:
    Intra prediction mode forced on coding unit on column basis.
    Constrained Intra Prediction enabled to ensure reconstruction of Intra CU.
    Motion vectors constrained to point within the refreshed area while taking into account an additional margin to avoid filters error spreading (6 pixels for instance).
    Removing of former reference pictures when re-looping the Intra column.

VET contribution JVET-M0529 proposed a method for indicating a picture that is the first and the last in GDR period normatively. The proposed idea works as follows:
  AU/Picture level modifications:
    Define a new NAL unit with NAL unit type Recovery Point Indication as a non-VCL NAL unit. The payload of the NAL unit contains syntax element to specify information which can be used to derive the POC value of the last picture in the GDR period.
    The access unit that contains the non-VCL NAL unit with type Recovery Point Indication is called as Recovery Point Begin (RBP) access unit and the picture in the RBP access unit is called RBP picture. Decoding process can start from RBP AU.
    When decoding starts from RBP AU, all pictures in the GDR period, except the last picture, are not outputted.
  Tile/CTU/sub-picture level modifications:
    Encoder side GDR implementation.

Problems of the Existing Designs

Intra random access point (IRAP) pictures, which are intra-coded pictures, like Instantaneous Decoding Refresh (IDR) pictures, provide an ability to access a starting point in the stream and decode it. Intra-coded pictures have a much higher bit-rate than inter-coded pictures. During transmission in limited bandwidth large intra coded portion of the bitstream leads to higher end-to-end delay. In order to reduce this delay the encoder can try to keep all the pictures at similar size in bits: the first Intra picture is coded at a low quality and then the quality is gradually improved when encoding the following inter coded pictures. This approach drastically reduces quality of service (QoS) because of low quality of the first picture and bad temporal perceptual quality, particularly for applications that requires both low end-to-end delay and frequent random access points.

As discussed above, gradual decoding refresh (GDR) refers to the ability to start the decoding at a non-IRAP picture and recover decoded pictures that are correct in content after decoding a certain amount of pictures. The goal of such techniques like GDR or Periodic/Partial Intra Refresh (PIR) is to reduce the bit rate fluctuation while keeping both a good quality and the random access property of the bitstream. It is usually done by distribution of intra-coded regions in each picture during some consecutive set of inter-coded pictures set. It allows to reduce the end-to-end delay, but the random access delay increase due to the necessity of decoding several pictures before obtaining the clean picture for output and the overall coding efficiency of the bitstream becomes lower compared to using only IRAP pictures for random access. While GDR can achieve lower end-to-end delay than using of IRAP pictures, it has coding efficiency penalties. For example, a coding efficiency loss of about 21% was reported in JVET-M0529 for GDR coding compared to using IRAP pictures for similar random accessing capability.

Besides a coding efficiency penalty, the existing designs/approaches for supporting GDR have at least the following problems:
  Requires lower layer modifications i.e.
    Tile Group/CTU restrictions like CIP/CMVP (constrained motion vector prediction).
    Different QP for different regions in GDR pictures to smooth the quality between Intra coded region and Inter coded region.
    Smart rate-control to further reduce bit-rate variations.
  Doesn't allow to support unequal error protection by system layer
    Higher protection of NAL units with TID equal to 0 (all pictures in GDR period should have TemporalID equal to 0).
  There are no suitable support of temporal scalability.
  High initial joining (random access) delay
    Picture refreshed partially and there are no ability to output recovered picture till the end of GDR period.

The method for normatively defining GDR in JVET-M0529 has the following problems:
  The proposed method does not describe how GDR is performed, instead, it only provide some signalling for indicating the first and the last pictures in the GDR period.
  For indicating the first the last pictures in the GDR period, a new non-VCL NAL unit is needed. This is a redundancy as the information contained in the RPI NAL unit can simply be included in the tile group header of the first picture in the GDR period.
  The proposed method is not able to describe which region in the pictures in the GDR period are refreshed region and un-refreshed region.
The GDR approaches described in JVET-K0212 and JVET-L0160 have the following problems:
  The use of CIP. Although it is necessary to code refreshed region that is coded with intra-prediction with some constraints to prevent any samples from unrefreshed region to be used for spatial reference, when CIP is used, it is picture based, meaning that all intra blocks in the picture must also be coded as CIP intra blocks. This consequently causes performance degradation.
  The use of encoder constraint to limit motion search prevent encoder to choose the best motion vector if samples of the reference block associated with the motion vector are not completely within the refreshed region in the reference picture.
  The refreshed region that is coded only with intra-prediction is not CTU size, instead it can go smaller than CTU size, down to minimum CU size. This makes the implementation unnecessary complicated as it may need indication at block level.

SUMMARY

The methods described herein enable an efficient coding of a sequence of pictures, e.g. by providing methods of video encoding a sequence of pictures and methods of video decoding a sequence of pictures. The methods can be implemented in an encoding device or decoding device, respectively.

According to an embodiment a method is provided for video encoding a sequence of pictures, the method being, for example, implemented in an encoding device. The method comprises obtaining an intra prediction picture comprising at least two sub-units, obtaining a first encoded other picture (for example, an inter prediction picture), wherein the intra prediction picture and the first encoded other picture have the same Picture Order Count, POC, value and obtaining encoded other pictures different from the intra prediction picture and the first encoded other picture. In addition, the method comprises distributing the at least two sub-units of the intra prediction picture over one or more sub-units of the encoded other pictures and/or over one or more sub-units of the first encoded other picture.

A complimentary method is provided for video decoding a sequence of encoded pictures, the method being, for example, implemented in a decoding device. The method comprises decoding an intra prediction picture comprising at least two sub-units and decoding a first encoded other picture (for example, an inter prediction picture or intra encoded picture due to scene change detection or even instantaneous decoding refresh IDR as the first picture of CVS). The intra prediction picture and the first encoded other picture have the same Picture Order Count, POC, value, wherein the at least two sub-units of the intra prediction picture are distributed over one or more sub-units of encoded other pictures comprised in the sequence of encoded pictures and different from the intra prediction picture and the first encoded other picture and/or the at least two sub-units of the intra prediction picture are distributed over one or more sub-units of the first encoded other picture.

In these methods the sub-units represent portions of encoded pictures. The encoded other pictures may comprise or consist of one or more sub-units and may be inter prediction pictures, for example. In particular, the sub-units of the intra prediction picture that are distributed over the other encoded pictures may be Network Abstraction Layer, NAL, units, for example, Video Coding Layer, VCL, NAL units. The intra prediction picture and the first encoded other picture may be associated with each other and may represent the same picture. The at least two sub-units of the intra prediction picture may represent exactly one single picture and each of the at least two sub-units of the intra prediction picture may represent a portion of a single encoded picture.

For example, the intra-prediction picture and the first encoded other picture may represent the same source picture, which may also be referred to as original picture (i.e. the version of the picture before encoding), and the information that both (the intra-prediction picture and the first encoded other picture) represent the same source picture may be indicated (e.g. signaled) by the POC value or by other means, e.g. other indices or parameters (implicitly or explicitly signaled in the bitstream representing the encoded video). The intra-prediction picture may be or may also be referred to as intra-prediction encoded picture or intra-predicted picture, i.e. a picture that is obtained or encoded by using only intra-prediction encoding and no inter-prediction encoding. The first encoded other picture may also be referred to as other encoded picture representing the same source picture as the intra-prediction encoded picture (but encoded differently/otherwise) or other encoded version of the source picture represented by the intra-prediction encoded picture.

The term "output" refers for example to output for displaying, i.e. the decoded intra-predicted picture is not output to a or for display.

The first encoded other picture allows for random access and refresh. The intra prediction picture may not be provided for output whereas the first encoded other picture may be output. The decoded intra prediction picture may serve as a reference picture for inter prediction decoding. Contrary to the solutions of the art, the provided methods of coding and decoding, respectively, allow for easy implementation, low initial joining delay and low end to end delay.

As compared to the IRAP approach the bit-rate of the bitstream can be reduced, since no intra prediction pictures but first encoded other pictures can be used for the random access and refresh. Due to the lower bitrate of the first encoded other pictures the end to end delay can be reduced. As compared to the GDR approach the initial joining (random access) delay is reduced, since the output of pictures does not have to be postponed until the end of a GDR processing period. Further, the provided methods can be implemented at the high-level syntax which allows an easier implementation as compared to the GDR approach. Since no low-level modifications are needed no problems with loop filtering across block boundaries, with Constrained Intra Prediction (CIP) processing, constrained Motion Compensation/Prediction or the treatment of tiles/slices boundaries or sub-pictures boundaries as picture boundaries occur all of which are challenging in the context of GDR. More particularly, as compared to the GDR approach bit-rate variations could be smoothed by the distribution of extra DIDR sub-units (for example, NAL units) without any low level rate-control (like variable local QP and often temporal delta QP variations) needed.

The above-defined method of decoding may further comprise the steps of:
- receiving the last one of the at least two sub-units of the intra prediction picture by a decoding device;
- not using any of reference pictures stored in a Decoded Picture Buffer, DPB as reference pictures;
- setting the Most Significant Bit, MSB, of the Picture Order Count, POC, POC, of the intra prediction picture to zero;
- not outputting the intra prediction picture; and
- decoding the intra prediction picture only after all of the at least two sub-units of the intra prediction picture are obtained by the decoder.

The decoding efficiency may be further improved by implementations of this embodiment. The same holds for an embodiment according to which the method of decoding further comprises decoding an access unit comprising the last one of the at least two sub-units of the intra prediction picture before decoding the entire intra prediction picture.

The first encoded other picture may be advantageously used for splicing. Thus, the method of decoding may further comprise splicing a bitstream starting with the first encoded other picture to the end of another bitstream.

The above-defined method of encoding allows for easily performing a sub-bit stream extraction process in order to further reduce the bitrate. Thus, the method of encoding may comprise performing a sub-bit stream extraction process comprising determining whether an access unit comprising at least one of the at least two sub-units of the intra prediction picture has an ID, temporalID, larger than a threshold defining a target set of access units, highest temporalID, and, if it is determined that the access unit has an ID larger than the threshold, redistributing the at least one of the at least two sub-units over access units with an ID less than or equal to the threshold.

As already said, the provided methods allow for high syntax level modifications of the know standard only. In this context, the method of encoding may comprise signaling a flag in a sequence level parameter set indicating whether or not the intra prediction picture and/or first encoded other picture is to be coded. A further signaling refers to
- signaling a flag indicating that an Instantaneous Decoding Refresh picture without leading pictures, IDR_No_LP picture, is the intra prediction picture. This, flag may be signaled in the Tile Group header of the IDR_No_LP picture.

A variety of measures to be taken in order to incorporate the provided methods smoothly into the existing standard may be envisaged. For example, the first encoded other picture or the intra prediction picture may be the first picture in a bitstream comprising the encoded sequence of pictures or the first picture of a Coded Video Sequence, CVS, comprising the sequence of encoded pictures in decoding order. For example, an access unit comprising the first encoded other picture may be the first access unit of the CVS when one of the following holds:
a) an access unit comprising the first encoded other picture is the first access unit in the bitstream;
b) an access unit comprising the first encoded other picture immediately follows an end-of-sequence, EOS, access unit;
c) an access unit comprising the first encoded other picture follows an end-of-bitstream, EOB, access unit;
d) a particular decoder flag for the first encoded other picture is set equal to 1 or TRUE.

The first encoded other picture or the intra prediction picture may have no associated leading pictures.

No pictures may be coded that precede the first encoded other picture in output order and that comprise sub-units that succeed the at least two sub-units of the intra prediction picture in decoding order. An access unit comprising the first encoded other picture may immediately follow an access unit that contains an end of sequence NAL unit or an end of bitstream NAL unit.

According to another example, the following may apply when the access unit comprising the first encoded other picture is the first access unit of the CVS:
a) all reference pictures stored in a Decoded Picture Buffer, DPB, excluding the intra prediction picture associated with the first encoded other picture, are not usable as reference pictures after decoding intra prediction picture;
b) a decoding process generating new reference pictures is invoked;
c) the Most Significant Bit, MSB, of the Picture Order Count, POC, of the first encoded other picture is set equal to zero,
whereby the efficiency of both the encoding and decoding may be enhanced.

In the context of the provided method of decoding the following may apply when the access unit comprising the first encoded other picture is the first access unit of the CVS:
a) all reference pictures stored in a Decoded Picture Buffer, DPB, excluding the intra prediction picture associated with the first encoded other picture, are not usable as reference pictures after decoding intra prediction picture;
b) a decoding process generating new reference pictures is invoked;
c) the Most Significant Bit, MSB, of the Picture Order Count, POC, of the first encoded other picture is set equal to zero; and
d) all pictures starting from the first encoded other picture up to and excluding a picture that is included entirely in an access unit containing the last of the at least two sub-units of the associated intra prediction picture are not output,
whereby the efficiency of both the encoding and decoding may be enhanced.

A variety of measures may be taken in order to efficiently distribute the intra prediction picture over the encoded other pictures with respect to reducing bit-rate variations, for example. The at least two sub-units of the intra prediction picture may be distributed over a set of access units starting from an access unit containing the associated first encoded other picture. Particularly, the at least two sub-units of the intra prediction picture may be distributed over the set of access units up to but not including any subsequent access unit that is an access unit comprising another first encoded other picture or an access unit comprising an Intra Random Access Point, IRAP, picture.

According to another embodiment, an access unit containing the first one of the at least two sub-units of the intra prediction picture succeeds an access unit containing the first encoded other picture associated with the intra prediction picture. An access unit containing the last one of the at least two sub-units of the intra prediction picture may precede either the first access unit comprising another first encoded other picture or the first access unit comprising an Intra Random Access Point, IRAP, picture that succeeds the access unit containing the first encoded other picture associated with the intra prediction picture.

In principle, the herein provided methods can be combined with existing approaches. For example, the intra prediction picture may be Intra Random Access Point, IRAP, picture, in particular, an Instantaneous Decoding Refresh picture without leading pictures, IDR_No_LP, picture.

In order to address the above-mentioned problems of the art, furthermore, the following methods of encoding or decoding, respectively, are provided that show the same or similar advantages as the methods described above.

It is provided a method of video encoding a sequence of pictures, the method being implemented in an encoding device and comprising:
  obtaining an intra prediction picture comprising at least two sub-units;
  obtaining an encoded associated picture that is associated with the intra prediction picture; and
  distributing the at least two sub-units of the intra prediction picture over a set of access units starting with an access unit comprising the encoded associated picture.

As a complimentary method, it is provided a method of video decoding a sequence of encoded pictures, the method being implemented in a decoding device and comprising:
decoding an intra prediction picture comprising at least two sub-units;
  decoding an encoded associated picture that is associated with the intra prediction picture; and wherein
  the at least two sub-units of the intra prediction picture are distributed over a set of access units starting with an access unit comprising the encoded associated picture.

In these methods the sub-units represent portions of pictures. In particular, the sub-units of the intra prediction picture that are distributed over the set of access units starting with an access unit comprising the encoded associated picture may be Network Abstraction Layer, NAL, units, for example, Video Coding Layer, VCL, NAL units. The intra prediction picture and the encoded associated picture may represent the same picture. The intra prediction picture and the encoded associated picture may be associated with each other in decoding order and they may be temporally collocated. The at least two sub-units of the intra prediction picture may represent exactly one single picture and each of the at least two sub-units of the intra prediction picture may represent a portion of a single picture. By these methods redundant pictures can easily be introduced on a high-syntax level.

A decoded version of the intra prediction picture can serve as a reference picture for inter prediction encoding.

Splicing a bitstream starting with the intra prediction picture to the end of another bitstream is possible and may be comprised in the method of decoding according to an embodiment.

The decoding process may be accelerated by decoding an access unit comprising the last one of the at least two sub-units of the intra prediction picture before decoding the entire intra prediction picture.

Output of the intra prediction picture may be suppressed in order to accelerate the output of decoded pictures of a bitstream. Thus, the method of decoding may further comprise determining a difference between the Picture Order Count, POC, value of the intra prediction picture and the POC value of the first encoded other picture of a number of inter prediction pictures for which the decoded intra prediction picture is used as a reference picture;
  wherein the intra prediction picture is not output after decoding of the intra prediction picture when the determined difference exceeds an average difference between the POC values of the number of inter prediction pictures.

An efficient manner of distributing the sub-units of the intra prediction picture may result in the at least two sub-units of the intra prediction picture being distributed over the set of access units up to but not including any subsequent access unit that is an access unit comprising another encoded associated picture that is associated with another intra prediction picture or an access unit comprising an Intra Random Access Point, IRAP, picture, for example.

According to an embodiment, the intra prediction picture is the first picture in a bitstream comprising the sequence of encoded pictures or the first picture of a Coded Video Sequence, CVS, comprising the sequence of encoded pictures in decoding order. Further, the method of encoding and the method of decoding may be implemented such that the intra prediction picture has no associated leading pictures. Further, an access unit containing the last one of the at least two sub-units of the intra prediction picture may precede either the first access unit comprising another intra prediction picture or the first access unit comprising an Intra Random Access Point, IRAP, picture that succeeds the access unit containing the intra prediction picture.

The efficiency of the coding process may be enhanced by not transmitting pictures that precede the last one of the at least two sub-units of the intra prediction picture in output order and that comprise sub-units that succeed the last of the at least two sub-units of the intra prediction picture in decoding order.

In addition, herein it is provided a video coding system comprising a processing circuitry configured for carrying out the method according to any of the above-described embodiments of the methods of encoding and decoding.

An encoder is provided comprising processing circuitry for carrying out the method of encoding according to any of the above-described embodiments and a decoder is provided comprising processing circuitry for carrying out the method of decoding according to any of the above-described embodiments. Further, an encoder is provided that comprises one or more processors and a non-transitory computer-readable storage medium coupled to the processors and storing programming for execution by the processors, wherein the programming, when executed by the processors, configures the decoder to carry out the method of encoding according to any of the above-described embodiments. Further, a decoder is provided that comprises one or more processors and
  a non-transitory computer-readable storage medium coupled to the processors and storing programming for execution by the processors, wherein the programming, when executed by the processors, configures the decoder to carry out the method of decoding according to any of the above-described embodiments.

Additionally, it is provided a computer program product comprising a program code for performing the method
  according to any one of above-described embodiments of the method of encoding and the method of decoding, respectively.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
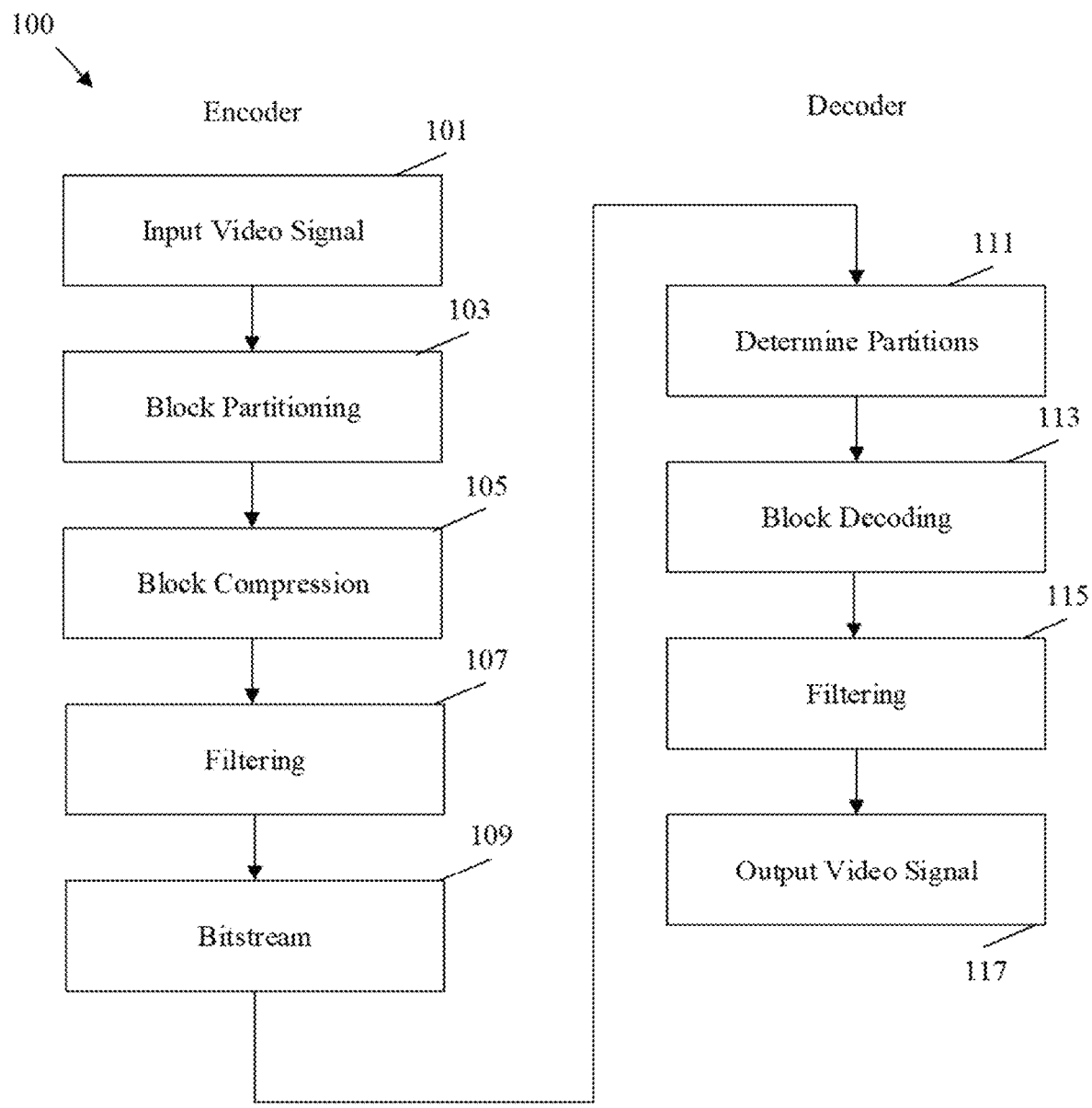
FIG. 1A is a flowchart of an example method of coding a video signal.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be referred to as coding tree units in High Efficiency Video Coding (HEVC) (also known as H.265 and MPEG-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in subsequent frames. Specifically, an object, such as a table, may remain in a constant position over multiple frames. Hence the table need only be described once and subsequent frames can refer back to the reference frame. Pattern matching mechanisms may be employed to match objects over multiple frames. Further, moving objects may be represented across multiple frames, for example due to object movement or camera movement. As a particular example, video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as a neighbor block in a corresponding direction. Planar mode indicates that a series of blocks along a row (e.g., a plane) can be interpolated based on neighbor blocks at the edges of the row. Planar mode, in effect, indicates a smooth transition of light/color across a row by employing a relatively constant slope in changing values. DC mode is employed for boundary smoothing and indicates that a block is similar/the same as an average value associated with all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, deblocking filters, adaptive loop filters, and SAO filters to the blocks/frames. These filters mitigate such blocking artefacts so that the encoded file can be accurately reconstructed. Further, these filters mitigate artefacts in the reconstructed reference blocks so that artefacts are less likely to create additional artefacts in subsequent blocks that are encoded based on the reconstructed reference blocks. The in-loop filtering process is discussed in greater detail below.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as variable (e.g., a bit value that may vary depending on context). Entropy coding allows the encoder to discard any options that are clearly not viable for a particular case, leaving only a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are only as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artefacts. Once the frames are filtered, the video signal can be output to a display at step 117 for viewing by an end user.

Figure 1B:
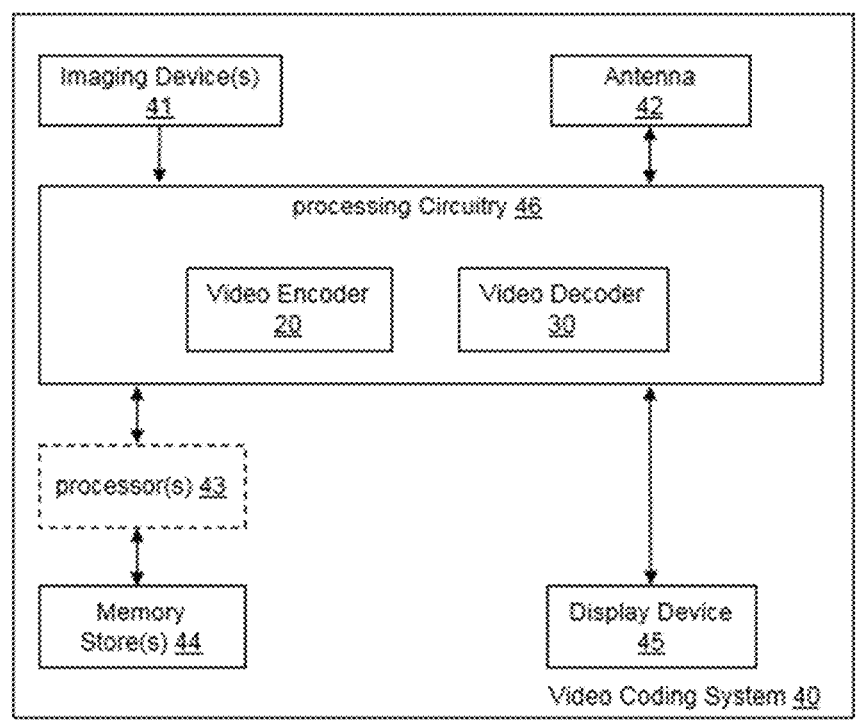
FIG. 1B is a block diagram illustrating an example of a video coding system configured to implement embodiments of the present disclosure.

FIG. 1B is a block diagram illustrating an example of a video coding system configured to implement embodiments of the present disclosure.

Figure 2:
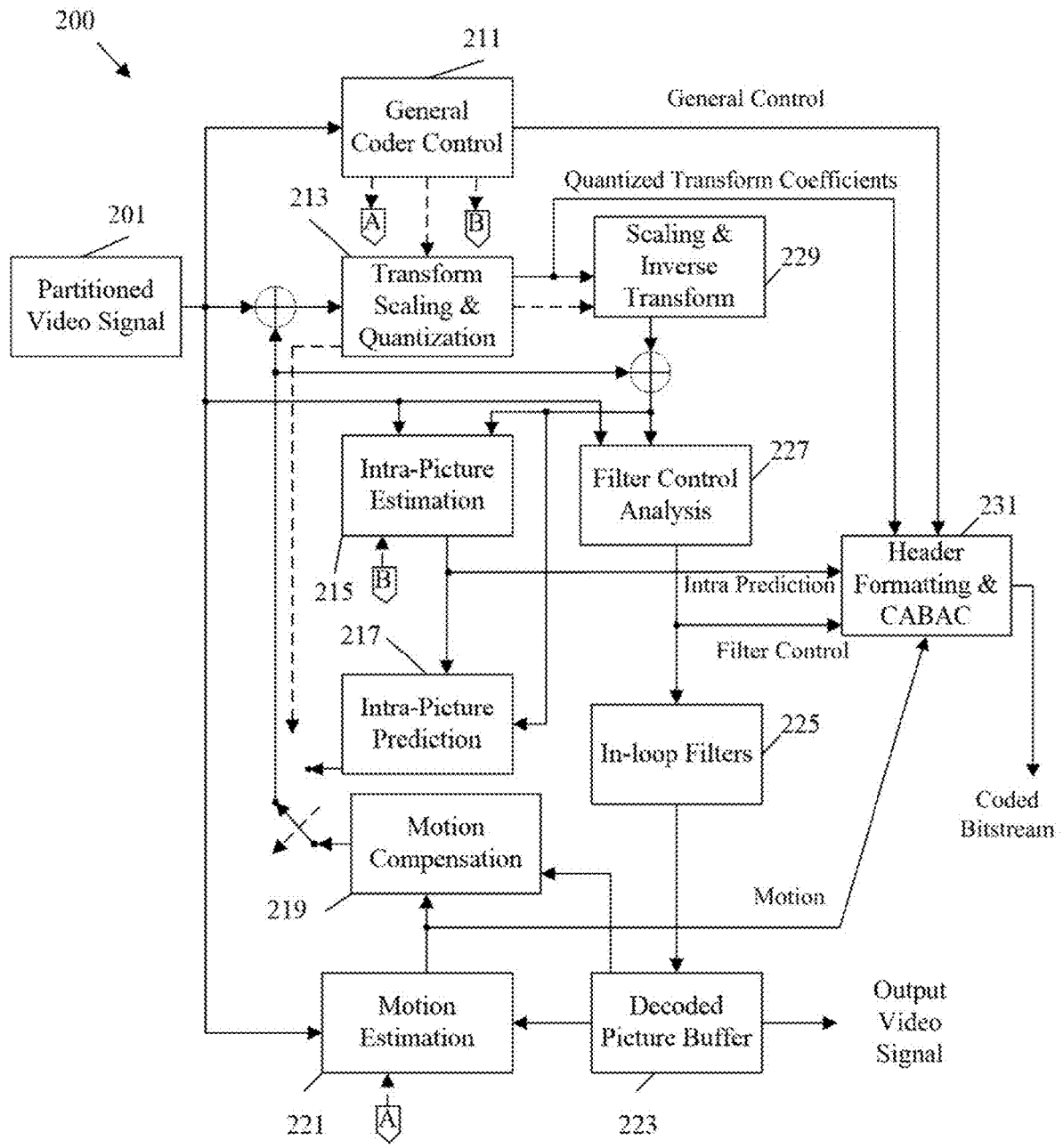
FIG. 2 is a schematic diagram of an example encoding and decoding (codec) system for video coding.

As shown in FIG. 1B, video coding system 40 comprises a processing circuitry 46, imaging device(s) 41, antenna 42, processors(s) 43, memory store(s) 44, and display device 45. In one embodiment, processing circuitry 46 comprises video encoder 20 and video decoder 30. Each of video encoder 20 and video decoder 30 may be implemented, via processing circuitry 46, by one or more microprocessors, digital signal processors (DSPs), application-specific integrated circuits (ASICs), field-programmable gate arrays (FPGAs), discrete logic, hardware, video coding dedicated circuitry or any combinations thereof. Encoder 20 may be implemented via processing circuitry 46 to embody the various components or modules as discussed with respect to coding and decoding system 200 in FIG. 2, encoder 300 in FIG. 3, or any other encoder system or subsystem described herein. Decoder 30 may be implemented via processing circuitry 46 to embody the various components or modules as discussed with respect to coding and decoding system 200 in FIG. 2, decoder 400 of FIG. 4, or any other decoder system or subsystem described herein. Processing circuitry 46 may be configured to perform various operations as discussed later. If the coding techniques are implemented partially in software, a device may store instructions for the software in a suitable, non-transitory computer-readable storage medium and may execute the instructions in hardware using one or more processors to perform the techniques of this disclosure. Video encoder 20 and video decoder 30 may be integrated as part of a combined coding and decoding (CODEC) system 200 in a single device, for example, as shown in FIG. 2.

It should be understood that, in encoder 20 and decoder 30, a processing result of a current coding step may be further processed and then output to the next coding step. For example, after the interpolation filtering, motion vector derivation, or loop filtering, a further operation, such as Clip or shift, may be performed on the processing result of the interpolation filtering, motion vector derivation, or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(bitDepth-1) \sim 2^{\wedge}(bitDepth-1)-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = (mvx + 2^{bitDepth}) \% 2^{bitDepth} \qquad (1)$$

$$mvx = (ux >= 2^{bitDepth-1}) ? (ux - 2^{bitDepth}) : ux \qquad (2)$$

$$uy = (mvy + 2^{bitDepth}) \% 2^{bitDepth} \qquad (3)$$

$$mvy = (uy >= 2^{bitDepth-1}) ? (uy - 2^{bitDepth}) : uy \qquad (4)$$

where mvx is a horizontal component of a motion vector of an image block or a sub-block, mvy is a vertical component of a motion vector of an image block or a sub-block, and ux and uy indicates an intermediate value;

For example, if the value of mvx is $-32769$, after applying formula (1) and (2), the resulting value is 32767. In computer system, decimal numbers are stored as two's complement. The two's complement of $-32769$ is 1,0111,1111,1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth}) \% 2^{bitDepth} \qquad (5)$$

$$mvx = (ux >= 2^{bitDepth-1}) ? (ux - 2^{bitDepth}) : ux \qquad (6)$$

$$uy = (mvpy + mvdy + 2^{bitDepth}) \% 2^{bitDepth} \qquad (7)$$

$$mvy = (uy >= 2^{bitDepth-1}) ? (uy - 2^{bitDepth}) : uy \qquad (8)$$

The operations may be applied during the sum of mvp and mvd, as shown in formula (5) to (8).

Method 2: remove the overflow MSB by clipping the value $$vx = Clip3(-2^{bitDepth-1}, 2^{bitDepth-1}-1, vx)$$

$$vy = Clip3(-2^{bitDepth-1}, 2^{bitDepth-1}-1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$Clip\,3(x, y, z) = \begin{cases} x; & z < x \\ y; & z > y \\ z; & \text{otherwise} \end{cases}$$

FIG. 2 is a schematic diagram of an example coding and decoding (codec) system 200 for video coding. Specifically, codec system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filter component 225, a decoded picture buffer component 223, and a header formatting and Context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filter component 225, and the decoded picture buffer component 223. The components of codec system 200 may be hardware devices, modules, or units. These components are now described.

The partitioned video signal 201 is a captured video stream that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times anode is subdivided is referred to as the depth of the node/coding tree. The divided blocks are referred to as coding units (CUs) in some cases. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manages these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a prediction unit (PU) of a video block relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, codec system 200 may calculate values for sub-integer pixel positions of reference pictures stored in decoded picture buffer 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points a reference picture list. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artefacts created during scaling, quantization, and transform. Such artefacts could otherwise cause inaccurate prediction (and create additional artefacts) when subsequent blocks are predicted.

The filter control analysis component 227 and the in-loop filters component 225 apply the filters to the residual blocks and/or to reconstructed image blocks. For example, the transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer 223 for later use in motion estimation as discussed above. When operating as a decoder, the decoded picture buffer 223 stores and forwards the reconstructed and filtered blocks toward a display as part of an output video signal. The decoded picture buffer 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of a most probable intra-prediction modes, an indication of partition information, etc. Such data may be encoded be employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
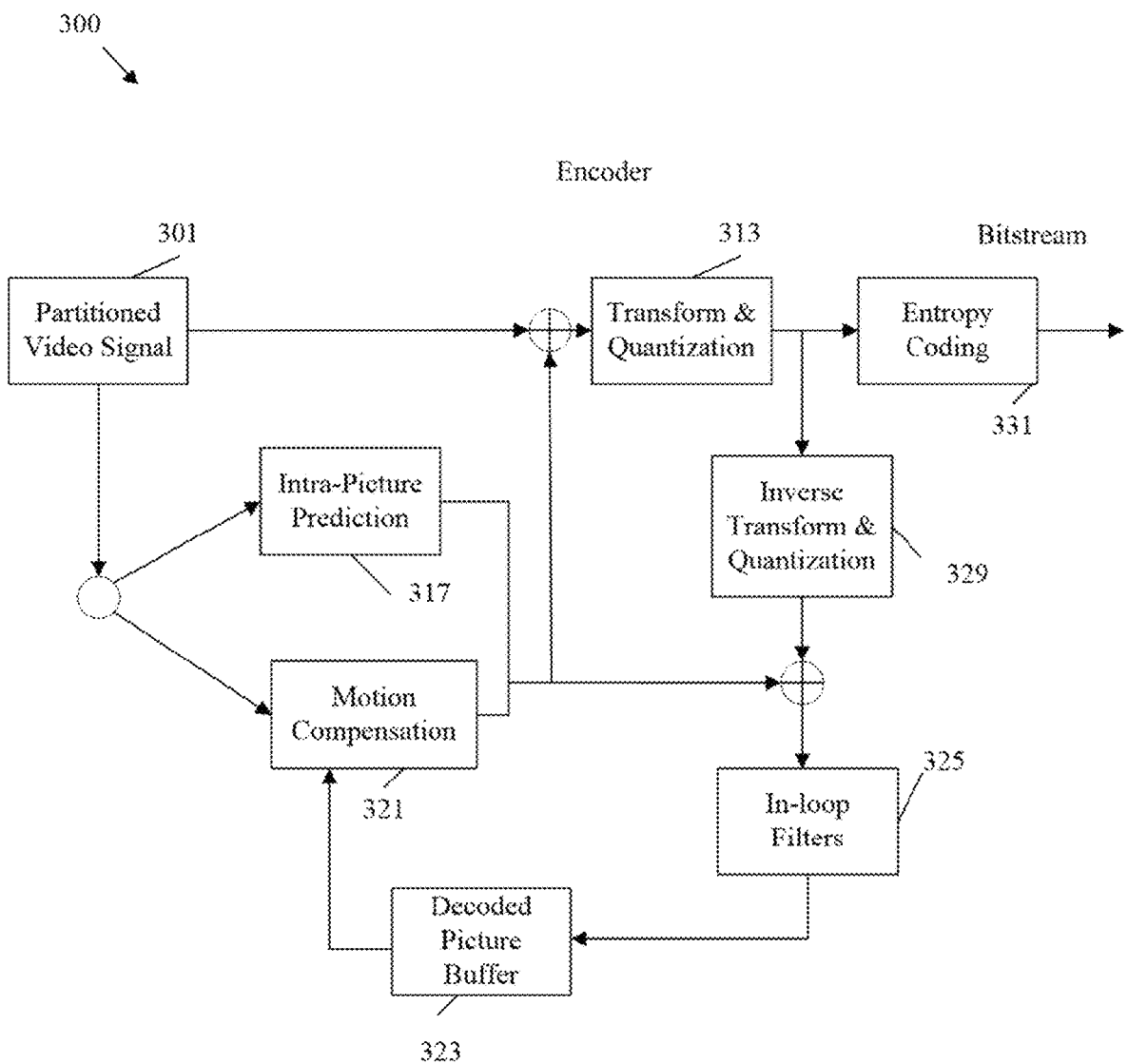
FIG. 3 is a block diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters, including a noise suppression filter as discussed below. The filtered blocks are then stored in a decoded picture buffer 323 for use a reference blocks by the motion compensation component 321. The decoded picture buffer 323 may be substantially similar to the decoded picture buffer 223. The components of encoder 300 may be hardware devices, modules, or units.

Figure 4:
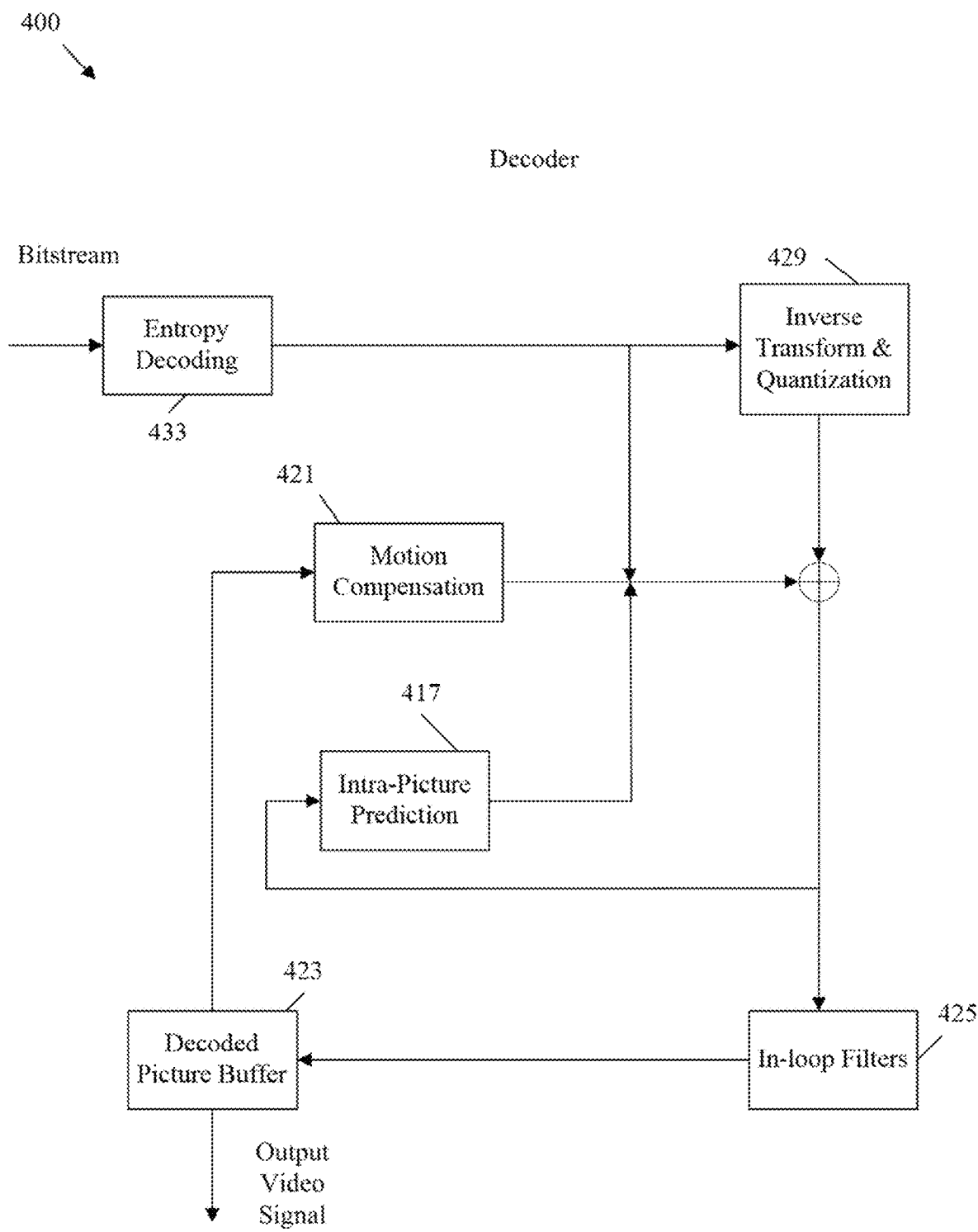
FIG. 4 is a block diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of method 100. Decoder 400 receives a bitstream, for example from an encoder 300, and generates a reconstructed output video signal based on the bitstream for display to an end user.

The bitstream is received by an entropy decoding component 433. The entropy decoding component 433 performs the reverse function of the entropy encoding component 331. The entropy decoding component 433 is configured to implement an entropy decoding scheme, such as CAVLC, CABAC, SBAC, PIPE coding or other entropy coding technique. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be substantially similar to the inverse transform and quantization component 329.

The reconstructed residual blocks and/or prediction blocks are forwarded to intra-picture prediction component 417 for reconstruction into image blocks based on intra-prediction operations. Intra-picture prediction component 417 may be substantially similar to intra-picture prediction component 317, but operate in reverse. Specifically, the intra-picture prediction component 417 employs prediction modes to locate a reference block in a frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 323 and in-loop filters component 325, respectively.

The in-loop filters component 425 filter the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion compensation component 321, but may operate in reverse. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal. The components of decoder 400 may be hardware devices, modules, or units.

Inter-Prediction

Many schemes are employed in tandem to compress video data during the video coding process. For example, a video sequence is divided into image frames. The image frames are then partitioned into image blocks. The image blocks may then be compressed by inter-prediction (correlation between blocks in different frames) or intra-prediction (correlation between blocks in the same frame).

Inter-prediction is employed when a coding object, such as a coding tree unit (CTU), a coding tree block (CTB), a coding unit (CU), a sub-CU, etc., appears in multiple frames of a video sequence. Rather than coding the same object in each frame, the object is coded in a reference frame and a motion vector (MV) is employed to indicate a motion trajectory of an object. The motion trajectory of an object is the object's movement over time. An MV is a vector that indicates a direction and magnitude of an objects change in position between frames. The object and the MV can be coded in a bitstream and decoded by a decoder. In an effort to further increase coding efficiency and reduce the size of the encoding, the MV may be omitted from the bitstream and derived at the decoder. For example, a pair of reference frames may be employed. A reference frame is a frame in a bitstream that incudes data that can be coded by reference when coding related frames. Matching algorithms, such as bi-lateral matching and/or template matching may be employed to determine the position of the coding object in both reference frames. A bi-lateral matching algorithm matches a block in a previous frame to a block in a current frame. A template matching algorithm matches adjacent blocks to a current block with adjacent blocks to the current block in one or more reference frames. Once the position of the object is determined in both reference frames, an MV can be determined that represents the motion of the object between the reference frames. The MV can then be employed to position the object in the frames between the reference frames. As a specific example, an initial MV can be determined for an entire CU. A local search can then be employed to refine the initial MV. Further, MVs for sub-CU components of the object can be determined and refined based on the refined initial MV. Such an approach indicates the correct position of the object so long as the motion trajectory of the object is continuous between the reference frames.

Figure 5:
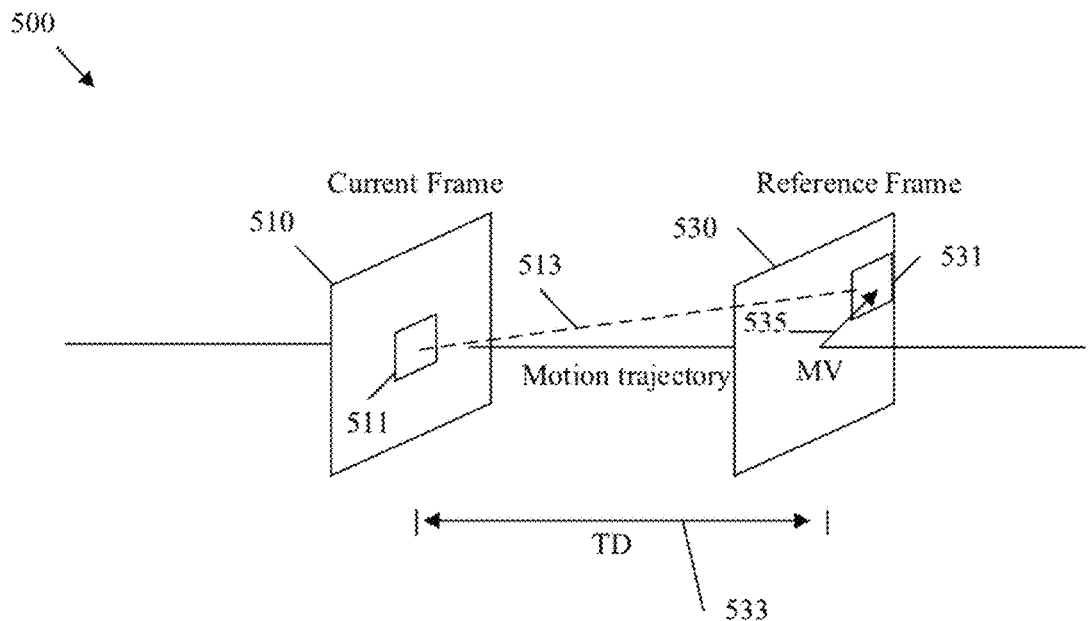
FIG. 5 is a schematic diagram illustrating an example of unidirectional inter-prediction.

FIG. 5 is a schematic diagram illustrating an example of unidirectional inter-prediction 500, for example as performed to determine motion vectors (MVs) at block compression step 105, block decoding step 113, motion estimation component 221, motion compensation component 219, motion compensation component 321, and/or motion compensation component 421.

Unidirectional inter-prediction 500 employs a reference frame 530 with a reference block 531 to predict a current block 511 in a current frame 510. The reference frame 530 may be temporally positioned after the current frame 510 as shown, but may also be temporally positioned before the current frame 510 in some examples. The current frame 510 is an example frame/picture being encoded/decoded at a particular time. The current frame 510 contains an object in the current block 511 that matches an object in the reference block 531 of the reference frame 530. The reference frame 530 is a frame that is employed as a reference for encoding a current frame 510, and a reference block 531 is a block in the reference frame 530 that contains an object also contained in the current block 511 of the current frame 510.

The current block 511 is any coding unit that is being encoded/decoded at a specified point in the coding process. The current block 511 may be an entire partitioned block, or may be a sub-block in the affine inter-prediction case. The current frame 510 is separated from the reference frame 530 by some temporal distance (TD) 533. The TD 533 indicates an amount of time between the current frame 510 and the reference frame 530 in a video sequence. Over the time period represented by the TD 533, the object in the current block 511 moves from a position in the current frame 510 to another position in the reference frame 530 (e.g., the position of the reference block 531). For example, the object may move along a motion trajectory 513, which is a direction of movement of an object over time. A motion vector 535 describes the direction and magnitude of the movement of the object along the motion trajectory 513 over the TD 533. Accordingly, an encoded MV 535 and a reference block 531 provides information sufficient to reconstruct a current block 511 and position the current block 511 in the current frame 510.

Figure 6:
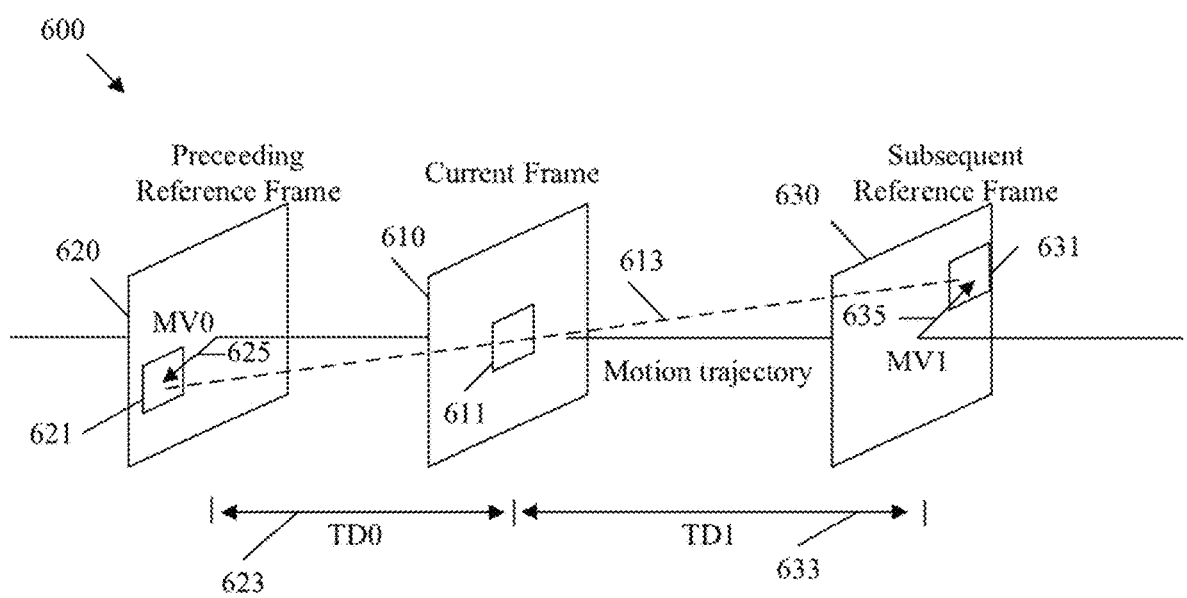
FIG. 6 is a schematic diagram illustrating an example of bidirectional inter-prediction.

FIG. 6 is a schematic diagram illustrating an example of bidirectional inter-prediction 600, for example as performed to determine MVs at block compression step 105, block decoding step 113, motion estimation component 221, motion compensation component 219, motion compensation component 321, and/or motion compensation component 421. For example, bidirectional inter-prediction 600 can be employed to determine motion vectors for a block in inter-prediction modes and/or to determine motion vectors for sub-blocks in affine inter-prediction mode.

Bidirectional inter-prediction 600 is similar to unidirectional inter-prediction 500, but employs a pair of reference frames to predict a current block 611 in a current frame 610. Hence current frame 610 and current block 611 are substantially similar to current frame 510 and current block 511, respectively. The current frame 610 is temporally positioned between a preceding reference frame 620, which occurs before the current frame 610 in the video sequence, and a subsequent reference frame 630, which occurs after the current frame 610 in the video sequence. Preceding reference frame 620 and subsequent reference frame 630 are otherwise substantially similar to reference frame 530.

The current block 611 is matched to a preceding reference block 621 in the preceding reference frame 620 and to a subsequent reference block 631 in the subsequent reference frame 630. Such a match indicates that, over the course of the video sequence, an object moves from a position at the preceding reference block 621 to a position at the subsequent reference block 631 along a motion trajectory 613 and via the current block 611. The current frame 610 is separated from the preceding reference frame 620 by some preceding temporal distance (TD0) 623 and separated from the subsequent reference frame 630 by some subsequent temporal distance (TD1) 633. The TD0 623 indicates an amount of time between the preceding reference frame 620 and the current frame 610 in the video sequence. The TD1 633 indicates an amount of time between the current frame 610 and the subsequent reference frame 630 in the video sequence. Hence, the object moves from the preceding reference block 621 to the current block 611 along the motion trajectory 613 over a time period indicated by TD0 623. The object also moves from the current block 611 to the subsequent reference block 631 along the motion trajectory 613 over a time period indicated by TD1 633.

A preceding motion vector (MV0) 625 describes the direction and magnitude of the movement of the object along the motion trajectory 613 over the TD0 623 (e.g., between the preceding reference frame 620 and the current frame 610). A subsequent motion vector (MV1) 635 describes the direction and magnitude of the movement of the object along the motion trajectory 613 over the TD1 633 (e.g., between the current frame 610 and the subsequent reference frame 630). As such, in bidirectional inter-prediction 600, the current block 611 can be coded and reconstructed by employing the preceding reference block 621 and/or the subsequent reference block 631, MV0 625, and MV1 635.

Intra-Prediction

Many schemes are employed in tandem to compress video data during the video coding process. For example, a video sequence is divided into image frames. The image frames are then partitioned into image blocks. The image blocks may then be compressed by inter-prediction (correlation between blocks in different frames) or intra-prediction (correlation between blocks in the same frame). In intra-prediction, a current image block is predicted from a reference line of samples. The reference line includes samples from adjacent image blocks, also called neighbor blocks. Samples from the current block are matched with samples from the reference line with the nearest luma (light) or chroma (color) values. The current block is coded as prediction modes that indicate the matching samples. The prediction modes include angular prediction modes, direct current (DC) mode, and planar mode. Differences between values predicted by the prediction modes and actual values are coded as residual values in a residual block.

Figure 7:
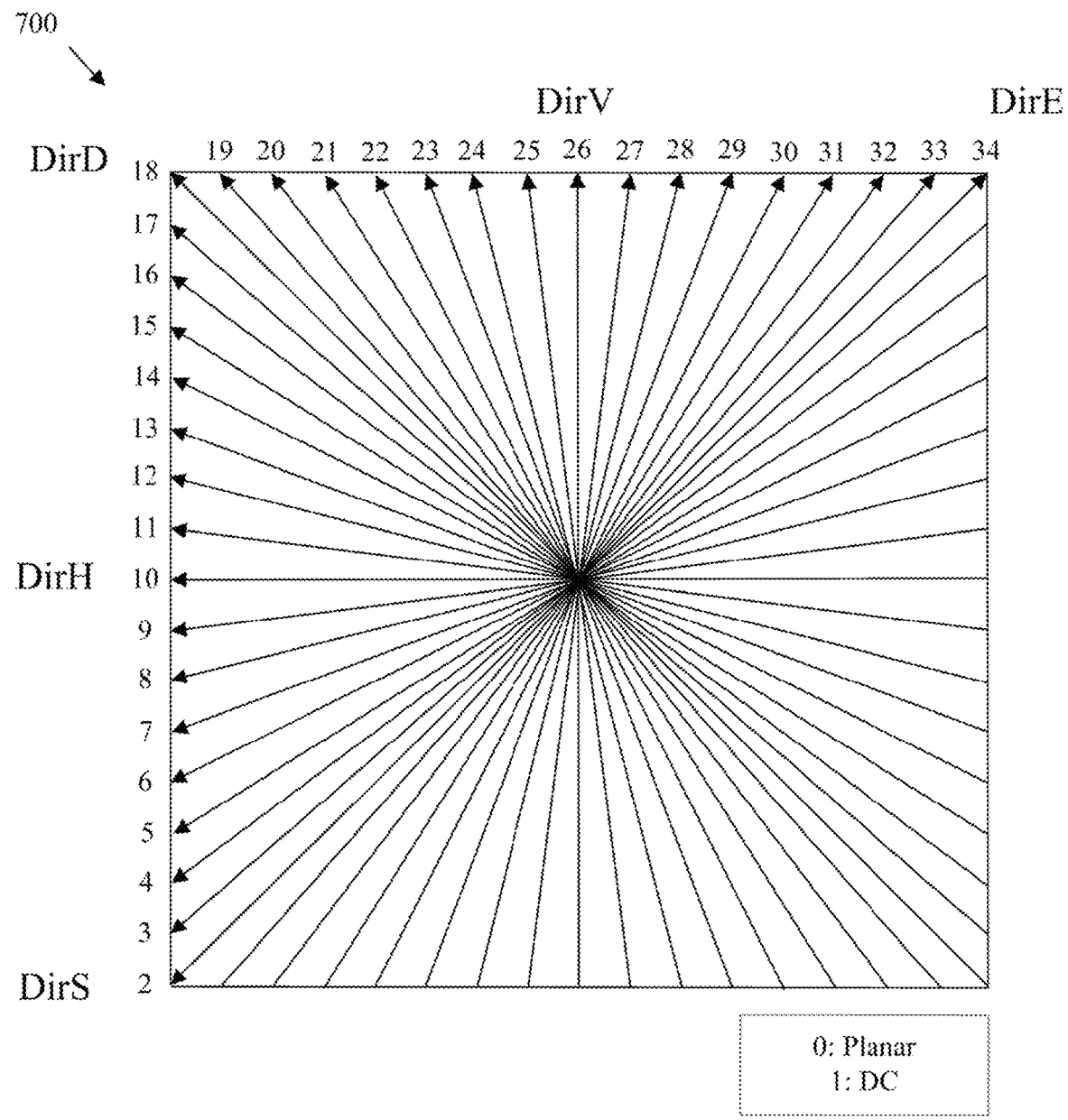
FIG. 7 is a schematic diagram illustrating example intra-prediction modes employed in video coding.

FIG. 7 is a schematic diagram illustrating example intra-prediction modes 700 employed in video coding. For example, intra-prediction modes 700 may be employed by steps 105 and 113 of method 100, intra-picture estimation component 215 and an intra-picture prediction component 217 of codec system 200, intra-picture prediction component 317 of encoder 300, and/or intra-picture prediction component 417 of decoder 400. Specifically, intra-prediction modes 700 can be employed to compress an image block into a prediction block containing a selected prediction mode and a remaining residual block.

As noted above, intra-prediction involves matching a current image block to a corresponding sample or samples of one or more neighboring blocks. The current image block can then be represented as a selected prediction mode index and a residual block, which is much smaller than representing all of the luma/chroma values contained in the current image block. Intra-prediction can be used when there is no available reference frame, or when inter-predication coding is not used for the current block or frame. The reference samples for intra-prediction may be derived from previously coded (or reconstructed) neighboring blocks in the same frame. Advanced Video Coding (AVC), also known as H.264, and H.265/HEVC both employ a reference line of boundary samples of adjacent blocks as reference sample for intra-prediction. In order to cover different textures or structural characteristics many different intra-prediction modes are employed. H.265/HEVC supports a total of thirty five intra-prediction modes 700 that spatially correlate a current block to one or more reference samples. Specifically, intra-prediction modes 700 include thirty-three directional prediction modes indexed as modes two through thirty four, a DC mode indexed as mode one, and a planar mode indexed as mode zero.

During encoding, the encoder matches the luma/chroma values of a current block with the luma/chroma values of corresponding reference samples in a reference line across the edges of neighboring blocks. When the best match is found with one of the reference lines, the encoder selects one of the directional intra-prediction modes 700 that points to the best matching reference line. For clarity of discussion, acronyms are employed below to reference particular directional intra-prediction modes 700. DirS denotes the starting directional intra-prediction mode when counting clockwise from the bottom left (e.g., mode two in HEVC). DirE denotes the ending directional intra-prediction mode when counting clockwise from the bottom left (e.g., mode thirty four in HEVC). DirD denotes the middle directional intra coding mode when counting clockwise from the bottom left (e.g., mode eighteen in HEVC). DirH denotes a horizontal intra prediction mode (e.g., mode ten in HEVC). DirV denotes a vertical intra prediction mode (e.g., mode twenty six in HEVC).

As discussed above, DC mode acts as a smoothing function and derives a prediction value of a current block as an average value of all the reference samples in the reference line traversing the neighboring blocks. Also as discussed above, planar mode returns a prediction value that indicates a smooth transition (e.g., constant slope of values) between samples at the bottom and top left or top left and top right of the reference line of reference samples.

For Planar, DC, and prediction modes from DirH to DirV, the samples in both the top row of the reference line and the left column of the reference line are used as reference samples. For prediction modes with prediction directions from DirS to DirH (including DirS and DirH), the reference samples in the previously coded and reconstructed neighboring blocks on the left column of the reference line are used as reference samples. For prediction modes with prediction directions from DirV to DirE (including DirV and DirE), the reference samples of the previously coded and reconstructed neighboring blocks on the top row of the reference line are used as reference samples.

Figure 8:
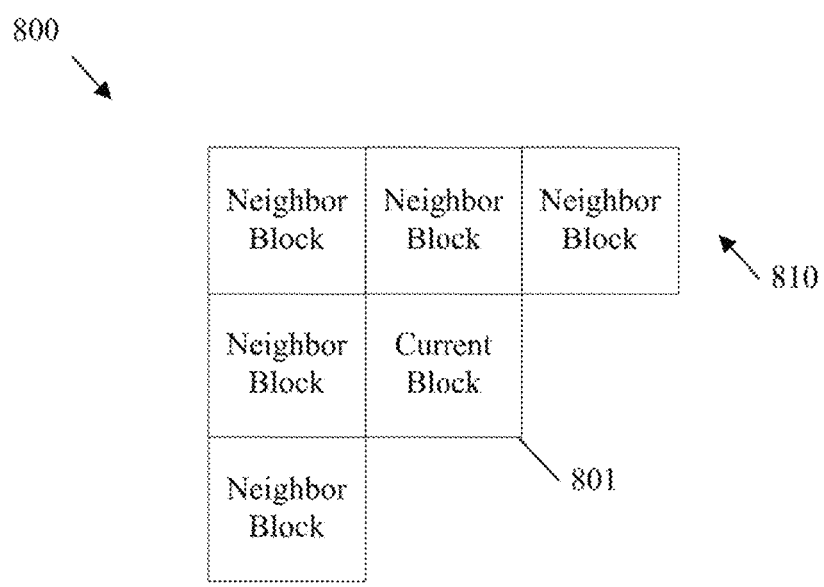
FIG. 8 is a schematic diagram illustrating an example of directional relationships of blocks in video coding.

FIG. 8 is a schematic diagram illustrating an example of directional relationships of blocks 800 in video coding. For example, the blocks 800 may be employed when selecting intra-prediction modes 500. Hence, blocks 800 may be employed by steps 105 and 113 of method 100, intra-picture estimation component 215 and an intra-picture prediction component 217 of codec system 200, intra-picture prediction component 317 of encoder 300, and/or intra-picture prediction component 417 of decoder 400. In video coding, blocks 800 are partitioned based on video content and hence may include many rectangles and squares of varying shapes and sizes. Blocks 800 are depicted as squares for purposes of explanation and are hence simplified from actual video coding blocks to support clarity of discussion.

The blocks 800 contain a current block 801 and neighbor blocks 810. The current block 810 is any block being coded at a specified time. The neighbor blocks 810 are any blocks immediately adjacent to the left edge or top edge of the current block 801. Video coding generally proceeds from top left to bottom right. As such, the neighbor blocks 810 may be been encoded and reconstructed prior to coding of the current block 801. When coding the current block 801, the encoder matches the luma/chroma values of the current block 801 with a reference sample (or samples) from a reference line traversing the edges of the neighboring blocks 810. The match is then employed to select an intra-prediction mode, for example from intra-prediction modes 700, that points to the matched sample (or samples when DC or planar mode are selected). The selected intra-prediction mode then indicates that the luma/chroma values of the current block 801 are substantially similar to the reference sample corresponding to selected intra-prediction mode. Any differences can be retained in a residual block. The selected intra-prediction mode is then encoded in a bit-stream. At the decoder, the current block 801 can be reconstructed by employing the luma/chroma values of the reference samples in the selected reference line in the neighboring block 810 that corresponds to the selected intra-prediction mode (along with any residual information from the residual block).

In-Loop Filters

Video coding schemes subdivide video signals into image frames, and then subdivide the image frames into various types of blocks. The image blocks are then compressed. This approach may create visual artefacts when the compressed video signal is reconstructed and displayed. For example, blocky shapes can be artificially added by the image compression process. This is known as blocking, and generally occurs at block partition boundaries. Also, non-linear signal dependent rounding error, known as quantization noise, may also be artificially added to a compressed image. Various filters may be employed to correct for such artefacts. The filters may be applied to reconstructed frames in post processing. Post processing occurs after significant portions of the compressed video signal have been reconstructed and immediately prior to display to a user. The filters may also be applied as part of the compression/decompression process by employing a mechanism called in-loop filtering. In-loop filtering is a filtering scheme that applies filters to reconstructed video images during the encoding and/or decoding process to support more accurate compression between related images. For example, inter-prediction encodes an image frame based on a previous and/or subsequent image frame. At an encoder, a compressed image is reconstructed and filtered via in-loop filtering so that the reconstructed image provides a more accurate image for use in encoding previous/subsequent image frame(s) via inter-prediction. At a decoder, a compressed image is reconstructed and filtered via in-loop filtering both to create a more accurate image for viewing by an end user and to support more accurate inter-prediction. In-loop filtering employs several filters such as a deblocking filter, a sample adaptive offset (SAO) filter, and an adaptive loop filter. In-loop filtering can also include a noise suppression filter.

Figure 9:
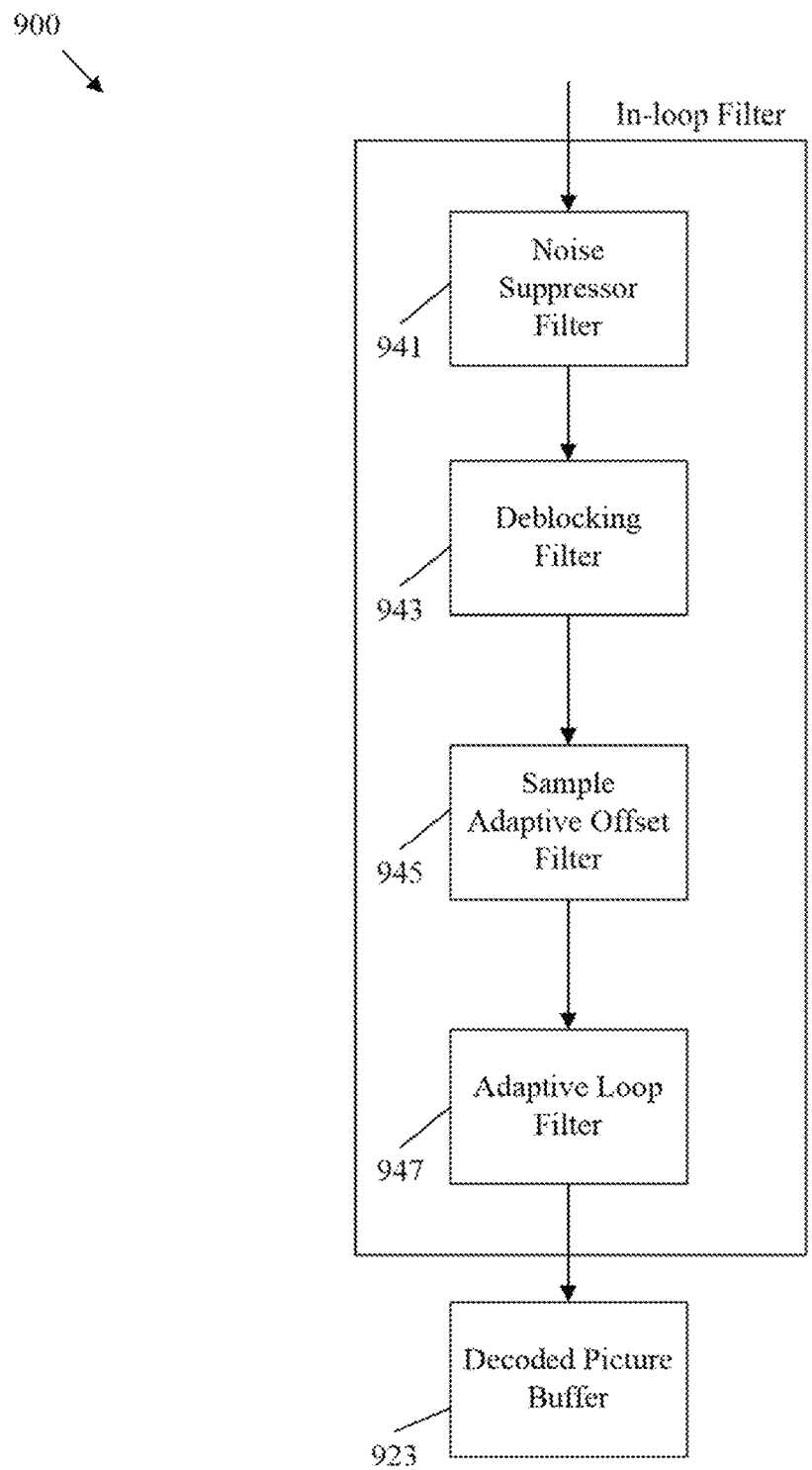
FIG. 9 is a block diagram illustrating an example in-loop filter.

FIG. 9 is a block diagram illustrating an example in-loop filter 900. In-loop filter 900 may be employed to implement in-loop filters 225, 325, and/or 425. The in-loop filter 900 includes a noise suppression filter 941, a deblocking filter 943, a sample adaptive offset (SAO) filter 945, and an adaptive loop filter 947. The filters of in-loop filter 900 are applied in sequence to reconstructed image blocks and/or a residual block.

The noise suppression filter 941 is configured to remove quantization noise caused by image compression. Specifically, the noise suppression filter 941 is employed to remove artefacts that occur at edges in the image. For example, image compression may create distinct and incorrect color/light values adjacent to sharp transitions (edges) between different color/light patches in an image. This is referred to as ringing, and is caused by application of transforms to high frequency portions of the image data that are associated with sharp edges. The noise suppression filter 941 is employed to mitigate such ringing artefacts. The noise suppression filter 941 operates in both the spatial domain (e.g., spatial orientation of pixels) and the frequency domain (e.g., relationship of transformed coefficient values relating to pixel data). At the encoder, the noise suppression filter 941 partitions a reconstructed frame into reference macroblocks. Such blocks can also be sub-divided into smaller reference blocks. The noise suppression filter 941 first generates an application map indicating the portions of the frame that should be filtered based on an estimated amount of quantization noise at the block. The noise suppression filter 941 then employs a matching component to determine, for each reference block as indicated by the application map, a set of patches that are similar to the corresponding reference block, where similar indicates chroma/luma values are within a predetermined range. The noise suppression filter 941 then groups the patches into clusters and may employ a two dimensional (2D) transform to transform the clusters into the frequency domain resulting in frequency domain patches. The noise suppression filter 941 may also employ a reverse 2D transform to convert the frequency domain patches back into the spatial domain.

The deblocking filter 943 is configured to remove block shaped edges created by the blocked based inter and intra prediction. The deblocking filter 943 scans an image portion (e.g., image slice) for discontinuities in chroma and/or luma values occurring at partition boundaries. The deblocking filter 943 then applies a smoothing function to the block boundaries to remove such discontinuities. The strength of the deblocking filter 943 may be varied depending on the spatial activity (e.g., variance of luma/chroma components) occurring in an area adjacent to the block boundaries.

The SAO filter 945 is configured to remove artefacts related to sample distortion caused by the encoding process. The SAO filter 945 at an encoder classifies deblocked samples of a reconstructed image into several categories based on relative deblocking edge shape and/or direction. An offset is then determined and added to the samples based on the categories. The offsets are then encoded in the bitstream and employed by the SAO filter 945 at the decoder. The SAO filter 945 removes banding artefacts (bands of values instead of smooth transitions) and ringing artefacts (spurious signals near sharp edges).

The adaptive loop filter 947, at the encoder, is configured to compare a reconstructed image to an original image. The adaptive loop filter 947 determines coefficients that describe the differences between the reconstructed image and the original image, for example via a Wiener based adaptive filter. Such coefficients are encoded in the bitstream and employed at the adaptive loop filter 947 at the decoder to remove the differences between the reconstructed image and the original image. While the adaptive loop filter 947 is effective in correcting artefacts, greater differences between the reconstructed image and the original image result in a greater number of coefficients to be signaled. This in turn creates a larger bitstream and hence reduces the effectiveness of compression. As such, minimization of differences by other filters prior to applying the adaptive loop filter 947 results in improved compression.

Partitioning

Video coding employs an encoder to compress media files and a decoder to reconstruct the original media files from the compressed media files. Video coding employs various standardized processes to ensure that any decoder employing the standardized process can consistently reproduce a media file as compressed by any encoder also employing the standardized process. For example, an encoder and a decoder may both employ a coding standard such as High efficiency video coding (HEVC), which is also known as H.265. At an encoder, a video signal is separated into frames. Frames are then partitioned into image blocks containing groups of pixels. The image blocks are then compressed, filtered, and encoded into a bitstream. The bitstream may then be transmitted to a decoder, which reconstructs the video signal for display to an end user.

Partitioning systems are configured to split image blocks into sub-blocks. For example, a tree structure employing various split modes can be employed to split a node (e.g., a block) into child nodes (e.g., sub-blocks). Different split modes can be employed to obtain different partitions. Further, split modes can also be applied recursively to further subdivide nodes. Such application of the split modes result in various partition patterns.

Figure 10:
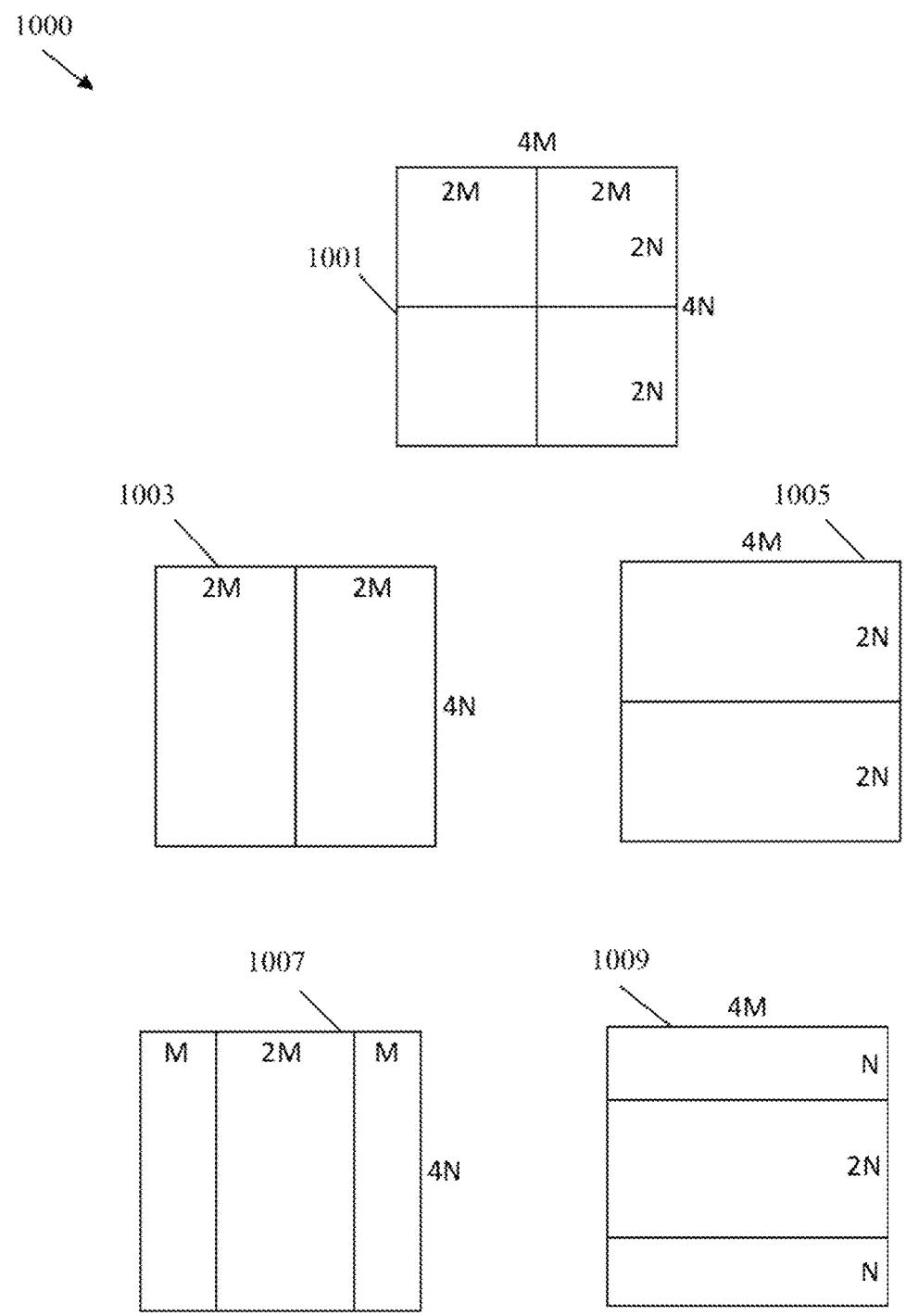
FIG. 10 illustrates example split modes employed in block partitioning.

FIG. 10 illustrates example split modes 1000 employed in block partitioning. A split mode 1000 is a mechanism to split a parent node (e.g., an image block) into a plurality of child nodes (e.g., image sub-blocks) during partitioning. Split modes 1000 include a quad-tree (QT) split mode 1001, a vertical binary tree (BT) split mode 1003, a horizontal BT split mode 1005, a vertical triple tree (TT) split mode 1007, and a horizontal TT split mode 1009. The QT split mode 1001 is a tree structure for block partitioning in which anode of size 4M×4N is split into four child nodes of size M×N, where M indicates block width and N indicates block height. The vertical BT split mode 1003 and horizontal BT split mode 1005 are tree structures for block partitioning in which a node of size 4M×4N is vertically split into two child nodes of size 2M×4N or horizontally split into two child nodes of size 4M×2N, respectively. The vertical TT split mode 1007 and horizontal TT split mode 1009 are tree structures for block partitioning in which a node of size 4M×4N is vertically split into three child nodes of size M×4N, 2M×4N and M×4N; or horizontally split into three child nodes of size 4M×N, 4M×2N and 4M×N, respectively. Among the three child nodes, the largest node is positioned in the center.

Split modes 1000 may also be applied recursively to further divide the blocks. For example a quad-tree binary-tree (QT-BT) can be created by partitioning a node with QT split mode 1001, and then partitioning each child node (sometimes referred to as quad-tree leaf nodes) with a vertical BT split mode 1003 and/or a horizontal BT split mode 1005. Further, a quad-tree triple tree (QT-TT) can be created by partitioning a node with a quad-tree split, and then partitioning the resulting child nodes with the vertical TT split mode 1007 and/or the horizontal TT split mode 1009. HEVC operates on a Joint Exploration Model (JEM) application. In JEM, QT-BT block partitioning is employed to partition a coding tree unit (CTU) into a plurality of blocks. TT block partitioning has also been proposed for inclusion into JEM to further enrich block partition types. In video coding based on QT, QT-BT, QT-TT block partitioning split modes, a coding or prediction block in depth K may be split into a number N of smaller coding or prediction blocks of depth K+1 by a BT, TT or QT split mode, where N is set to two, three, or four, respectively. The partition patterns of the split modes are shown in FIG. 10, with the partition patterns indicating the size and position of two or more child nodes split from a parent node.

Transform

Video coding employs an encoder to compress media files and a decoder to reconstruct the original media files from the compressed media files. Video coding employs various standardized processes to ensure that any decoder employing the standardized process can consistently reproduce a media file as compressed by any encoder also employing the standardized process. For example, an encoder and a decoder may both employ a coding standard such as High efficiency video coding (HEVC), which is also known as H.265. H. 265 is based on a prediction plus transform framework. At an encoder, video files are separated into frames. Frames are then sub-divided into image blocks containing groups of pixels. Image blocks are further decomposed into prediction blocks containing prediction information, such as prediction modes and motion vector information, and residual blocks containing residual information, such as transform modes, transform coefficients, and quantization parameters. A prediction block and a residual block employ less storage space than an image block, but can be employed by a decoder to reconstruct an image block. The prediction blocks and residual blocks are coded into a bitstream and transmitted to decoder and/or stored for later transmission upon request. At a decoder, the prediction information and the residual information are parsed. The parsed prediction information is then employed to generate prediction samples by employing intra-prediction or inter-prediction. Intra-prediction employs reconstructed image blocks to predict other image blocks in the same frame. Inter-prediction employs reconstructed image blocks to predict other image blocks between adjacent frames. Further, the residual information is employed to generate residual samples, for example by sequentially applying inverse quantization and inverse transforms. The prediction samples and the residual samples are combined to obtain reconstructed samples that correspond to the image blocks coded by the encoder (e.g., for display to an end user on a monitor).

Spatial varying transform (SVT) is a mechanism employed to further improve video coding efficiency. SVT employs a transform block to further compress the residual block. Specifically, a rectangular residual block include a width w and height h (e.g., w×h). A transform block is selected that is smaller than the residual block. Hence, the transform block is employed to transform a corresponding part of the residual block, and leave the remainder of the residual block without additional coding/compression. The rationale behind SVT is that residual information may not be distributed evenly in a residual block. Using a smaller transform block with an adaptive position can capture the majority of the residual information in the residual block, without requiring the entire residual block be transformed. This approach may achieve better coding efficiency than transforming all the residual information in the residual block in some cases. As the transform block is smaller than the residual block, SVT employs a mechanism for signaling the position of the transform relative to the residual block. Such position signaling increases the overall signaling overhead of the coding process, and hence reduces the efficiency of the compression. Additionally, employing the same type of transform block in all cases may not lead to beneficial results in some cases.

Figure 11:
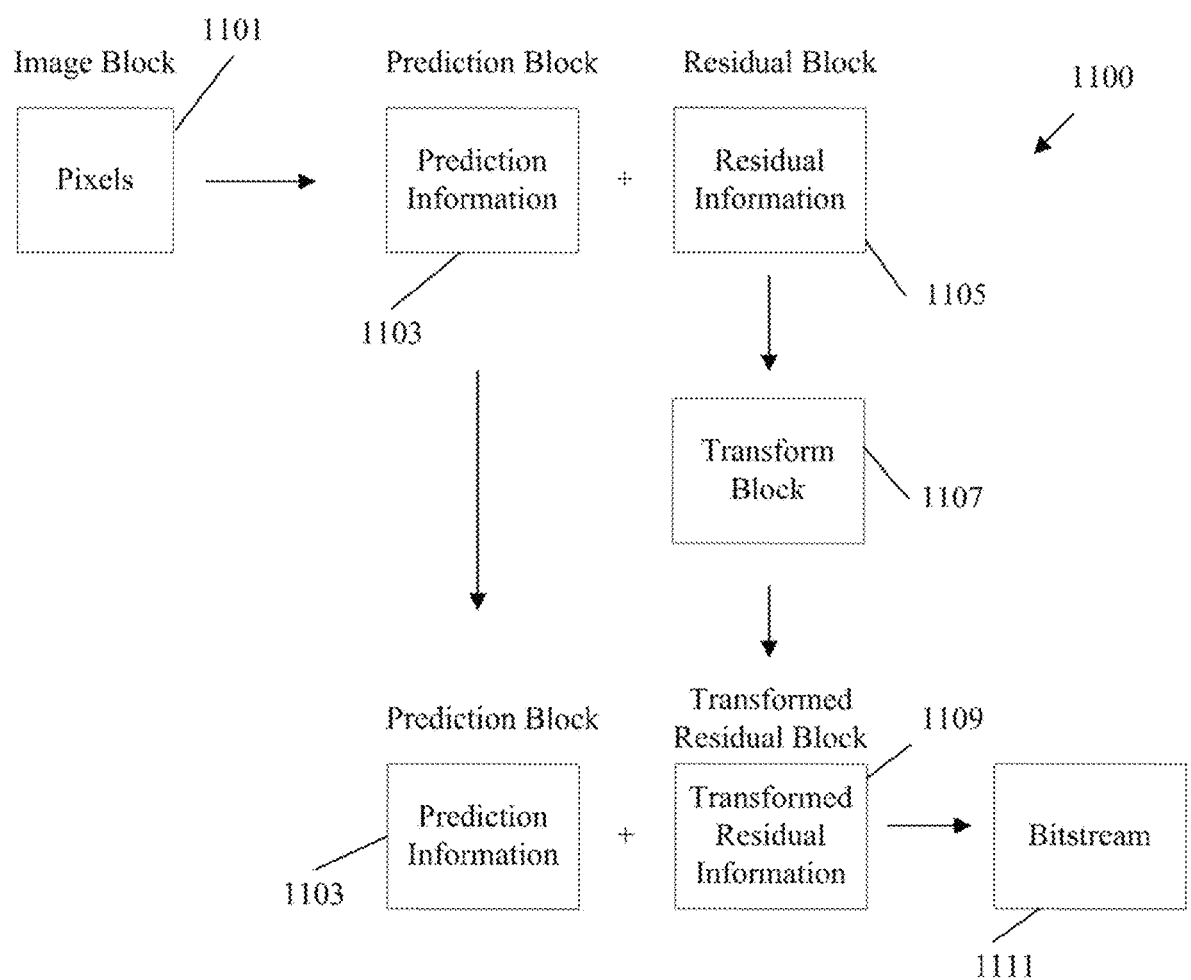
FIG. 11 is a schematic diagram of an example video encoding mechanism.

FIG. 11 is a schematic diagram of an example video encoding mechanism 1100. An image block 1101 can be obtained by an encoder from one or more frames. For example, an image may be split into a plurality of rectangular image regions. Each region of the image corresponds to a Coding Tree Unit (CTU). A CTU is partitioned into a plurality of blocks, such as the coding units in HEVC. Block partition information is then encoded in a bitstream 1111. Accordingly, the image block 1101 is a partitioned portion of an image and contains pixels that represent luma components and/or chroma components at a corresponding portion of the image. During encoding, the image block 1101 is encoded as a prediction block 1103 containing prediction information such as prediction modes for intra-prediction and/or motion vectors for inter-prediction. Encoding the image block 1101 as a prediction block 1103 may then leave a residual block 1105 containing residual information indicating the difference between the prediction block 303 and the image block 301.

It should be noted that an image block 1101 may be partitioned as a coding unit that contains one prediction block 1103 and one residual block 1105. The prediction block 1103 may contain all prediction samples of the coding unit, and the residual block 1105 may contain all residual samples of the coding unit. In such a case, the prediction block 1103 is of the same size as the residual block 1105. In another example, the image block 1101 may be partitioned as a coding unit that contains two prediction blocks 1103 and one residual block 1105. In such a case, each prediction block 1103 contains a portion of the prediction samples of the coding unit, and the residual block 1105 contains all of the residual samples of the coding unit. In yet another example, the image block 1101 is partitioned into a coding unit that contains two prediction blocks 1103 and four residual blocks 1105. The partition pattern of the residual blocks 1105 in a coding unit may be signaled in the bitstream 1111. Such position patterns may include Residual Quad-Tree (RQT) in HEVC. Further, an image block 1101 may contain only luma components (e.g., light), denoted as Y components, of image samples (or pixels). In other cases, the image block 1101 may contain Y, U and V components of image samples, where U and V indicate chrominance components (e.g., color) in a blue luminance and red luminance (UV) colorspace.

Transforms may be employed to further compress the information. Specifically, a transform block 1107 may be employed to further compress the residual block 1105. The transform block 1107 contains a transform, such as inverse Discrete Cosine Transform (DCT) and/or inverse Discrete Sine Transform (DST). The difference between the prediction block 1103 and the image block 1101 is the fit to the transform by employing transform coefficients. By indicating the transform mode of the transform block 1107 (e.g., inverse DCT and/or inverse DST) and the corresponding transform coefficients, the decoder can reconstruct the residual block 1105. When exact reproduction is not required, the transform coefficients can be further compressed by rounding certain values to create a better fit for the transform. This process is known as quantization and is performed according to quantization parameters that describe the allowable quantization. Accordingly, the transform modes, transform coefficients, and quantization parameters of the transform block 1107 are stored as transformed residual information in a transformed residual block 1109, which may also be referred to simply as a residual block in some cases.

The prediction information of the prediction block 1103 and the transformed residual information of the transformed residual block 1109 can then be encoded in a bitstream 1111. The bitstream 1111 can be stored and/or transmitted to a decoder. The decoder can then perform the process in reverse to recover the image block 1101. Specifically, the decoder can employ the transformed residual information to determine the transform block 1107. The transform block 1107 can then be employed in conjunction with the transformed residual block 1109 to determine the residual block 1105. The residual block 1105 and the prediction block 1103 can then be employed to reconstruct the image block 1101. The image block 1101 can then be positioned relative to other decoded image blocks 1101 to reconstruct frames and position such frames to recover the encoded video.

It should be noted that some prediction blocks 1103 can be encoded without resulting in a residual block 1105. However, such a case does not result in the use of a transform block 1107 and hence is not discussed further. Transform blocks 1107 may be employed for inter-predicted blocks or intra-predicted blocks. Further, transform blocks 1107 may be employed on residual blocks 1105 generated by specified inter-prediction mechanisms (e.g., translation model based motion compensation), but may not be employed to residual blocks 1105 generated by other specified inter-prediction mechanisms (e.g., affine model based motion compensation).

Figure 12:
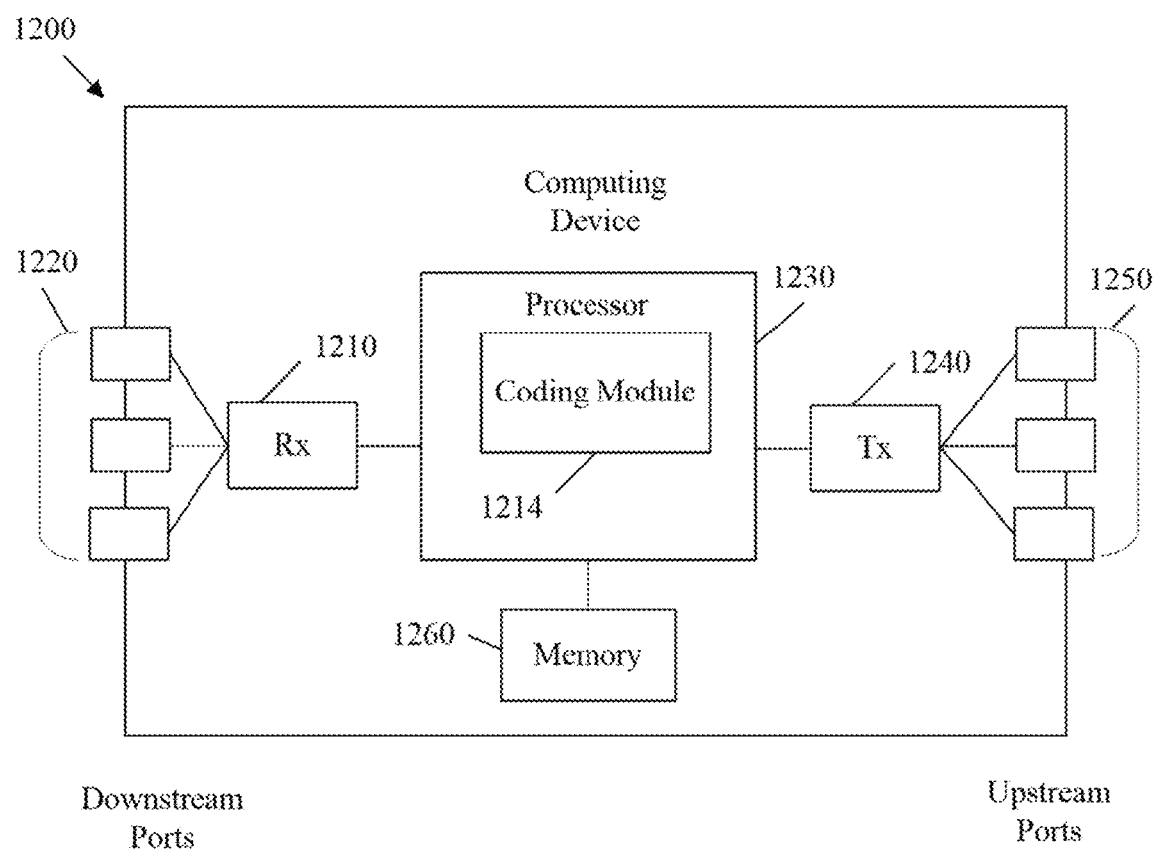
FIG. 12 is a schematic diagram of a computing device for video coding.

FIG. 12 is a schematic diagram of an example computing device 1200 for video coding according to an embodiment of the disclosure. The computing device 1200 is suitable for implementing the disclosed embodiments as described herein. The computing device 1200 comprises ingress ports 1220 and receiver units (Rx) 1210 for receiving data; a processor, logic unit, or central processing unit (CPU) 1230 to process the data; transmitter units (Tx) 1240 and egress ports 1250 for transmitting the data; a memory 1260 for storing the data. The computing device 1200 may also comprise optical-to-electrical (OE) components and electrical-to-optical (EO) components coupled to the ingress ports 1220, the receiver units 1210, the transmitter units 1240, and the egress ports 1250 for egress or ingress of optical or electrical signals. The computing device 1200 may also include wireless transmitters and/or receivers in some examples.

The processor 1230 is implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is in communication with the ingress ports 1220, receiver units 1210, transmitter units 1240, egress ports 1250, and memory 1260. The processor 1230 comprises a coding module 1214. The coding module 1214 implements the disclosed embodiments described above. For instance, the coding module 1214 implements, processes, prepares, or provides the various coding operations. The inclusion of the coding module 1214 therefore provides a substantial improvement to the functionality of the computing device 1200 and effects a transformation of the computing device 1200 to a different state. Alternatively, the coding module 1214 is implemented as instructions stored in the memory 1260 and executed by the processor 1230 (e.g., as a computer program product stored on a non-transitory medium).

The memory 1260 comprises one or more disks, tape drives, and solid-state drives and may be used as an overflow data storage device, to store programs when such programs are selected for execution, and to store instructions and data that are read during program execution. The memory 1260 may be volatile and/or non-volatile and may be read-only memory (ROM), random access memory (RAM), ternary content-addressable memory (TCAM), and/or static random-access memory (SRAM). The computing device 1200 may also input/output (I/O) device for interacting with an end user. For example, the computing device 1200 may include a display, such as a monitor, for visual output, speakers for audio output, and a keyboard/mouse/trackball, etc. for user input.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

Aiming at keeping both good quality and random access ability, while at the same time keeping overall coding efficiency high, an approach referred to as that uses Distributed Decoding Refresh (DDR) is disclosed.

A main idea is to distribute an intra coded picture over one or more other pictures, for example, inter-coded pictures, to reduce the bit-rate variance in the bitstream. The picture that is distributed over the other pictures, for example, regular inter-coded pictures, is referred to as Distributed Instantaneous Decoding Refresh (DIDR) picture. A DIDR picture is not for output, but just used for inter-prediction reference and inter-layer prediction reference. A Distributed Decoding Refresh (DDR) picture is an inter-coded random access picture that is associated with a DIDR picture. DDR and DIDR have the same POC value.

FIGS. 13A to 13D illustrate the process of coding a sequence of pictures 1301 including distributing an intra prediction picture (for example, the above-mentioned DIDR picture) over other picture, wherein the intra prediction picture (for example, the above-mentioned DIDR picture) is not coded for output but rather for reference for inter prediction coding. The arrows indicate referencing. In the examples shown in FIGS. 13A to 13D the sequence of pictures 1301 comprises pictures with POCs 22 to 28. A DIDR consists of five VCL NAL units Nal0, Nal1, Nal2, Nal3, and Nal4. These five VCL NAL units are grouped in groups 1302 wherein a first group comprises Nal0, a second group comprises Nal1 and Nal2 and a third group comprises Nal3 and Nal4. The five VCL NAL units are distributed such that Nal0 is positioned between pictures with POC 24 and POC 25, Nal1 and Nal2 are positioned between pictures with POC 25 and POC 26 and Nal4 are positioned between pictures with POC 26 and POC 27.

Figure 13A:
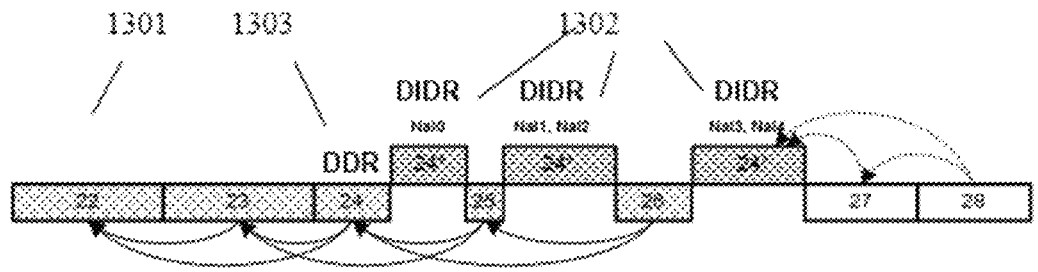
FIGS. 13A to 13D illustrate the distribution of VCL NAL units over pictures of a sequence of pictures according to embodiments of the present invention.

In FIG. 13A one of the other pictures is a DDR picture 1303 designated for output and with POC 24. During a decoding process the DDR picture 1303 with POC 24 can be used for random access or refresh. The DDR picture 1303 with POC 24 and the distributed DIDR picture are associated with each other and represent the same picture. Both pictures have the same POC 24. The DIDR picture is distributed over the five VCL NAL sub-units arranged in three groups 1302 indicated by 24*.

Figure 13B:
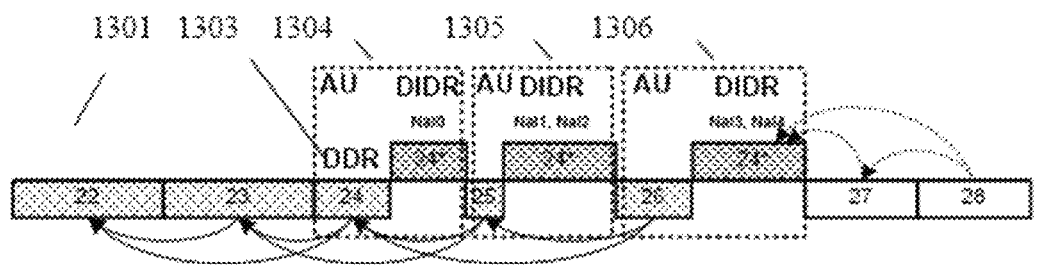

The five VCL NAL sub-units can be comprised in respective access units AU. FIG. 13B shows an example wherein a first access unit 1304 comprises the DDR picture 1303 as well as the VCL NAL unit Nal0. A second access unit 1305 comprises VCL NAL units Nal1 and Nal2 as well as another picture, for example, an inter prediction picture, with POC 25. Similarly, a third access unit 1306 comprises VCL NAL units Nal3 and Nal4 as well as another picture, for example, an inter prediction picture, with POC 26.

Figure 13C:
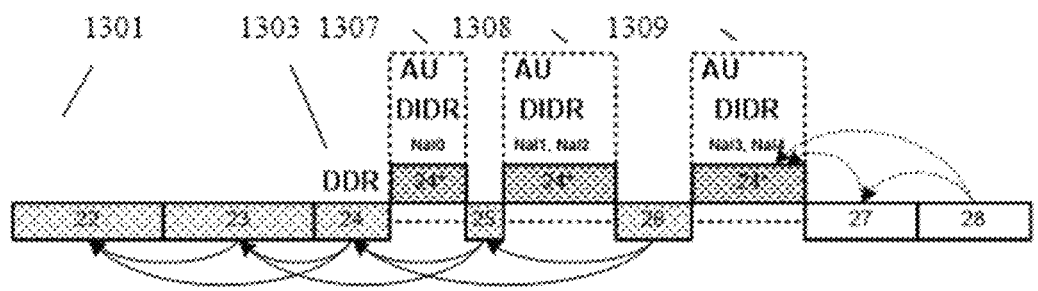

According to another example as illustrated in FIG. 13C, a first access unit 1307 comprises the VCL NAL unit Nal0, a second access unit 1308 comprises VCL NAL units Nal1 and Nal2 and a third access unit 1309 comprises VCL NAL units Nal3 and Nal4. No other pictures are comprised in the access units 1307, 1308 and 1309 of FIG. 13C.

Figure 13D:
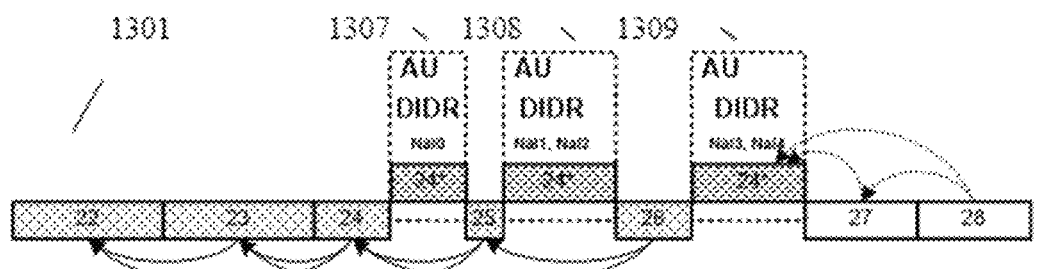

FIG. 13D shows an example similar to the one shown in FIG. 13C. Again, a first access unit 1307 comprises the VCL NAL unit Nal0, a second access unit 1308 comprises VCL NAL units Nal1 and Nal2 and a third access unit 1309 comprises VCL NAL units Nal3 and Nal4. No other pictures are comprised in the access units 1307, 1308 and 1309 of FIG. 13D. However, no DDR picture is present. The DIDR picture comprised of the five VCL NAL units Nal0, Nal1, Nal2, Nal3, and Nal4 represent a redundant picture for the picture with POC 24 which may be an inter prediction picture that may not serve of random access or refresh during a decoding process. The same holds for the sequence parameter set RBSP semantics related to a flag specifying that there may be DIDR pictures present in the CVS and the general tile group header semantics The associated pair of a DIDR picture and a DDR picture provides the following advantages:
  No low-level syntax modification is required
    No problems with loop filter across boundaries
    No problems with Constrained Intra Prediction (CIP)
    No problems with Constrained Motion Compensation/ Prediction
    No problems with treating tiles/sub-pictures boundaries as picture boundaries
  The bit-rate variations could be smoothed by corresponded distribution of extra DIDR NAL units without low level rate-control (like variable local QP and often temporal delta QP variations)
  Temporal scalability could be supported by redistribution of DIDR nal units across sparsed pictures corresponded to temporal sub-stream.
  Easy implementation
  Low initial joining delay
  Low end to end delay In opposite to GDR approach, the proposed technique use only high-level syntax modifications.

In order to solve the problem listed above, this disclosure provides the following aspects (each of them can be applied individually and some of them can be applied in combination):

1) A VCL NAL unit with type DDR_NUT for distributed decoding refresh is defined with associated Distributed Instantaneous Decoding Refresh (DIDR) picture type defined by NAL unit type equal to IDR_NO_LP with didr_pic_flag equal to 1.

2) Picture with NAL unit type DDR_NUT is referred to as DDR picture. A DDR picture may be the first picture in the bitstream in decoding order, may be the first picture of a CVS in decoding order, and may appear elsewhere in the bitstream. A DDR picture does not have any associated leading pictures. Each DDR picture is associated with a DIDR picture and vice versa. A DDR picture has temporalID equal to 0.

3) Picture with NAL unit type IDR_NO_LP with didr_pic_flag equal to 1 is referred to as DIDR picture. A DIDR picture is associated with a DDR picture and vice versa. An associated pair of DIDR picture and DDR picture are coded representations of the same picture, and they have the same value of picture order count. A DIDR picture is coded with intra prediction only and coded with at least two VCL NAL units. The VCL NAL units of a DIDR picture are distributed among a set of access units starting from the access unit containing the associated DDR picture, up to but not including any subsequent access unit that is an DDR access unit or an IRAP access unit. A DIDR picture is for inter prediction reference only and not for output. The characteristics of DIDR pictures further include the following:
  a. A DIDR picture has TemporalID equal to 0.
  b. A DIDR picture has the same POC as the associated DDR picture.
  c. A DIDR picture must be present when the associated DDR picture is present.

4) The access unit containing the first VCL NAL unit of a DIDR picture shall not precede the DDR access unit containing the DDR picture associated with the DIDR picture. The access unit containing the last VCL NAL unit of a DIDR picture shall precede the first DDR or IRAP access unit, when present, that succeeds the DDR access unit containing the DDR picture associated with the DIDR picture.

5) A coded video sequence (CVS) may start with an DDR access unit or an IRAP access unit.

6) A DDR access unit is the first access unit in an CVS if one of the following is true:
  a. The DDR access unit is the first access unit in the bitstream.
  b. The DDR access unit immediately follows an end-of-sequence (EOS) access unit.
  c. The DDR access unit immediately follows an end-of-bitstream (EOB) access unit.
  d. A decoder flag named NoIncorrectPicOutputFlag for the DDR picture is equal to 1 (i.e., true) by an entity outside the decoder, through setting the flag HandleDdrAsCvsStartFlag equal to 1.

Figure 14:
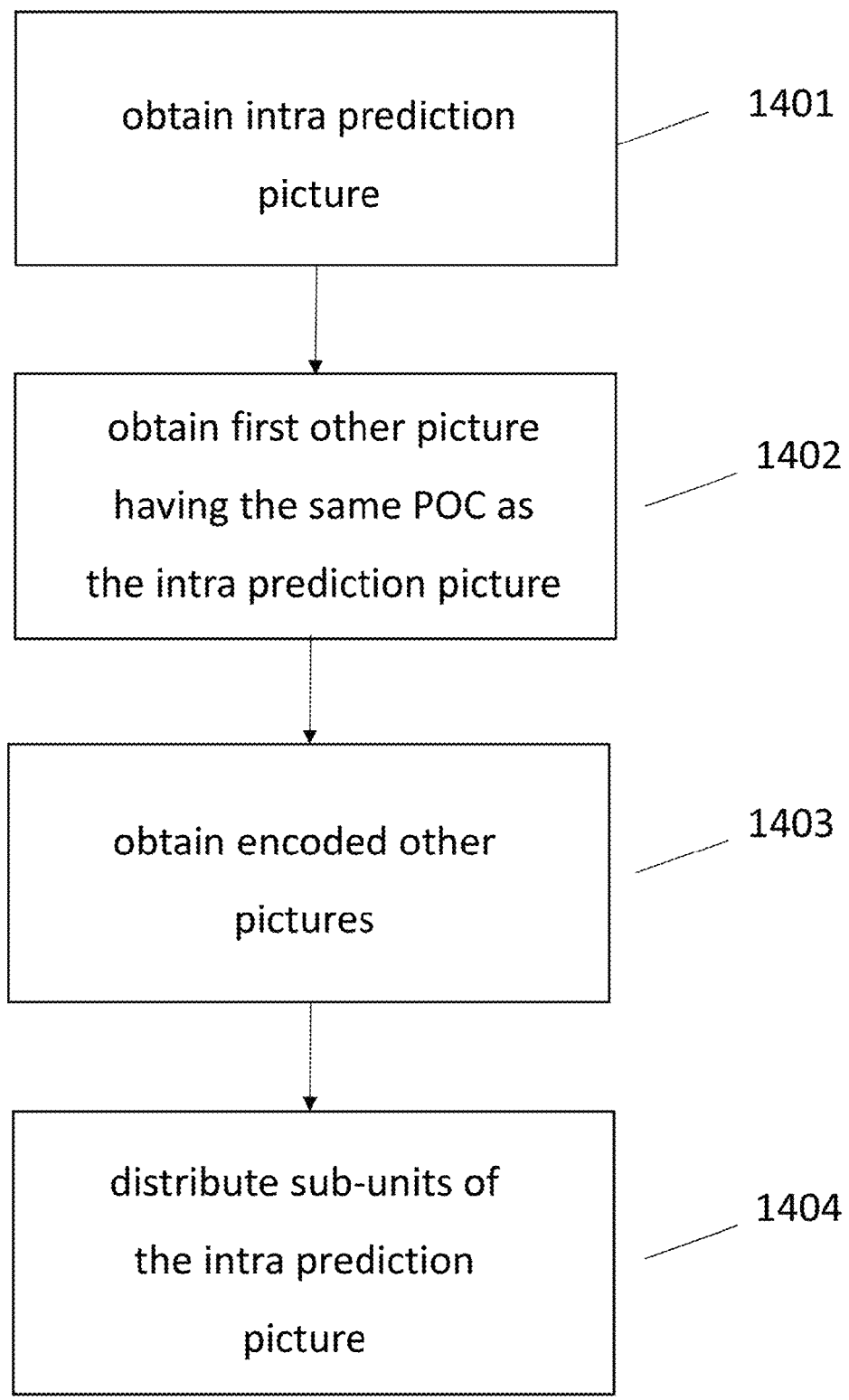
FIG. 14 illustrates a method of encoding a sequence of pictures comprising distributing an intra prediction coded picture over other pictures of the sequence of pictures according to an embodiment of the present invention.

7) When the last NAL unit of DIDR picture is received by decoder, the following applies:
  a. All the reference pictures in the DPB are marked as "unused for reference".
  b. POC MSB of the picture is set to be equal to 0.

c. DIDR picture is marked as "not needed for output".
  i. Alternatively, it is allowed for a pair of associated DDR picture and DIDR picture to have different POC values, and if delta POC value between DIDR picture and DDR picture is larger than delta POC corresponded to frame rate associated with TemporalID equal to 0 then it marked as not to be outputted (i.e., marked as "not needed for output").
d. Decoder does not start decoding DIDR picture before all NAL units of DIDR picture are available/received.
  i. Decoder may parse the tile group header of DIDR NAL unit as it is received and keep it in the decoder coded picture buffer (CPB) until the last NAL unit of DIDR picture is available/received.
8) When a DDR picture is the first picture in the CVS, the following applies:
  a. The variable NoIncorrectPicOutputFlag is set to 1.
  b. All the reference pictures in the DPB excluding associated DIDR picture is marked as "unused for reference".
  c. Decoding process generating unavailable reference pictures is invoked.
  d. POC MSB of the picture is set to be equal to 0.
  e. All pictures starting from the DDR picture until and excluding the picture entirely in the access unit containing the last VCL NAL unit of the associated DIDR picture are marked as "not needed for output".
9) A DIDR picture is decoded before the decoding of the coded picture entirely in the access unit auA that also contains the last VCL NAL unit of the DIDR picture and after the decoding of the coded picture entirely in the access unit immediately preceding auA in decoding order.
10) The following may be applied for the extraction of sub-bitstream containing DIDR picture:
  a. If the access unit has the temporalID higher than HighestTid and contain DIDR Nal unit then DIDR NAL units could be redistributed along access units with temporalID lower or equal to HighestTid.
11) A flag to specify whether DDR and DIDR are enabled is signalled in a sequence level parameter set (i.e., in the SPS).
  a. The flag may be called sps_didr_pics_present_flag.
  b. When the flag is equal to 1, DIDR and DDR pictures may be present in the CVS; otherwise, if the flag is equal to 0, DIDR and DDR are not enabled so that DIDR and DDR pictures are not present in the CVS.
12) A flag to specify whether current IRAP picture with NAL unit type equal to IDR_NO_LP is an DIDR picture is signaled
  a. The flag may be called didr_pics_flag.
  b. The flag is signaled in Tile Group header of IRAP picture with NAL unit type equal to IDR_NO_LP.
13) In another possible implementation form all aspect from 1-12 with containing subset of NAL units of DIDR picture in separate access units.
  a. DIDR may be the first picture in the bitstream in decoding order, may be the first picture of a CVS in decoding order, and may appear elsewhere in the bitstream.
14) In another possible implementation form a VCL NAL unit with type DIDR_NUT for distributed instantaneous decoding refresh is defined
15) The method of claim 14 comprises picture with NAL unit type DIDR_NUT is referred to as DIDR picture. A DIDR picture may be the first picture in the bitstream in decoding order, may be the first picture of a CVS in decoding order, and may appear elsewhere in the bitstream. A DIDR picture does not have any associated leading pictures. Each DIDR picture could have associated inter-coded picture with the same POC. The characteristics of DIDR pictures further include the following:
  a. A DIDR picture has temporalID equal to 0.
  b. A DIDR picture has picture output flag equal to 0.
  c. A DIDR picture is used as reference picture for the following pictures
  d. Sub groups of NAL units of DIDR picture could be organized into access units and interleaved with other inter-coded pictures In particular, it is provided herein a method of video encoding a sequence of pictures as illustrated in the flow chart of FIG. 14, the method being implemented in an encoding device, for example, the video encoder 20 of the video coding system 40 shown in FIG. 1B or the encoder 300 shown in FIG. 3, wherein the method comprises the steps of obtaining 1401 an intra prediction picture (for example, the above-mentioned DIDR picture) comprising at least two sub-units, obtaining 1402 a first encoded other picture (for example, the above-mentioned DDR picture), wherein the intra prediction picture and the first encoded other picture have the same Picture Order Count, POC, value, and obtaining 1403 encoded other pictures different from the intra prediction picture and the first encoded other picture and distributing 1404 the at least two sub-units of the intra prediction picture over one or more sub-units of the encoded other pictures and/or over one or more sub-units of the first encoded other picture. The first encoded other picture can be an inter prediction picture, for example. The encoded other pictures can be inter prediction pictures not comprising the first encoded other picture, for example. The distribution 1404 of the at least two sub-units of the intra prediction picture over one or more sub-units of the encoded other pictures may be performed in a manner as illustrated in FIGS. 13A to 13C, for example. The intra prediction picture (for example, the above-mentioned DIDR picture) and the first encoded other picture (for example, the above-mentioned DDR picture) may represent the same picture. The sub-units are portions representing portions of a picture. The sub-units may be NAL units, in particular, VCL NAL units. All of the obtaining steps 1401, 1402 and 1403 as well the distributing process 1404 may be performed by the video encoder 20 of the video coding system 40 shown in FIG. 1B or the encoder 300 shown in FIG. 3.

Figure 15:
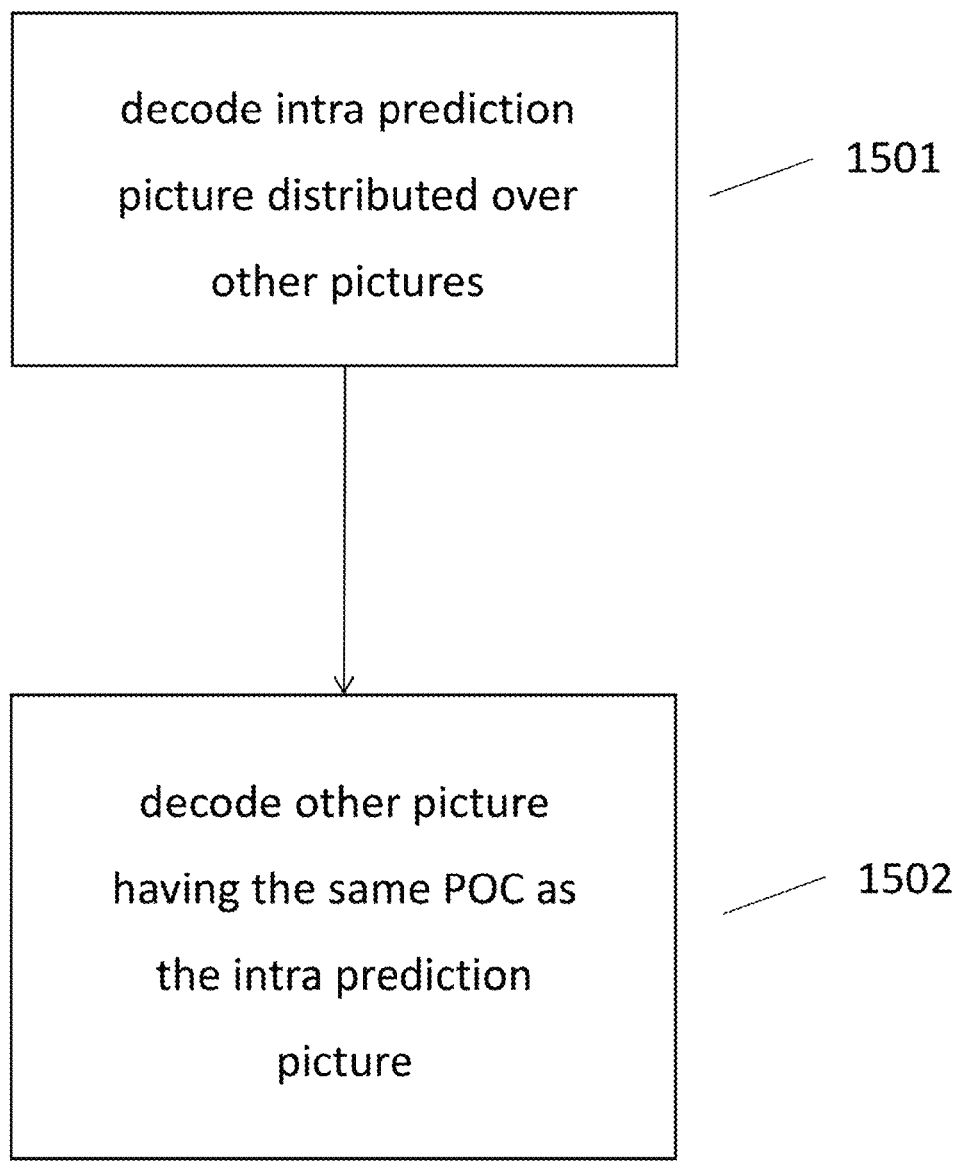
FIG. 15 illustrates a method of decoding a sequence of encoded pictures comprising an intra prediction coded picture distributed over other pictures of the sequence of pictures according to an embodiment of the present invention.

Moreover, a method of video decoding a sequence of encoded pictures is provided as illustrated in the flow chart of FIG. 15, the method being implemented in decoding device, for example, the video decoder 30 of the video coding system 40 shown in FIG. 1B or the decoder 400 shown in FIG. 4, wherein the method comprises the steps of decoding 1501 a first encoded other picture (that may be an inter prediction picture, for example) and decoding 1502 an intra prediction picture comprising at least two sub-units when all sub-units became available (received), wherein the intra prediction picture and the first encoded other picture have the same Picture Order Count, POC, value and wherein the at least two sub-units of the intra prediction picture are distributed over one or more sub-units of encoded other pictures comprised in the sequence of encoded pictures and different from the intra prediction picture and/or the at least two sub-units of the intra prediction picture are distributed over one or more sub-units of first encoded other picture. The at least two sub-units of the intra prediction picture may be distributed over one or more sub-units of the encoded other pictures in a manner as illustrated in FIGS. 13A to 13C, for example. Again, the intra prediction picture (for example, the above-mentioned DIDR picture) and the first encoded other picture (for example, the above-mentioned DDR picture) may represent the same picture. The sub-units are portions representing portions of a picture. The sub-units may be NAL units, in particular, VCL NAL units. The decoding steps 1501 and 1502 can be performed by the video coding system 40 shown in FIG. 1B or the decoder 400 shown in FIG. 3, for example. The decoded first encoded other picture (for example, the above-mentioned DDR picture) may be output whereas the intra prediction picture (for example, the above-mentioned DIDR picture) may be decoded not for output but merely stored in a DPB 1503, for example, the DPB 323 of the encoder 300 shown in FIG. 3 or the DPB 423 of the decoder 400 shown in FIG. 4 for functioning as a reference picture.

Figure 16:
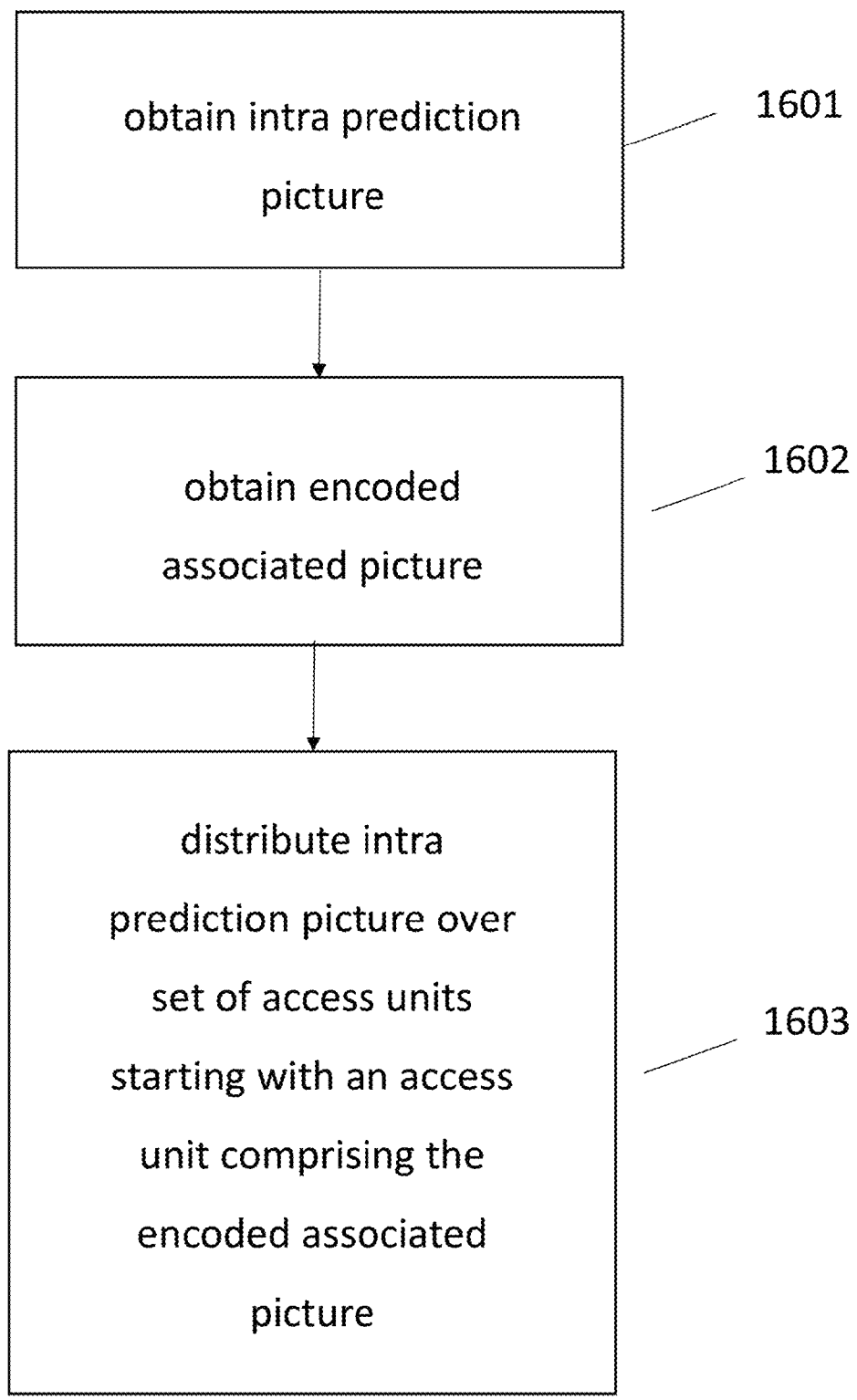
FIG. 16 illustrates another method of coding a sequence of pictures comprising distributing an intra prediction coded picture over other pictures of the sequence of pictures according to another embodiment of the present invention.

Furthermore, it is provided a method of video encoding a sequence of pictures as illustrated in the flow chart of FIG. 16, the method being implemented in an encoding device, for example, the video encoder 20 of the video coding system 40 shown in FIG. 1B or the encoder 300 shown in FIG. 3, wherein the method comprises the steps of obtaining 1601 an intra prediction picture comprising at least two sub-units, obtaining 1602 an encoded associated picture that is associated with the intra prediction picture and distributing 1603 the at least two sub-units of the intra prediction picture over a set of access units starting with an access unit comprising the encoded associated picture. The distribution 1603 of the at least two sub-units of the intra prediction picture over the set of access units may be performed in a manner as illustrated in FIG. 13D, for example. The intra prediction picture (for example, the above-mentioned DIDR picture) and the encoded associated picture may represent the same picture. The sub-units are portions representing portions of a picture. The sub-units may be NAL units, in particular, VCL NAL units. The obtaining and distributing steps 1601, 1602 and 1603, respectively, may be performed by the video encoder 20 of the video coding system 40 shown in FIG. 1B or the encoder 300 shown in FIG. 3.

Figure 17:
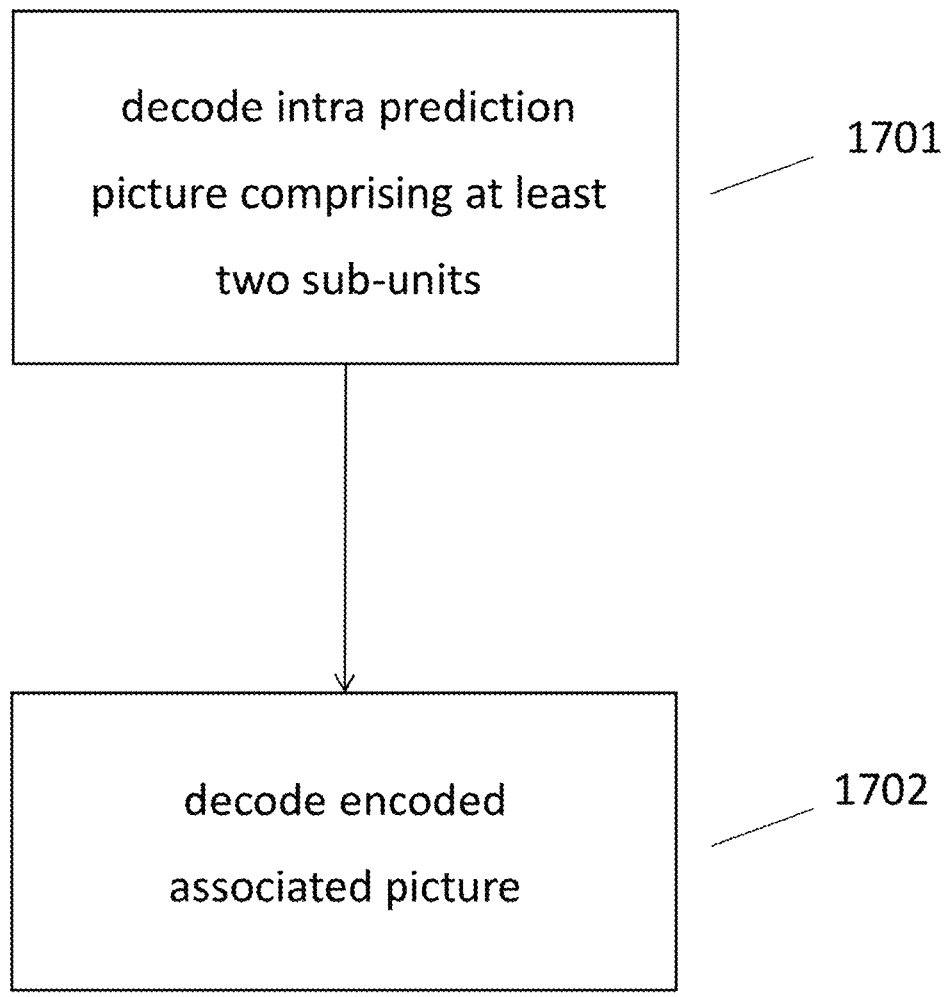
FIG. 17 illustrates another method of decoding a sequence of encoded pictures comprising an intra prediction coded picture distributed over other pictures of the sequence of pictures according to an embodiment of the present invention.
Figure 18:
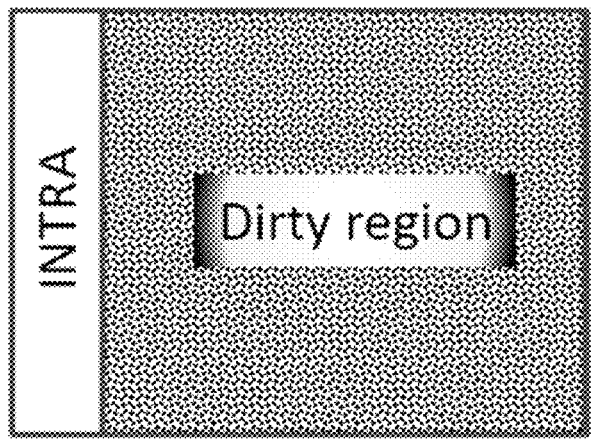
FIG. 18 illustrates the gradual decoding refresh process of the art.
Figure 18:
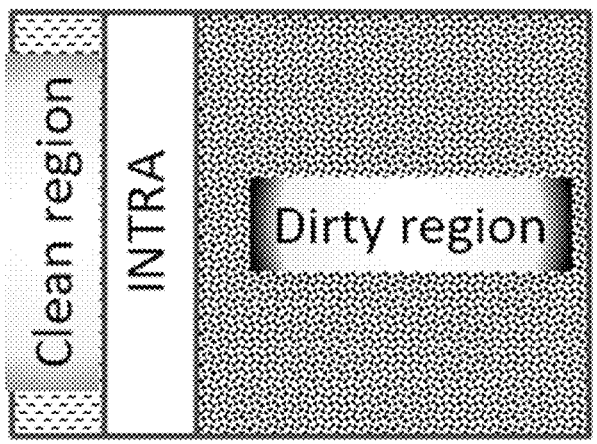
Figure 18:
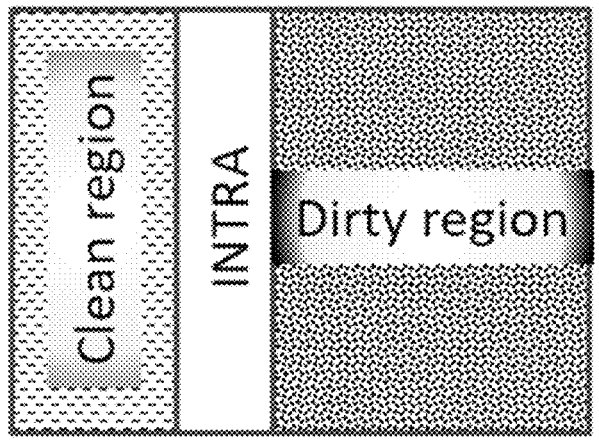
Figure 19:
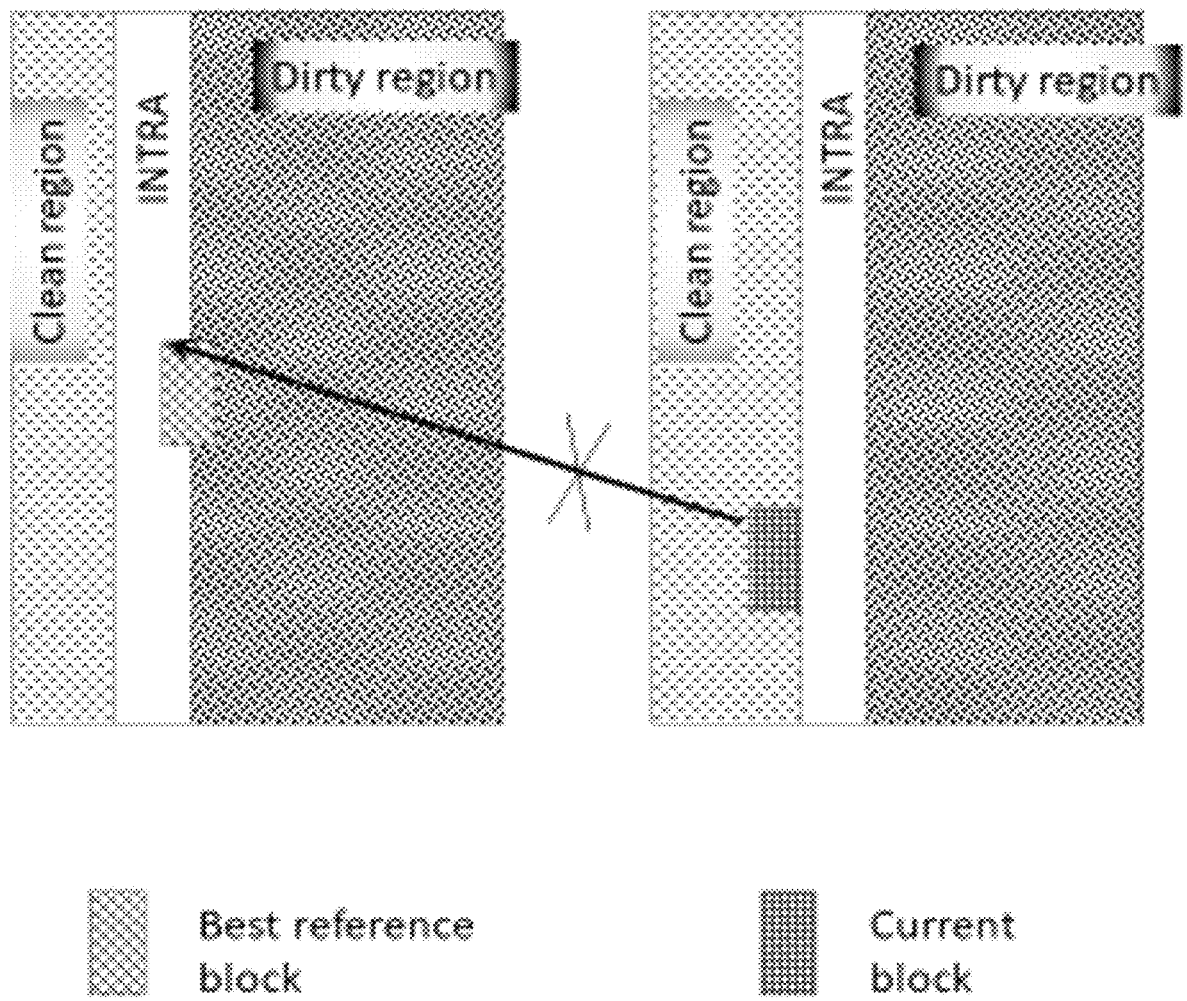
FIG. 19 illustrates disadvantages of the gradual decoding refresh process illustrated in FIG. 18 with respect to obtaining restricted motion vectors.

As a complementary method it is provided a method of video decoding a sequence of encoded pictures as illustrated in the flow chart of FIG. 17, the method being implemented in a decoding device, for example, the video decoder 30 of the video coding system 40 shown in FIG. 1B or the decoder 400 shown in FIG. 3, wherein the method comprises the steps of decoding 1701 an encoded associated picture that is associated with the intra prediction picture and decoding 1702 an intra prediction picture comprising at least two sub-units. The at least two sub-units of the intra prediction picture are distributed over a set of access units starting with an access unit comprising the encoded associated picture. The at least two sub-units of the intra prediction picture may be distributed over the set of access units in a manner as illustrated in FIG. 13D, for example. The intra prediction picture (for example, the above-mentioned DIDR picture) and the encoded associated picture may represent the same picture. The sub-units are portions representing portions of a picture. The sub-units may be NAL units, in particular, VCL NAL units.

In the following possible adaptations of the Versatile Video Coding (VVC) standard in order to include the inventive ideas presented herein are described. The methods described-above with reference to FIGS. 14 to 17 may be implemented thereby in the standard. Particularly, the newly introduced DIDR picture and DDR (or more generally a picture associated and collocated with a DIDR picture, see Embodiment 3) picture are explicitly addressed in the definitions, the sequence parameter set and the general tile/slice group header syntax. NAL unit type codes are extended in order to take DDR and DIDR pictures into account. The order of access units and association to CVSs as well as the order of NAL units and coded pictures and their association to access units and the order of VCL NAL units and association to coded pictures are modified to take DDR and DIDR pictures into account. The decoding process is adapted accordingly. Implementation can be readily made in the video coding system 40 illustrated in FIG. 1B and the CODEC system 200 illustrated in FIG. 2 and, where appropriate, the encoder 300 illustrated in FIG. 3 and the decoder 400 illustrated in FIG. 4, respectively.

Detailed Description of Embodiment 1 of the Disclosure

This clause documents an embodiment of some of the aspects the disclosure as summarized above. The description is relative to the basis text, which is the latest VVC WD. Only the delta is described, while the texts in the basis text that are not mentioned below apply as they are.

Definitions access unit: A set of NAL units that are associated with each other according to a specified classification rule, are consecutive in decoding order, and contain exactly one coded picture and, optionally, a subset of a DIDR picture.

coded video sequence (CVS): A sequence of access units that consists, in decoding order, of an IRAP access unit with NoIncorrectPicOutputFlag equal to 1 or DDR access unit with NoIncorrectPicOutputFlag equal to 1, followed by zero or more access units that are not IRAP access units with NoIncorrectPicOutputFlag equal to 1 or DDR access unit with NoIncorrectPicOutputFlag equal to 1, including all subsequent access units up to but not including any subsequent access unit that is an IRAP access unit with NoIncorrectPicOutputFlag equal to 1 or DDR access unit with NoIncorrectPicOutputFlag equal to 1.

NOTE—An IRAP access unit may be an IDR access unit, a CRA access unit, or a DDR access unit. The value of NoIncorrectPicOutputFlag is equal to 1 for each IDR access unit. The value of NoIncorrectPicOutputFlag is equal to 1 for each CRA access unit that is the first access unit in the bitstream in decoding order, is the first access unit that follows an end of sequence NAL unit in decoding order, or has HandleCraAsCvsStartFlag equal to 1. The value of NoIncorrectPicOutputFlag is equal to 1 for each DDR access unit that is the first access unit in the bitstream in decoding order, is the first access unit that follows an end of sequence NAL unit in decoding order, or has HandleDdrAsCvsStartFlag equal to 1.

distributed decoding refresh (DDR) access unit: An access unit in which the coded picture is a DDR picture.

distributed decoding refresh (DDR) picture: A picture for which each VCL NAL unit has nal_unit_type equal to DDR_NUT.

NOTE—A DDR picture may be the first picture in the bitstream in decoding order, may be the first picture of a CVS in decoding order, and may appear elsewhere in the bitstream. A DDR picture does not have any associated leading pictures. Each DDR picture is associated with a DIDR picture and vice versa.

distributed instantaneous decoding refresh (DIDR) picture: A picture for which each VCL NAL unit has nal_unit_type equal to IDR_NO_LP and didr_pic_flag equal to 1.

NOTE—A DIDR picture is associated with a DDR picture and vice versa. An associated pair of DIDR picture and DDR picture are coded presentations of the same picture, and they have the same value of picture order count. A DIDR picture is coded with intra prediction only and coded with at least two VCL NAL units. The VCL NAL units of a DIDR picture are distributed among a set of access units starting from the access unit containing the associated DDR picture, up to but not including any subsequent access unit that is an DDR access unit or an IRAP access unit. A DIDR picture is for inter prediction reference only and not for output.

instantaneous decoding refresh (IDR) picture: An IRAP picture for which each VCL NAL unit has nal_unit_type equal to IDR_W_RADL or IDR_N_LP and didr_pic_flag equal to 0.

intra random access point (IRAP) picture: A coded picture for which each VCL NAL unit has nal_unit_type in the range of IDR_W_RADL to RSV_IRAP_VCL12, inclusive.

NOTE—An IRAP picture does not refer to any pictures other than itself for inter prediction in its decoding process, and may be a CRA picture or an IDR picture. The first picture in the bitstream in decoding order must be an IRAP picture. Provided the necessary parameter sets are available when they need to be activated, the IRAP picture and all subsequent non-RASL pictures in decoding order can be correctly decoded without performing the decoding process of any pictures that precede the IRAP picture in decoding order.

random access skipped leading (RASL) picture: A coded picture for which each VCL NAL unit has nal_unit_type equal to RASL_NUT.

NOTE—All RASL pictures are leading pictures of an associated CRA picture. When the associated CRA picture has NoIncorrectPicOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated CRA picture.

Abbreviations

CRA Clean Random Access
DDR Distributed Decoding Refresh
DIDR Distributed Instantaneous Decoding Refresh
IDR Instantaneous Decoding Refresh
IRAP Intra Random Access Point
RADL Random Access Decodable Leading (Picture)
RASL Random Access Skipped Leading (Picture)
STSA Step-wise Temporal Sub-layer Access Sequence Parameter Set RBSP Syntax

|  | Descriptor |
| --- | --- |
| seq_parameter_set_rbsp( ) { |  |
|   sps_max_sub_layers_minus1 | u (3) |
|   sps_reserved_zero_5bits | u (5) |
|   profile_tier_level( sps_max_sub_layers_minus1 ) |  |
|   sps_didr_pics_present_flag | u (1) |
|   sps_seq_parameter_set_id | ue (v) |
|   chroma_format_idc | ue (v) |
|   if( chroma_format_idc == 3 ) |  |
|     separate_colour_plane_flag | u (1) |

General Tile Group Header Syntax

|  | Descriptor |
| --- | --- |
| tile_group_header( ) { |  |
|   tile_group_pic_parameter_set_id | ue (v) |
|   if( rect_tile_group_flag \|\| NumTilesInPic > 1 ) |  |
|     tile_group_address | u (v) |
|   if( !rect_tile_group_flag && |  |
|     !single_tile_per_tile_group_flag ) |  |
|     num_tiles_in_tile_group_minus1 | ue (v) |
|   if( sps_didr_pics_present_flag && |  |
|     nal_unit_type == IDR_N_LP ) |  |
|     didr_pic_flag | u (1) |
|   tile_group_type | ue (v) |
|   tile_group_pic_order_cnt_lsb | u (v) |

The above-listed functions of the high-level syntax can be read by a decoding process from the bitstream performed, for example, by a decoder 400 as shown in FIG. 4. In the following, NAL unit header semantics employed during encoding and decoding processing, for example, by an encoder 300 as shown in FIG. 3 and a decoder 400 as shown in FIG. 4 is described. In the following, NAL unit header semantics employed during encoding and decoding processing, for example, by an encoder 300 as shown in FIG. 3 and a decoder 400 as shown in FIG. 4 is described.

NAL Unit Header Semantics forbidden_zero_bit shall be equal to 0.

nal_unit_type specifies the type of RBSP data structure contained in the NAL unit as specified in Table 7-1.

NAL units that have nal_unit_type in the range of UNSPEC28 . . . UNSPEC31, inclusive, for which semantics are not specified, shall not affect the decoding process specified in this Specification.

NOTE 1—NAL unit types in the range of UNSPEC-28 . . . UNSPEC31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded tile group of a non-STSA trailing picture tile_group_layer_rbsp ( ) | VCL |
| 1 | STSA_NUT | Coded tile group of an STSA picture tile_group_layer_rbsp ( ) | VCL |
| 2 | RASL_NUT | Coded tile group of a RASL picture tile_group_layer_rbsp ( ) | VCL |
| 3 | RADL_NUT | Coded tile group of a RADL picture tile_group_layer_rbsp ( ) | VCL |
| 4 . . . 7 | RSV_VCL_4 . . . RSV_VCL_7 | Reserved non-IRAP VCL NAL unit types | VCL |
| 8 | IDR_W_RADL | Coded tile group of an IDR picture tile_group_layer_rbsp ( ) | VCL |
| 9 | IDR_N_LP | Coded tile group of an IDR or a DIDR picture tile_group_layer_rbsp ( ) | VCL |
| 10 | CRA_NUT | Coded tile group of a CRA picture tile_group_layer_rbsp ( ) | VCL |
| 11 12 | RSV_IRAP_VCL11 RSV_IRAP_VCL12 | Reserved IRAP VCL NAL unit types | VCL |
| 13 | DDR_NUT | Coded tile group of a DDR picture tile_group_layer_rbsp ( ) | VCL |
| 14 . . . 15 | RSV_VCL14 . . . RSV_VCL15 | Reserved non-IRAP VCL NAL unit types | VCL |
| 16 | SPS_NUT | Sequence parameter set seq_parameter_set_rbsp( ) | non-VCL |

Each DDR picture is associated with a DIDR picture in the same CVS, and vice versa. A DDR picture and its associated DIDR picture have the same values of PicOrderCnt.

There shall be no pictures present in the bitstream that precede an DDR picture in output order and for which the VCL NAL units succeed the VCL NAL units of the DDR picture in decoding order.

A DIDR picture shall have at least two VCL NAL units, and the VCL NAL units of a DIDR picture shall be included in at least two access units.

nuh_temporal_id_plus1 minus 1 specifies a temporal identifier for the NAL unit. The value of nuh_temporal_id_plus1 shall not be equal to 0.

The variable TemporalId is derived as follows:

$$\text{TemporalId} = \text{nuh\_temporal\_id\_plus1} - 1 \quad (7\text{-}1)$$

When nal_unit_type is in the range of IDR_W_RADL to RSV_IRAP_VCL12, inclusive, or equal to DDR_NUT, or equal to IDR_N_LP with didr_pic_flag equal to 1, TemporalId shall be equal to 0.

The value of TemporalId shall be the same for all VCL NAL units of an access unit that are not VCL NAL units of a DIDR picture. The value of TemporalId of a coded picture or an access unit is the value of the TemporalId of the VCL NAL units of the coded picture entirely included in the access unit.

Order of Access Units and Association to CVSs

A bitstream conforming to this Specification consists of one or more CVSs.

A CVS consists of one or more access units. The order of NAL units and coded pictures and their association to access units is described in clause 7.4.2.4.4 of the standard.

The first access unit of a CVS is an IRAP access unit with NoIncorrectPicOutputFlag equal to 1 or a DDR access unit with NoIncorrectPicOutputFlag equal to 1.

It is a requirement of bitstream conformance that, when present, the next access unit after an access unit that contains an end of sequence NAL unit or an end of bitstream NAL unit shall be an IRAP access unit or a DDR access unit.

The access unit containing the first VCL NAL unit of a DIDR picture shall not precede the DDR access unit containing the DDR picture associated with the DIDR picture. The access unit containing the last VCL NAL unit of a DIDR picture shall precede the first DDR or IRAP access unit, when present, that succeeds the DDR access unit containing the DDR picture associated with the DIDR picture.

Order of NAL Units and Coded Pictures and their Association to Access Units

This clause specifies the order of NAL units and coded pictures and their association to access units for CVSs that conform to one or more of the profiles specified above and that are decoded using the above-described decoding process and specified in clauses 2 through 10 of the standard.

An access unit consists of one coded picture, zero or more VCL NAL units and zero or more non-VCL NAL units. The association of VCL NAL units to coded pictures is described in clause 7.4.2.4.5 of the standard.

The first access unit in the bitstream starts with the first NAL unit of the bitstream. The bitstream may be provided by an encoder 300 after entropy coding 331 as illustrated in FIG. 3. The bitstream may be received by a decoder 400 for decoding including an entropy decoding component 433 as illustrated in FIG. 4.

Let firstNalUnit be the first VCL NAL unit of a coded picture other than a DIDR picture. When there is one or more VCL NAL units of an DIDR picture preceding firstNalUnit and there is no VCL NAL unit between the last of these VCL NAL units and firstNalUnit, let firstNalUnit be the first of these NAL units. The first of any of the following NAL units preceding firstNalUnit and succeeding the last VCL NAL unit preceding firstNalUnit, if any, specifies the start of a new access unit:

access unit delimiter NAL unit (when present),
SPS NAL unit (when present),
PPS NAL unit (when present),
Prefix SEI NAL unit (when present), NAL units with nal_unit_type in the range of RSV_NVCL24 . . . RSV_NVCL25 (when present), NAL units with nal_unit_type in the range of UNSPEC-28 . . . UNSPEC29 (when present). NOTE—The first NAL unit preceding firstNalUnit and succeeding the last VCL NAL unit preceding firstNalUnit, if any, can only be one of the above-listed NAL units.

When there is none of the above NAL units preceding firstNalUnit and succeeding the last VCL NAL preceding firstNalUnit, if any, firstNalUnit starts a new access unit.

NOTE—A VCL NAL unit of a DIDR picture, when present in access unit, must precede the first VCL NAL unit of the coded picture entirely in the same access unit. The VCL NAL units of a DIDR picture must be included in at least two access units.

The order of the VCL NAL units and non-VCL NAL units within an access unit shall obey the following constraints:

When an access unit delimiter NAL unit is present, it shall be the first NAL unit. There shall be at most one access unit delimiter NAL unit in any access unit.

When any SPS NAL units, PPS NAL units, prefix SEI NAL units, NAL units with nal_unit_type in the range of RSV_NVCL24 . . . RSV_NVCL25, or NAL units with nal_unit_type in the range of UNSPEC28 . . . UNSPEC29 are present, they shall not follow the last VCL NAL unit of the access unit.

NAL units having nal_unit_type equal to SUFFIX_SEI_NUT or in the range of RSV_NVCL26 . . . RSV_NVCL27, or in the range of UNSPEC30 . . . UNSPEC31 shall not precede the first VCL NAL unit of the access unit.

When an end of sequence NAL unit is present, it shall be the last NAL unit among all NAL units within the access unit other than an end of bitstream NAL unit (when present).

When an end of bitstream NAL unit is present, it shall be the last NAL unit in the access unit.

When a VCL NAL unit of a DIDR picture is present, it shall precede the first VCL NAL unit of the coded picture entirely in the access unit.

Order of VCL NAL Units and Association to Coded Pictures

This clause specifies the order of VCL NAL units and association to coded pictures.

Each VCL NAL unit is part of a coded picture.

The order of the VCL NAL units within a coded picture is constrained as follows:

Let tileGroupAddrA and tileGroupAddrB be the tile_group_address values of any two tile group NAL units A and B within the same coded picture. When tileGroupAddrA is less than tileGroupAddrB, A shall precede B.

The above-described orders may be observed during coding by means of a CODEC system 200 illustrated in FIG. 2 and the encoder 300 illustrated in FIG. 3 and the decoder 400 illustrated in FIG. 4, respectively.

Sequence parameter set RBSP semantics sps_didr_pics_present_flag equal to 1 specifies that there may be DIDR pictures present in the CVS. sps_didr_pics_present_flag equal to 0 specifies that there is no DIDR picture present in the CVS.

General Tile Group Header Semantics

When present, the value of each of the tile group header syntax elements tile_group_pic_parameter_set_id, tile_group_pic_order_cnt_lsb, and tile_group_temporal_mvp_enabled_flag shall be the same in all tile group headers of a coded picture.

didr_pic_flag equal to 1 specifies the coded picture is a DIDR picture. didr_pic_flag equal to 0 specifies the coded picture is not a DIDR picture. When not present, the value of didr_pic_flag is inferred to be equal to 0.

tile_group_type specifies the coding type of the tile group according to Table 7-3.

TABLE 7-3

| Name association to tile_group_type | |
|---|---|
| tile_group_type | Name of tile_group_type |
| 0 | B (B tile group) |
| 1 | P (P tile group) |
| 2 | I (I tile group) |

When nal_unit_type is in the range of IDR_W_RADL to RSV_IRAP_VCL12, inclusive, tile_group_type shall be equal to 2.

The above-described semantics may be observed during coding by means of a CODEC system 200 illustrated in FIG. 2 and the encoder 300 illustrated in FIG. 3 and the decoder 400 illustrated in FIG. 4, respectively.

General Decoding Process (General)

Input to this process is a bitstream. Output of this process is a list of decoded pictures.

The bitstream may be provided by an encoder 300 after entropy coding 331 as illustrated in FIG. 3. The bitstream may be received by a decoder 400 for decoding including an entropy decoding component 433 as well as an inverse transform and quantization component 429 for reconstructing residual blocks as illustrated in FIG. 4. Reconstructed residual blocks and/or prediction blocks may be supplied to an intra-picture prediction component 417 for reconstruction of image blocks based on intra-prediction operations. Alternatively, a motion compensation component 421 employs motion vectors from a reference block to generate a prediction block and applies a residual block to the result to reconstruct an image block.

The decoding process is specified such that all decoders that conform to a specified profile and level will produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements of this Specification. The output pictures may be obtained from a Decoded Picture Buffer, DCP, for example the DCP 423 of the decoder 400 shown in FIG. 4. According to the example shown in FIG. 4 the DCP 423 buffers decoded pictures that were processed by some in-loop filters 425, for example, in order to remove block artifacts. The in-loop filters 424 may comprise the in-loop filter 900 comprising a noise suppression filter 941, a deblocking filter 943, a sample adaptive offset (SAO) filter 945, and an adaptive loop filter 947 as illustrated in FIG. 9. For each DDR picture in the bitstream, the following applies:

If the access unit containing the picture is the first access unit in the bitstream in decoding order, or the first access unit that follows an end of sequence NAL unit in decoding order, the variable NoIncorrectPicOutputFlag is set equal to 1.

NOTE—When splicing two bitstreams together where the second bitstream starts with a DDR access unit, the bitstream splicer needs to make sure that there is an end of sequence NAL unit or an end of bitstream NAL unit immediately preceding the DDR access unit in the splicing result.

Otherwise, if some external means not specified in this Specification is available to set the variable HandleDdrAsCvsStartFlag to a value for the picture, HandleDdrAsCvsStartFlag is set equal to the value provided by the external means and NoIncorrectPicOutputFlag is set equal to HandleDdrAsCvsStartFlag.

Otherwise, the variables HandleDdrAsCvsStartFlag and NoIncorrectPicOutputFlag are both set equal to 0.

NOTE 2—The above operations, for IRAP pictures and DDR pictures, are needed to identify the CVSs in the bitstream.

For each CVS in the bitstream, the variable HighestTid, which identifies the highest temporal sub-layer to be decoded, is specified as follows:

If some external means, not specified in this Specification, is available to set HighestTid, HighestTid is set by the external means.

Otherwise, HighestTid is set equal to sps_max_sub_layers_minus1.

For each CVS in the bitstream, the sub-bitstream extraction process as specified in clause 10 of the standard is applied with the CVS and HighestTid as inputs, and the output is assigned to a bitstream referred to as CvsToDecode. After that, the instances of CvsToDecode of all the CVSs are concatenated, in decoding order, and the result is assigned to the bitsream BitstreamToDecode.

Clause 8.1.2 of the standard is repeatedly invoked for each CVS in BitstreamToDecode in decoding order.

CVS Decoding Process

Input to this process is a CVS. Output of this process is a list of decoded pictures.

Clause 8.1.3 of the standard is repeatedly invoked for each coded picture in BitstreamToDecode in decoding order.

Decoding Process for a Coded Picture

The decoding processes specified in this clause apply to each coded picture, referred to as the current picture and denoted by the variable CurrPic, in BitstreamToDecode. This decoding process can be performed, for example, by the decoder 400 illustrated in FIG. 4 or the video decoder 30 of the video coding system 40 shown in FIG. 1B.

A DIDR picture is decoded before the decoding of the coded picture entirely in the access unit auA that also contains the last VCL NAL unit of the DIDR picture and after the decoding of the coded picture entirely in the access unit immediately preceding auA in decoding order.

Depending on the value of chroma_format_idc, the number of sample arrays of the current picture is as follows:

If chroma_format_idc is equal to 0, the current picture consists of 1 sample array $S_L$.

Otherwise (chroma_format_idc is not equal to 0), the current picture consists of 3 sample arrays $S_L$, $S_{Cb}$, $S_{Cr}$.

The decoding process for the current picture takes as inputs the syntax elements and upper-case variables from clause 7 of the standard. When interpreting the semantics of each syntax element in each NAL unit, and in the remaining part of this clause, the term "the bitstream" (or part thereof, e.g., a CVS of the bitstream) refers to BitstreamToDecode (or part thereof).

The decoding process operates as follows for the current picture CurrPic:

1. The decoding of NAL units is specified in clause 8.2 of the standard.

2. The processes in clause 8.3 of the standard specify the following decoding processes using syntax elements in the tile group header layer and above:

Variables and functions relating to picture order count are derived as specified in clause 8.3.1 of the standard. This needs to be invoked only for the first tile group of a picture.

PicOutputFlag is set as follows:

If the current picture is a RASL picture and NoIncorrectPicOutputFlag of the associated CRA picture is equal to 1, PicOutputFlag is set equal to 0.

Otherwise, if the current picture is a DIDR picture, PicOutputFlag is set equal to 0.

Otherwise, if the current picture is a DDR picture with NoIncorrectPicOutputFlag equal to 1, PicOutputFlag is set equal to 0.

Otherwise, if the current picture succeeds a DDR picture picA with NoIncorrectPicOutputFlag equal to 1 in decoding order and precedes the access unit containing the last VCL NAL unit of the DIDR picture associated with picA, PicOutputFlag is set equal to 0.

Otherwise, PicOutputFlag is set equal to 1.

At the beginning of the decoding process for each tile group of a non-IDR picture, the decoding process for reference picture lists construction specified in clause 8.3.2 of the standard is invoked for derivation of reference picture list 0 (RefPicList[0]) and reference picture list 1 (RefPicList[1]).

The decoding process for reference picture marking in clause 8.3.3 of the standard is invoked, wherein reference pictures may be marked as "unused for reference" or "used for long-term reference". This needs to be invoked only for the first tile group of a picture.

Decoding Process for Picture Order Count

Output of this process is PicOrderCntVal, the picture order count of the current picture.

Each coded picture is associated with a picture order count variable, denoted as PicOrderCntVal. The decoded pictures may be read from the DCP 423 of the decoder 400 shown in FIG. 4, for example, and output according to the picture order count.

When the current picture is not an IRAP picture with NoIncorrectPicOutputFlag equal to 1 and not a DDR picture with NoIncorrectPicOutputFlag equal to 1, the variables prevPicOrderCntLsb and prevPicOrderCntMsb are derived as follows:

Let prevTid0Pic be the previous picture in decoding order that has TemporalId equal to 0 and that is not a RASL or RADL picture.

The variable prevPicOrderCntLsb is set equal to tile_group_pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

If the current picture is an IRAP picture with NoIncorrectPicOutputFlag equal to 1 or a DDR picture with NoIncorrectPicOutputFlag equal to 1, PicOrderCntMsb is set equal to 0.

Otherwise, if the current picture is a DIDR picture, PicOrderCntMsb is set equal to that of the associated DDR picture.

Otherwise, PicOrderCntMsb is derived as follows:
if((tile_group_pic_order_cnt_lsb<prevPicOrderCntLsb) && ((prevPicOrderCntLsb−tile_group_pic_order_cnt_lsb)>(MaxPicOrderCntLsb/2)))

PicOrderCntMsb=prevPicOrderCntMsb+MaxPicOrderCntLsb (8-1)

else if((tile_group_pic_order_cnt_lsb>prevPicOrderCntLsb) && ((tile_group_pic_order_cnt_lsb−prevPicOrderCntLsb)>(MaxPicOrderCntLsb/2)))
PicOrderCntMsb=prevPicOrderCntMsb−MaxPicOrderCntLsb
else
PicOrderCntMsb=prevPicOrderCntMsb
PicOrderCntVal is derived as follows:

PicOrderCntVal=PicOrderCntMsb+tile_group_pic_order_cnt_lsb (8-2)

NOTE 1—All IRAP pictures with NoIncorrectPicOutputFlag equal to 1 and DDR pictures with NoIncorrectPicOutputFlag equal to 1 will have PicOrderCntVal equal to tile_group_pic_order_cnt_lsb since for these pictures PicOrderCntMsb is set equal to 0.

The value of PicOrderCntVal shall be in the range of $-2^{31}$ to $2^{31}-1$, inclusive.

In one CVS, the PicOrderCntVal values for any two coded pictures that are not DIDR pictures shall not be the same, and the PicOrderCntVal values for any two coded DIDR pictures shall not be the same.

Decoding Process for Reference Picture Lists Construction

This process is invoked at the beginning of the decoding process for each tile group of picture that is not an IDR picture and not a DIDR picture.

It is a requirement of bitstream conformance that for each current picture that is not an IRAP picture with NoIncorrectPicOutputFlag equal to 1 and not a DDR picture with NoIncorrectPicOutputFlag equal to 1, the value of maxPicOrderCnt−minPicOrderCnt shall be less than MaxPicOrderCntLsb/2.

Decoding Process for Reference Picture Marking

If the current picture is an IRAP picture with NoIncorrectPicOutputFlag equal to 1, a DDR picture with NoIncorrectPicOutputFlag equal to 1, or a DIDR picture, all reference pictures currently in the DPB (if any) are marked as "unused for reference".

The motion compensation component 421 and the intra prediction component 417 of the decoder 400 shown in FIG. 4 may make use of the above-mentioned reference pictures for reconstructing pictures (picture blocks).

Detailed Description of Embodiment 2 of the Disclosure

This clause documents an embodiment of some of the aspects the disclosure as summarized above. The description is relative to the basis text, which is the latest VVC WD. Oly the delta is described, while the texts in the basis text that are not mentioned below apply as they are. Updated text are marked with highlight.

Definitions access unit: A set of non-DIDR NAL units that are associated with each other according to a specified classification rule, are consecutive in decoding order, and contain exactly one coded picture.

clean decoder refresh (CDR): An IRAP access unit with NoIncorrectPicOutputFlag equal to 1 or DDR access unit with NoIncorrectPicOutputFlag equal to 1.

coded video sequence (CVS): A sequence of access units that consists, in decoding order, of a CDR access unit, followed by zero or more access units that are not CDR access units, including all subsequent access units up to but not including any subsequent access unit that is a CDR access unit.

NOTE—An IRAP access unit may be an IDR access unit, a CRA access unit, or a DDR access unit. The value of NoIncorrectPicOutputFlag is equal to 1 for each IDR access unit. The value of NoIncorrectPicOutputFlag is equal to 1 for each CRA access unit that is the first access unit in the bitstream in decoding order, is the first access unit that follows an end of sequence NAL unit in decoding order, or has HandleCraAsCvsStartFlag equal to 1. The value of NoIncorrectPicOutputFlag is equal to 1 for each DDR access unit that is the first access unit in the bitstream in decoding order, is the first access unit that follows an end of sequence NAL unit in decoding order, or has HandleDdrAsCvsStartFlag equal to 1.

distributed decoding refresh (DDR) access unit: An access unit in which the coded picture is a DDR picture.

distributed decoding refresh (DDR) picture: A picture for which each VCL NAL unit has nal_unit_type equal to DDR_NUT.

distributed instantaneous decoding refresh (DIDR) picture: A picture for which each VCL NAL unit has nal_unit_type equal to IDR_NO_LP and didr_pic_flag equal to 1.

NOTE—A DIDR picture is associated with a DDR picture and vice versa. DIDR picture and DDR picture is coded presentations of one of preceding to DDR pictures, and they could have the same value of picture order count. A DIDR picture is coded with intra prediction only and coded with at least two VCL NAL units. The VCL NAL units of a DIDR picture are distributed among a set of access units preceeding the access unit containing the associated DDR picture, up to but not including any subsequent access unit that is an DDR access unit or an IRAP access unit. A DIDR picture is for inter prediction reference only and not for output.

NOTE—A DIDR picture may be the first picture in the bitstream in decoding order, may be the first picture of a CVS in decoding order, and may appear elsewhere in the bitstream. A DIDR picture does not have any associated leading pictures. Each DIDR picture is associated with a DDR picture and vice versa.

DIDR access unit: A set of DIDR NAL units that are associated with each other according to a specified classification rule and contain exactly one coded picture.

instantaneous decoding refresh (IDR) picture: An IRAP picture for which each VCL NAL unit has nal_unit_type equal to IDR_W_RADL or IDR_N_LP and didr_pic_flag equal to 0.

NOTE—An IDR picture does not refer to any pictures other than itself for inter prediction in its decoding process, and may be the first picture in the bitstream in decoding order, or may appear later in the bitstream. Each IDR picture is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

intra random access point (IRAP) picture: A coded picture for which each VCL NAL unit has nal_unit_type in the range of IDR_W_RADL to RSV_IRAP_VCL12, inclusive.

random access skipped leading (RASL) picture: A coded picture for which each VCL NAL unit has nal_unit_type equal to RASL_NUT.

NOTE—All RASL pictures are leading pictures of an associated CRA picture. When the associated CRA picture has NoIncorrectPicOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated CRA picture.

Abbreviations

For the purposes of this Recommendation International Standard, the following abbreviations apply.
CRA Clean Random Access
DDR Distributed Decoding Refresh
DIDR Distributed Instantaneous Decoding Refresh
IDR Instantaneous Decoding Refresh
IRAP Intra Random Access Point
RADL Random Access Decodable Leading (Picture)
RASL Random Access Skipped Leading (Picture)
STSA Step-wise Temporal Sub-layer Access Sequence Parameter Set RBSP Syntax

|  | Descriptor |
|---|---|
| seq_parameter_set_rbsp( ) { |  |
|   sps_max_sub_layers_minus1 | u (3) |
|   sps_reserved_zero_5bits | u (5) |
|   profile_tier_level( sps_max_sub_layers_minus1 ) |  |
|   sps_didr_pics_present_flag | u (1) |
|   sps_seq_parameter_set_id | ue (v) |

General Tile Group Header Syntax

|  | Descriptor |
|---|---|
| tile_group_header( ) { |  |
|   tile_group_pic_parameter_set_id | ue (v) |
|   if( rect_tile_group_flag \|\| NumTilesInPic > 1 ) |  |
|     tile_group_address | u (v) |

-continued

|  | Descriptor |
|---|---|
|   if( !rect_tile_group_flag && |  |
|     !single_tile_per_tile_group_flag ) |  |
|     num_tiles_in_tile_group_minus1 | ue (v) |
|   if( sps_didr_pics_present_flag && |  |
|     nal_unit_type == IDR_N_LP ) |  |
|     didr_pic_flag | u (1) |
|   tile_group_type | ue (v) |
|   tile_group_pic_order_cnt_lsb | u (v) |

The above-listed functions of the high-level syntax can be read by a decoding process from the bitstream performed, for example, by a decoder 400 as shown in FIG. 4. In the following, NAL unit header semantics employed during encoding and decoding processing, for example, by an encoder 300 as shown in FIG. 3 and a decoder 400 as shown in FIG. 4 is described.

NAL Unit Header Semantics forbidden_zero_bit shall be equal to 0.

nal_unit_type specifies the type of RBSP data structure contained in the NAL unit as specified in Table 7-1.

NAL units that have nal_unit_type in the range of UNSPEC28 . . . UNSPEC31, inclusive, for which semantics are not specified, shall not affect the decoding process specified in this Specification.

NOTE 1—NAL unit types in the range of UNSPEC-28 . . . UNSPEC31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the decoding units of the bitstream (as specified in Annex C), decoders shall ignore (remove from the bitstream and discard) the contents of all NAL units that use reserved values of nal_unit_type.

NOTE 2—This requirement allows future definition of compatible extensions to this Specification.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded tile group of a non-STSA trailing picture tile_group_layer_rbsp ( ) | VCL |
| 1 | STSA_NUT | Coded tile group of an STSA picture tile_group_layer_rbsp ( ) | VCL |
| 2 | RASL_NUT | Coded tile group of a RASL picture tile_group_layer_rbsp ( ) | VCL |
| 3 | RADL_NUT | Coded tile group of a RADL picture tile_group_layer_rbsp ( ) | VCL |
| 4 . . . 7 | RSV_VCL_4 . . . RSV_VCL_7 | Reserved non-IRAP VCL NAL unit types | VCL |

TABLE 7-1-continued

NAL unit type codes and NAL unit type classes

| nal_unit_type | Name of nal_unit_type | Content of NAL unit and RBSP syntax structure | NAL unit type class |
|---|---|---|---|
| 8 | IDR_W_RADL | Coded tile group of an IDR picture tile_group_layer_rbsp ( ) | VCL |
| 9 | IDR_N_LP | Coded tile group of an IDR or a DIDR picture tile_group_layer_rbsp ( ) | VCL |
| 10 | CRA_NUT | Coded tile group of a CRA picture tile_group_layer_rbsp ( ) | VCL |
| 11 12 | RSV_IRAP_VCL11 RSV_IRAP_VCL12 | Reserved IRAP VCL NAL unit types | VCL |
| 13 | DDR_NUT | Coded tile group of a DDR picture tile_group_layer_rbsp ( ) | VCL |
| 14 . . . 15 | RSV_VCL14 . . . RSV_VCL15 | Reserved non-IRAP VCL NAL unit types | VCL |

Each DDR picture is associated with a DIDR picture in the same CVS, and vice versa.

There shall be no pictures present in the bitstream that precede an DDR picture in output order and for which the VCL NAL units succeed the VCL NAL units of the DDR picture in decoding order.

A DIDR picture shall have at least two VCL NAL units, and the VCL NAL units of a DIDR picture shall be included in at least two access units.

nuh_temporal_id_plus1 minus 1 specifies a temporal identifier for the NAL unit. The value of nuh_temporal_id_plus1 shall not be equal to 0.

The variable TemporalId is derived as follows:

TemporalId=nuh_temporal_id_plus1−1 (7-1)

When nal_unit_type is in the range of IDR_W_RADL to RSV_IRAP_VCL12, inclusive, or equal to DDR_NUT, or equal to IDR_N_LP with didr_pic_flag equal to 1, TemporalId shall be equal to 0.

Order of Access Units and Association to CVSs

A bitstream conforming to this Specification consists of one or more CVSs.

A CVS consists of one or more access units. The order of NAL units and coded pictures and their association to access units is described in clause 7.4.2.4.4 of the standard.

The first access unit of a CVS is a CDR access unit.

It is a requirement of bitstream conformance that, when present, the next access unit after an access unit that contains an end of sequence NAL unit or an end of bitstream NAL unit shall be an IRAP access unit or a DDR access unit.

The access unit containing the first VCL NAL unit of a DIDR picture shall not precede the DDR access unit containing the DDR picture associated with the DIDR picture. The access unit containing the last VCL NAL unit of a DIDR picture shall precede the first DDR or IRAP access unit, when present, that succeeds the DDR access unit containing the DDR picture associated with the DIDR picture.

Order of NAL Units and Coded Pictures and their Association to Access Units

This clause specifies the order of NAL units and coded pictures and their association to access units for CVSs that conform to one or more of the profiles specified above and that are decoded using the decoding process described above and specified in clauses 2 through 10 of the standard.

An access unit consists of one coded picture, zero or more VCL NAL units and zero or more non-VCL NAL units. The association of VCL NAL units to coded pictures is described in clause 7.4.2.4.5 of the standard.

The first access unit in the bitstream starts with the first NAL unit of the bitstream.

The bitstream may be provided by an encoder 300 after entropy coding 331 as illustrated in FIG. 3. The bitstream may be received by a decoder 400 for decoding including an entropy decoding component 433 as illustrated in FIG. 4.

Let firstNalUnit be the first VCL NAL unit of a coded picture other than a DIDR picture. When there is one or more VCL NAL units of an DIDR picture preceding firstNalUnit and there is no VCL NAL unit between the last of these VCL NAL units and firstNalUnit, let firstNalUnit be the first of these NAL units. The first of any of the following NAL units preceding firstNalUnit and succeeding the last VCL NAL unit preceding firstNalUnit, if any, specifies the start of a new access unit:

access unit delimiter NAL unit (when present),
SPS NAL unit (when present),
PPS NAL unit (when present),
Prefix SEI NAL unit (when present),
NAL units with nal_unit_type in the range of RSV_NVCL24 . . . RSV_NVCL25 (when present),
NAL units with nal_unit_type in the range of UNSPEC28 . . . UNSPEC29 (when present).

NOTE—The first NAL unit preceding firstNalUnit and succeeding the last VCL NAL unit preceding firstNalUnit, if any, can only be one of the above-listed NAL units.

When there is none of the above NAL units preceding firstNalUnit and succeeding the last VCL NAL preceding firstNalUnit, if any, firstNalUnit starts a new access unit.

NOTE—A VCL NAL unit of a DIDR picture, when present in access unit, must precede the first VCL NAL unit of the coded picture entirely in the same access unit. The VCL NAL units of a DIDR picture must be included in at least two access units.

The order of the VCL NAL units and non-VCL NAL units within an access unit shall obey the following constraints:

When an access unit delimiter NAL unit is present, it shall be the first NAL unit. There shall be at most one access unit delimiter NAL unit in any access unit.

When any SPS NAL units, PPS NAL units, prefix SEI NAL units, NAL units with nal_unit_type in the range of RSV_NVCL24 . . . RSV_NVCL25, or NAL units with nal_unit_type in the range of UNSPEC28 . . . UNSPEC29 are present, they shall not follow the last VCL NAL unit of the access unit.

NAL units having nal_unit_type equal to SUFFIX_SEI_NUT or in the range of RSV_NVCL26 . . . RSV_NVCL27, or in the range of UNSPEC30 . . . UNSPEC31 shall not precede the first VCL NAL unit of the access unit.

When an end of sequence NAL unit is present, it shall be the last NAL unit among all NAL units within the access unit other than an end of bitstream NAL unit (when present).

When an end of bitstream NAL unit is present, it shall be the last NAL unit in the access unit.

When a VCL NAL unit of a DIDR picture is present, it shall precede the first VCL NAL unit of the coded picture entirely in the access unit.

Order of VCL NAL Units and Association to Coded Pictures

This clause specifies the order of VCL NAL units and association to coded pictures.

Each VCL NAL unit is part of a coded picture.

The order of the VCL NAL units within a coded picture is constrained as follows:

Let tileGroupAddrA and tileGroupAddrB be the tile_group_address values of any two tile group NAL units A and B within the same coded picture. When tileGroupAddrA is less than tileGroupAddrB, A shall precede B.

The above-described orders may be observed during coding by means of a CODEC system 200 illustrated in FIG. 2 and the encoder 300 illustrated in FIG. 3 and the decoder 400 illustrated in FIG. 4, respectively.

Sequence Parameter Set RBSP Semantics sps_max_sub_layers_minus1 plus 1 specifies the maximum number of temporal sub-layers that may be present in each CVS referring to the SPS. The value of sps_max_sub_layers_minus1 shall be in the range of 0 to 6, inclusive.

sps_reserved_zero_5bits shall be equal to 0 in bitstreams conforming to this version of this Specification. Other values for sps_reserved_zero_5bits are reserved for future use by ITU-T|ISO/IEC.

sps_didr_pics_present_flag equal to 1 specifies that there may be DIDR pictures present in the CVS. sps_didr_pics_present_flag equal to 0 specifies that there is no DIDR picture present in the CVS.

General Tile Group Header Semantics

When present, the value of each of the tile group header syntax elements tile_group_pic_parameter_set_id, tile_group_pic_order_cnt_lsb, and tile_group_temporal_mvp_enabled_flag shall be the same in all tile group headers of a coded picture.

didr_pic_flag equal to 1 specifies the coded picture is a DIDR picture. didr_pic_flag equal to 0 specifies the coded picture is not a DIDR picture. When not present, the value of didr_pic_flag is inferred to be equal to 0.

The above-described semantics may be observed during coding by means of a CODEC system 200 illustrated in FIG. 2 and the encoder 300 illustrated in FIG. 3 and the decoder 400 illustrated in FIG. 4, respectively.

General Decoding Process

General

Input to this process is a bitstream. Output of this process is a list of decoded pictures.

The bitstream may be provided by an encoder 300 after entropy coding 331 as illustrated in FIG. 3. The bitstream may be received by a decoder 400 for decoding including an entropy decoding component 433 as well as an inverse transform and quantization component 429 for reconstructing residual blocks as illustrated in FIG. 4. Reconstructed residual blocks and/or prediction blocks may be supplied to an intra-picture prediction component 417 for reconstruction of image blocks based on intra-prediction operations. Alternatively, a motion compensation component 421 employs motion vectors from a reference block to generate a prediction block and applies a residual block to the result to reconstruct an image block.

The decoding process is specified such that all decoders that conform to a specified profile and level will produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements of this Specification. The output pictures may be obtained from a Decoded Picture Buffer, DCP, for example the DCP 423 of the decoder 400 shown in FIG. 4. According to the example shown in FIG. 4 the DCP 423 buffers decoded pictures that were processed by some in-loop filters 425, for example, in order to remove block artifacts. The in-loop filters 424 may comprise the in-loop filter 900 comprising a noise suppression filter 941, a deblocking filter 943, a sample adaptive offset (SAO) filter 945, and an adaptive loop filter 947 as illustrated in FIG. 9.

For each IRAP picture in the bitstream, the following applies:

If the picture is an IDR picture, the first picture in the bitstream in decoding order, or the first picture that follows an end of sequence NAL unit in decoding order, the variable NoIncorrectPicOutputFlag is set equal to 1.

Otherwise, if some external means not specified in this Specification is available to set the variable HandleCraAsCvsStartFlag to a value for the picture, HandleCraAsCvsStartFlag is set equal to the value provided by the external means and NoIncorrectPicOutputFlag is set equal to HandleCraAsCvsStartFlag.

Otherwise, HandleCraAsCvsStartFlag and NoIncorrectPicOutputFlag are both set equal to 0.

For each DDR picture in the bitstream, the following applies:

If the access unit containing the picture is the first access unit in the bitstream in decoding order, or the first access unit that follows an end of sequence NAL unit in decoding order, the variable NoIncorrectPicOutputFlag is set equal to 1.

NOTE—When splicing two bitstreams together where the second bitstream starts with a DDR access unit, the bitstream splicer needs to make sure that there is an end of sequence NAL unit or an end of bitstream NAL unit immediately preceding the DDR access unit in the splicing result.

Otherwise, if some external means not specified in this Specification is available to set the variable HandleDdrAsCvsStartFlag to a value for the picture, HandleDdrAsCvsStartFlag is set equal to the value provided by the external means and NoIncorrectPicOutputFlag is set equal to HandleDdrAsCvsStartFlag.

Otherwise, the variables HandleDdrAsCvsStartFlag and NoIncorrectPicOutputFlag are both set equal to 0.

NOTE 2—The above operations, for IRAP pictures and DDR pictures, are needed to identify the CVSs in the bitstream.

For each CVS in the bitstream, the variable HighestTid, which identifies the highest temporal sub-layer to be decoded, is specified as follows:
  If some external means, not specified in this Specification, is available to set HighestTid, HighestTid is set by the external means.
  Otherwise, HighestTid is set equal to sps_max_sub_layers_minus1.

For each CVS in the bitstream, the sub-bitstream extraction process as specified in clause 10 of the standard is applied with the CVS and HighestTid as inputs, and the output is assigned to a bitstream referred to as CvsToDecode. After that, the instances of CvsToDecode of all the CVSs are concatenated, in decoding order, and the result is assigned to the bitsream BitstreamToDecode.

Clause 8.1.2 of the standard is repeatedly invoked for each CVS in BitstreamToDecode in decoding order.

CVS Decoding Process

Input to this process is a CVS. Output of this process is a list of decoded pictures.

Clause 8.1.3 of the standard is repeatedly invoked for each coded picture in BitstreamToDecode in decoding order.

Decoding Process for a Coded Picture

The decoding processes specified in this clause apply to each coded picture, referred to as the current picture and denoted by the variable CurrPic, in BitstreamToDecode. This decoding process can be performed, for example, by the decoder 400 illustrated in FIG. 4 or the video decoder 30 of the video coding system 40 shown in FIG. 1B.

A DIDR picture is decoded before the decoding of the coded picture entirely in the access unit auA that also contains the last VCL NAL unit of the DIDR picture and after the decoding of the coded picture entirely in the access unit immediately preceding auA in decoding order.

The decoding process operates as follows for the current picture CurrPic:
  1. The decoding of NAL units is specified in clause 8.2 of the standard.
  2. The processes in clause 8.3 of the standard specify the following decoding processes using syntax elements in the tile group header layer and above:
    Variables and functions relating to picture order count are derived as specified in clause 8.3.1 of the standard. This needs to be invoked only for the first tile group of a picture.
    PicOutputFlag is set as follows:
      If the current picture is a RASL picture and NoIncorrectPicOutputFlag of the associated CRA picture is equal to 1, PicOutputFlag is set equal to 0.
      Otherwise, if the current picture is a DIDR picture, PicOutputFlag is set equal to 0.
      Otherwise, if the current picture is a DDR picture with NoIncorrectPicOutputFlag equal to 1, PicOutputFlag is set equal to 1.
      Otherwise, if the current picture succeeds a DDR picture picA with NoIncorrectPicOutputFlag equal to 1 in decoding order and precedes the access unit containing the last VCL NAL unit of the DIDR picture associated with picA, PicOutputFlag is set equal to 0.
      Otherwise, PicOutputFlag is set equal to 1.
    At the beginning of the decoding process for each tile group of a non-IDR picture, the decoding process for reference picture lists construction specified in clause 8.3.2 of the standard is invoked for derivation of reference picture list 0 (RefPicList[0]) and reference picture list 1 (RefPicList[1]).

The decoding process for reference picture marking in clause 8.3.3 of the standard is invoked, wherein reference pictures may be marked as "unused for reference" or "used for long-term reference". This needs to be invoked only for the first tile group of a picture.

Decoding Process for Picture Order Count

Output of this process is PicOrderCntVal, the picture order count of the current picture.

Each coded picture is associated with a picture order count variable, denoted as PicOrderCntVal.

The decoded pictures may be read from the DCP 423 of the decoder 400 shown in FIG. 4, for example, and output according to the picture order count.

When the current picture is not a CDR picture, the variables prevPicOrderCntLsb and prevPicOrderCntMsb are derived as follows:
  Let prevTid0Pic be the previous picture in decoding order that has TemporalId equal to 0 and that is not a RASL or RADL picture.
  The variable prevPicOrderCntLsb is set equal to tile_group_pic_order_cnt_lsb of prevTid0Pic.
  The variable prevPicOrderCntMsb is set equal to PicOrderCntMsb of prevTid0Pic. The variable PicOrderCntMsb of the current picture is derived as follows:
  If the current picture is a CDR picture, PicOrderCntMsb is set equal to 0.
  Otherwise, if the current picture is a DDR picture, PicOrderCntMsb is set equal to that of the associated DIDR picture.
  Otherwise, PicOrderCntMsb is derived as follows:
    if((tile_group_pic_order_cnt_lsb<prevPicOrderCntLsb) && ((prevPicOrderCntLsb-tile_group_pic_order_cnt_lsb)>(MaxPicOrderCntLsb/2)))

PicOrderCntMsb=prevPicOrderCntMsb+MaxPicOrderCntLsb        (8-1)

else if((tile_group_pic_order_cnt_lsb>prevPicOrderCntLsb) && ((tile_group_pic_order_cnt_lsb-prevPicOrderCntLsb)>(MaxPicOrderCntLsb/2)))
      PicOrderCntMsb=prevPicOrderCntMsb-MaxPicOrderCntLsb
    else
      PicOrderCntMsb=prevPicOrderCntMsb
  PicOrderCntVal is derived as follows:

PicOrderCntVal=PicOrderCntMsb+tile_group_pic_order_cnt_lsb        (8-2)

NOTE 1—All CDR pictures will have PicOrderCntVal equal to tile_group_pic_order_cnt_lsb since for these pictures PicOrderCntMsb is set equal to 0.

The value of PicOrderCntVal shall be in the range of $-2^{31}$ to $2^{31}-1$, inclusive.

In one CVS, the PicOrderCntVal values for any two coded pictures that are not DIDR pictures shall not be the same, and the PicOrderCntVal values for any two coded DIDR pictures shall not be the same.

Decoding Process for Reference Picture Lists Construction

This process is invoked at the beginning of the decoding process for each tile group of picture that is not an IDR picture and not a DIDR picture.

STRPs are identified by their PicOrderCntVal values. LTRPs are identified by the Log 2(MaxLtPicOrderCntLsb) LSBs of their PicOrderCntVal values.

If the current picture is a CDR picture, or a DIDR picture, all reference pictures currently in the DPB (if any) excluding DIDR picture are marked as "unused for reference".

The motion compensation component 421 and the intra prediction component 417 of the decoder 400 shown in FIG. 4 may make use of the above-mentioned reference pictures for reconstructing pictures (picture blocks).

Detailed Description of Embodiment 3 of the Disclosure

This clause documents an embodiment of some of the aspects the disclosure as summarized above. The description is relative to the basis text, which is the latest VVC WD. Only the delta is described, while the texts in the basis text that are not mentioned below apply as they are. Updated text are marked with highlight.

Definitions access unit: A set of non-DIDR NAL units that are associated with each other according to a specified classification rule, are consecutive in decoding order, and contain exactly one coded picture.

clean decoder refresh (CDR): An IRAP access unit with NoIncorrectPicOutputFlag equal to 1 or DDR access unit with NoIncorrectPicOutputFlag equal to 1.

associated collocated picture (ACP): The coded picture collocated in temporal domain with DIDR picture which have the same POC value and could be a coded representation of the same picture.

clean decoder refresh (CDR): An IRAP access unit with NoIncorrectPicOutputFlag equal to 1.

clean random access (CRA) picture: An IRAP picture for which each VCL NAL unit has nal_unit_type equal to CRA_NUT.

NOTE—A CRA picture does not refer to any pictures other than itself for inter prediction in its decoding process, and may be the first picture in the bitstream in decoding order, or may appear later in the bitstream. A CRA picture may have associated RADL or RASL pictures. When a CRA picture has NoIncorrectPicOutputFlag equal to 1, the associated RASL pictures are not output by the decoder, because they may not be correctly decodable, as they may contain references to pictures that are not present in the bitstream.

coded picture: A coded representation of a picture containing all CTUs of the picture.

coded representation: A data element as represented in its coded form.

coded video sequence (CVS): A sequence of access units that consists, in decoding order, of a CDR access unit, followed by zero or more access units that are not CDR access unit, including all subsequent access units up to but not including any subsequent access unit that is a CDR access unit.

NOTE—An IRAP access unit may be an IDR access unit, a CRA access unit, or a DIDR access unit. The value of NoIncorrectPicOutputFlag is equal to 1 for each IDR access unit. The value of NoIncorrectPicOutputFlag is equal to 1 for each CRA access unit that is the first access unit in the bitstream in decoding order, is the first access unit that follows an end of sequence NAL unit in decoding order, or has HandleCraAsCvsStartFlag equal to 1. The value of NoIncorrectPicOutputFlag is equal to 1 for each DIDR access unit that is the first access unit in the bitstream in decoding order, is the first access unit that follows an end of sequence NAL unit in decoding order, or has HandleDdrAsCvsStartFlag equal to 1.

distributed instantaneous decoding refresh (DIDR) picture. A picture for which each VCL NAL unit has nal_unit_type equal to DIDR_NUT.

NOTE—A DIDR picture may be the first picture in the bitstream in decoding order, may be the first picture of a CVS in decoding order, and may appear elsewhere in the bitstream. A DIDR picture could have one associated collocated picture (ACP). A DIDR picture does not have any associated leading pictures. Each DIDR picture could be associated with one of the ACP in decoder order. An associated pair of DIDR picture and ACP picture could be a coded presentations of the same picture, and they could have the same value of picture order count. A DIDR picture is coded with intra prediction only and coded with at least two VCL NAL units. The VCL NAL units of a DIDR picture are distributed among a set of access units starting from the access unit containing the associated ACP picture, up to but not including any subsequent access unit that is an ACP access unit or an IRAP access unit. If POC difference between DIDR picture and first dependent inter-coded picture which uses DIDR picture as reference is larger then regular POC difference between inter-coded pictures then this DIDR picture is for inter prediction reference only and not for output.

DIDR access unit: A set of DIDR NAL units that are associated with each other according to a specified classification rule and contain exactly one coded picture.

random access skipped leading (RASL) picture: A coded picture for which each VCL NAL unit has nal_unit_type equal to RASL_NUT.

NOTE—All RASL pictures are leading pictures of an associated CRA picture. When the associated CRA picture has NoIncorrectPicOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated CRA picture.

Abbreviations

For the purposes of this Recommendation International Standard, the following abbreviations apply.

ACP Associated Collocated Picture
CRA Clean Random Access
CVS Coded Video Sequence
DIDR Distributed Instantaneous Decoding Refresh
IDR Instantaneous Decoding Refresh
IRAP Intra Random Access Point
RADL Random Access Decodable Leading (Picture)
RASL Random Access Skipped Leading (Picture)
STSA Step-wise Temporal Sub-layer Access Sequence Parameter Set RBSP Syntax

| | Descriptor |
|---|---|
| seq_parameter_set_rbsp( ) { | |
|   sps_max_sub_layers_minus1 | u (3) |
|   sps_reserved_zero_5bits | u (5) |
|   profile_tier_level( sps_max_sub_layers_minus1 ) | |
|   sps_didr_pics_present_flag | u (1) |

The above-listed functions of the high-level syntax can be read by a decoding process from the bitstream performed, for example, by a decoder 400 as shown in FIG. 4. In the following, NAL unit header semantics employed during encoding and decoding processing, for example, by an encoder 300 as shown in FIG. 3 and a decoder 400 as shown in FIG. 4 is described.

NAL Unit Header Semantics forbidden_zero_bit shall be equal to 0.

nal_unit_type specifies the type of RBSP data structure contained in the NAL unit as specified in Table 7-1.

NAL units that have nal_unit_type in the range of UNSPEC28 . . . UNSPEC31, inclusive, for which semantics are not specified, shall not affect the decoding process specified in this Specification.

NOTE 1—NAL unit types in the range of UNSPEC-28 . . . UNSPEC31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the decoding units of the bitstream (as specified in Annex C), decoders shall ignore (remove from the bitstream and discard) the contents of all NAL units that use reserved values of nal_unit_type.

NOTE 2—This requirement allows future definition of compatible extensions to this Specification.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded tile group of a non-STSA trailing picture tile_group_layer_rbsp ( ) | VCL |
| 1 | STSA_NUT | Coded tile group of an STSA picture tile_group_layer_rbsp ( ) | VCL |
| 2 | RASL_NUT | Coded tile group of a RASL picture tile_group_layer_rbsp ( ) | VCL |
| 3 | RADL_NUT | Coded tile group of a RADL picture tile_group_layer_rbsp ( ) | VCL |
| 4 . . . 7 | RSV_VCL_4 . . . RSV_VCL_7 | Reserved non-IRAP VCL NAL unit types | VCL |
| 8 | IDR_W_RADL | Coded tile group of an IDR picture tile_group_layer_rbsp ( ) | VCL |
| 9 | IDR_N_LP | Coded tile group of an IDR tile_group_layer_rbsp ( ) | VCL |
| 10 | CRA_NUT | Coded tile group of a CRA picture tile_group_layer_rbsp ( ) | VCL |
| 11 | DIDR_NUT | Coded tile group of a DIDR picture tile_group_layer_rbsp ( ) | VCL |
| 12 13 | RSV_IRAP_VCL12 RSV_IRAP_VCL13 | Reserved IRAP VCL NAL unit types | VCL |

There shall be no pictures present in the bitstream that precede a last VCL NAL unit of DIDR picture in output order and for which the VCL NAL units succeed the last VCL NAL unit of the DIDR picture in decoding order.

A DIDR picture shall have at least two VCL NAL units, and the VCL NAL units of a DIDR picture shall be included in at least two access units.

nuh_temporal_id_plus1 minus 1 specifies a temporal identifier for the NAL unit. The value of nuh_temporal_id_plus1 shall not be equal to 0.

The variable TemporalId is derived as follows:

$$TemporalId = nuh\_temporal\_id\_plus1 - 1 \qquad (7\text{-}1)$$

When nal_unit_type is in the range of IDR_W_RADL to RSV_IRAP_VCL13, inclusive, or equal to IDR_N_LP with didr_pic_flag equal to 1, TemporalId shall be equal to 0.

The value of TemporalId shall be the same for all VCL NAL units of an access unit. The value of TemporalId of a coded picture or an access unit is the value of the TemporalId of the VCL NAL units of the coded picture entirely included in the access unit.

Order of Access Units and Association to CVSs

A bitstream conforming to this Specification consists of one or more CVSs.

A CVS consists of one or more access units. The order of NAL units and coded pictures and their association to access units is described in clause 7.4.2.4.4 of the standard.

The first access unit of a CVS is a CDR access unit.

It is a requirement of bitstream conformance that, when present, the next access unit after an access unit that contains an end of sequence NAL unit or an end of bitstream NAL unit shall be an IRAP access unit.

The access unit containing the last VCL NAL unit of a DIDR picture didrA shall precede the first VCL NAL unit of next DIDR or IRAP access unit, when present, that succeeds the last VCL NAL unit of DIDR access unit containing the DIDR picture didrA.

Order of NAL Units and Coded Pictures and their Association to Access Units

This clause specifies the order of NAL units and coded pictures and their association to access units for CVSs that conform to one or more of the profiles specified above and that are decoded using the decoding process described above and specified in clauses 2 through 10 of the standard.

An access unit consists of one coded picture, zero or more VCL NAL units and zero or more non-VCL NAL units. The association of VCL NAL units to coded pictures is described in clause 7.4.2.4.5 of the standard.

The first access unit in the bitstream starts with the first NAL unit of the bitstream.

The bitstream may be provided by an encoder 300 after entropy coding 331 as illustrated in FIG. 3. The bitstream may be received by a decoder 400 for decoding including entropy decoding 433 as illustrated in FIG. 4.

Let firstNalUnit be the first VCL NAL unit of a coded picture other than a DIDR picture. When there is one or more VCL NAL units of an DIDR picture preceding first-NalUnit and there is no VCL NAL unit between the last of these VCL NAL units and firstNalUnit, let firstNalUnit be the first of these NAL units. The first of any of the following NAL units preceding firstNalUnit and succeeding the last VCL NAL unit preceding firstNalUnit, if any, specifies the start of a new access unit:

access unit delimiter NAL unit (when present),
SPS NAL unit (when present),
PPS NAL unit (when present),
Prefix SEI NAL unit (when present),
NAL units with nal_unit_type in the range of RSV_NVCL24 . . . RSV_NVCL25 (when present),
NAL units with nal_unit_type in the range of UNSPEC-28 . . . UNSPEC29 (when present).
  NOTE—The first NAL unit preceding firstNalUnit and succeeding the last VCL NAL unit preceding first-NalUnit, if any, can only be one of the above-listed NAL units.

When there is none of the above NAL units preceding firstNalUnit and succeeding the last VCL NAL preceding firstNalUnit, if any, firstNalUnit starts a new access unit.
  NOTE—The VCL NAL units of a DIDR picture must be included in at least two access units.

The order of the VCL NAL units and non-VCL NAL units within an access unit shall obey the following constraints:
  When an access unit delimiter NAL unit is present, it shall be the first NAL unit. There shall be at most one access unit delimiter NAL unit in any access unit.
  When any SPS NAL units, PPS NAL units, prefix SEI NAL units, NAL units with nal_unit_type in the range of RSV_NVCL24 . . . RSV_NVCL25, or NAL units with nal_unit_type in the range of UNSPEC28 . . . UNSPEC29 are present, they shall not follow the last VCL NAL unit of the access unit.
  NAL units having nal_unit_type equal to SUFFIX_SEI_NUT or in the range of RSV_NVCL26 . . . RSV_NVCL27, or in the range of UNSPEC30 . . . UNSPEC31 shall not precede the first VCL NAL unit of the access unit.
  When an end of sequence NAL unit is present, it shall be the last NAL unit among all NAL units within the access unit other than an end of bitstream NAL unit (when present).
  When an end of bitstream NAL unit is present, it shall be the last NAL unit in the access unit.
  When a VCL NAL unit of a DIDR picture is present, it shall precede the first VCL NAL unit of the coded picture entirely in the access unit.

Order of VCL NAL Units and Association to Coded Pictures

This clause specifies the order of VCL NAL units and association to coded pictures.

Each VCL NAL unit is part of a coded picture.

The order of the VCL NAL units within a coded picture is constrained as follows:
  Let tileGroupAddrA and tileGroupAddrB be the tile_group_address values of any two tile group NAL units A and B within the same coded picture. When tile-GroupAddrA is less than tileGroupAddrB, A shall precede B.

The above-described orders may be observed during coding by means of a CODEC system 200 illustrated in FIG. 2 and the encoder 300 illustrated in FIG. 3 and the decoder 400 illustrated in FIG. 4, respectively.

Sequence Parameter Set RBSP Semantics
  sps_max_sub_layers_minus1 plus 1 specifies the maximum number of temporal sub-layers that may be present in each CVS referring to the SPS. The value of sps_max_sub_layers_minus1 shall be in the range of 0 to 6, inclusive.
  sps_reserved_zero_5bits shall be equal to 0 in bitstreams conforming to this version of this Specification. Other values for sps_reserved_zero_5bits are reserved for future use by ITU-T|ISO/IEC.
  sps_didr_pics_present_flag equal to 1 specifies that there may be DIDR pictures present in the CVS. sps_didr_pics_present_flag equal to 0 specifies that there is no DIDR picture present in the CVS.

The above-described semantics may be observed during coding by means of a CODEC system 200 illustrated in FIG. 2 and the encoder 300 illustrated in FIG. 3 and the decoder 400 illustrated in FIG. 4, respectively.

General Decoding Process (General)

Input to this process is a bitstream. Output of this process is a list of decoded pictures.

The bitstream may be provided by an encoder 300 after entropy coding 331 as illustrated in FIG. 3. The bitstream may be received by a decoder 400 for decoding including an entropy decoding component 433 as well as an inverse transform and quantization component 429 for reconstructing residual blocks as illustrated in FIG. 4. Reconstructed residual blocks and/or prediction blocks may be supplied to an intra-picture prediction component 417 for reconstruction of image blocks based on intra-prediction operations. Alternatively, a motion compensation component 421 employs motion vectors from a reference block to generate a prediction block and applies a residual block to the result to reconstruct an image block.

The decoding process is specified such that all decoders that conform to a specified profile and level will produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements of this Specification. The output pictures may be obtained from a Decoded Picture Buffer, DCP, for example the DCP 423 of the decoder 400 shown in FIG. 4. According to the example shown in FIG. 4 the DCP 423 buffers decoded pictures that were processed by some in-loop filters 425, for example, in order to remove block artifacts. The in-loop filters 424 may comprise the in-loop filter 900 comprising a noise suppression filter 941, a deblocking filter 943, a sample adaptive offset (SAO) filter 945, and an adaptive loop filter 947 as illustrated in FIG. 9.

For each IRAP picture in the bitstream, the following applies:
  If the picture is an IDR picture, the first picture in the bitstream in decoding order, or the first picture that follows an end of sequence NAL unit in decoding order, the variable NoIncorrectPicOutputFlag is set equal to 1.
  Otherwise, if some external means not specified in this Specification is available to set the variable HandleCraAsCvsStartFlag to a value for the picture, HandleCraAsCvsStartFlag is set equal to the value provided by the external means and NoIncorrectPicOutputFlag is set equal to HandleCraAsCvsStartFlag.
  Otherwise, HandleCraAsCvsStartFlag and NoIncorrectPicOutputFlag are both set equal to 0.

For each DIDR picture in the bitstream, the following applies:
  If the access unit containing the picture is the first access unit in the bitstream in decoding order, or the first access unit that follows an end of sequence NAL unit in decoding order, the variable NoIncorrectPicOutputFlag is set equal to 1.
    NOTE—When splicing two bitstreams together where the second bitstream starts with a DIDR access unit, the bitstream splicer needs to make sure that there is an end of sequence NAL unit or an end of bitstream NAL unit immediately preceding the DIDR access unit in the splicing result.
  Otherwise, if some external means not specified in this Specification is available to set the variable HandleDidrAsCvsStartFlag to a value for the picture, HandleDidrAsCvsStartFlag is set equal to the value provided by the external means and NoIncorrectPicOutputFlag is set equal to HandleDidrAsCvsStartFlag.
  Otherwise, the variables HandleDidrAsCvsStartFlag and NoIncorrectPicOutputFlag are both set equal to 0.
    NOTE 2—The above operations, for IRAP pictures, are needed to identify the CVSs in the bitstream.

For each CVS in the bitstream, the variable HighestTid, which identifies the highest temporal sub-layer to be decoded, is specified as follows:
  If some external means, not specified in this Specification, is available to set HighestTid, HighestTid is set by the external means.
  Otherwise, HighestTid is set equal to sps_max_sub_layers_minus1.

For each CVS in the bitstream, the sub-bitstream extraction process as specified in clause 10 of the standard is applied with the CVS and HighestTid as inputs, and the output is assigned to a bitstream referred to as CvsToDecode. After that, the instances of CvsToDecode of all the CVSs are concatenated, in decoding order, and the result is assigned to the bitsream BitstreamToDecode.

Clause 8.1.2 of the standard is repeatedly invoked for each CVS in BitstreamToDecode in decoding order.

Decoding Process for a Coded Picture

The decoding processes specified in this clause apply to each coded picture, referred to as the current picture and denoted by the variable CurrPic, in BitstreamToDecode. This decoding process can be performed, for example, by the decoder 400 illustrated in FIG. 4 or the video decoder 30 of the video coding system 40 shown in FIG. 1B.

A DIDR picture is decoded before the decoding of the coded picture entirely in the access unit auA that also contains the last VCL NAL unit of the DIDR picture and after the decoding of the coded picture entirely in the access unit immediately preceding auA in decoding order.

The decoding process operates as follows for the current picture CurrPic:
  1. The decoding of NAL units is specified in clause 8.2 of the standard.
  2. The processes in clause 8.3 of the standard specify the following decoding processes using syntax elements in the tile group header layer and above:
    Variables and functions relating to picture order count are derived as specified in clause 8.3.1 of the standard. This needs to be invoked only for the first tile group of a picture.
    PicOutputFlag is set as follows:
      If the current picture is a RASL picture and NoIncorrectPicOutputFlag of the associated CRA picture is equal to 1, PicOutputFlag is set equal to 0.
      Otherwise, if the current picture is a DIDR picture, PicOutputFlag is set equal to 0.
      Otherwise, if the current picture succeeds a first VCL NAL unit of DIDR picture associated with picA with NoIncorrectPicOutputFlag equal to 1 in decoding order and precedes the access unit containing the last VCL NAL unit of the DIDR picture associated with picA, PicOutputFlag is set equal to 0.
      Otherwise, PicOutputFlag is set equal to 1.
    At the beginning of the decoding process for each tile group of a non-IDR picture, the decoding process for reference picture lists construction specified in clause 8.3.2 of the standard is invoked for derivation of reference picture list 0 (RefPicList[0]) and reference picture list 1 (RefPicList[1]).
    The decoding process for reference picture marking in clause 8.3.3 of the standard is invoked, wherein reference pictures may be marked as "unused for reference" or "used for long-term reference". This needs to be invoked only for the first tile group of a picture.

Decoding Process for Picture Order Count

Output of this process is PicOrderCntVal, the picture order count of the current picture.

Each coded picture is associated with a picture order count variable, denoted as PicOrderCntVal.

The decoded pictures may be read from the DCP 423 of the decoder 400 shown in FIG. 4, for example, and output according to the picture order count.

When the current picture is not a CDR picture, the variables prevPicOrderCntLsb and prevPicOrderCntMsb are derived as follows:
  Let prevTid0Pic be the previous picture in decoding order that has TemporalId equal to 0 and that is not a RASL or RADL picture.
  The variable prevPicOrderCntLsb is set equal to tile_group_pic_order_cnt_lsb of prevTid0Pic.

The variable prevPicOrderCntMsb is set equal to PicOrderCntMsb of prevTid0Pic. The variable PicOrderCntMsb of the current picture is derived as follows:
If the current picture is a CDR picture, PicOrderCntMsb is set equal to 0.
Otherwise, PicOrderCntMsb is derived as follows:
    if((tile_group_pic_order_cnt_lsb<prevPicOrderCntLsb) && ((prevPicOrderCntLsb−tile_group_pic_order_ cnt_lsb)>(MaxPicOrderCntLsb/2)))

PicOrderCntMsb=prevPicOrderCntMsb+MaxPicOrderCntLsb     (8-1)

else
        if((tile_group_pic_order_cnt_lsb>prevPicOrderCntLsb) && ((tile_group_pic_order_cnt_lsb−prevPicOrderCntLsb)>(MaxPicOrderCntLsb/2)))
        PicOrderCntMsb=prevPicOrderCntMsb−MaxPicOrderCntLsb
    else
        PicOrderCntMsb=prevPicOrderCntMsb
PicOrderCntVal is derived as follows:

PicOrderCntVal=PicOrderCntMsb+tile_group_pic_order_cnt_lsb     (8-2)

NOTE 1—All CDR pictures will have PicOrderCntVal equal to tile_group_pic_order_cnt_lsb since for these pictures PicOrderCntMsb is set equal to 0. The value of PicOrderCntVal shall be in the range of $-2^{31}$ to $2^{31}-1$, inclusive. In one CVS, the PicOrderCntVal values for any two coded pictures that are not DIDR pictures shall not be the same, and the PicOrderCntVal values for any two coded DIDR pictures which contain the coded representation of different pictures shall not be the same.
Decoding Process for Reference Picture Lists Construction
This process is invoked at the beginning of the decoding process for each tile group of picture that is not an IDR picture and not a DIDR picture.
It is a requirement of bitstream conformance that for each current picture that is not a CDR picture, the value of maxPicOrderCnt−minPicOrderCnt shall be less than MaxPicOrderCntLsb/2.
Decoding Process for Reference Picture Marking
If the current picture is a CDR picture, all reference pictures currently in the DPB (if any) are marked as "unused for reference".
The motion compensation component 421 and the intra prediction component 417 of the decoder 400 shown in FIG. 4 may make use of the above-mentioned reference pictures for reconstructing pictures (picture blocks).

Detailed Description of Embodiment 4 of the Disclosure

This clause documents an embodiment of some of the aspects the disclosure as summarized above. The description is relative to the embodiment 1, 2 and 3. Only the delta is described, while the texts in the basis text that are not mentioned below apply as they are. Updated text are marked with highlight.
Sequence Parameter Set RRSP Syntax

| | Descriptor |
| --- | --- |
| seq_parameter_set_rbsp( ) { | |
|   sps_max_sub_layers_minus1 | u (3) |
|   sps_didr_pics_present_flag | u (1) |
|   sps_reserved_zero_4bits | u (4) |
|   profile_tier_level( sps_max_sub_layers_minus1 ) | |
|   sps_seq_parameter_set_id | ue (v) |

The above-listed functions of the high-level syntax can be read by a decoding process from the bitstream performed, for example, by a decoder 400 as shown in FIG. 4.

What is claimed is:

1. A method of video encoding a sequence of pictures, the method being implemented in an encoding device and comprising:
obtaining an intra prediction picture comprising at least two sub-units, wherein the at least two sub-units of the intra prediction picture are video coding layer network abstraction layer (VCL NAL) units;
obtaining a first encoded other picture, wherein the first encoded other picture is an inter-coded random access picture, wherein the intra prediction picture and the inter-coded random access picture have a same Picture Order Count (POC) value;
obtaining one or more encoded other pictures different from the intra prediction picture and the first encoded other picture; and
distributing the at least two sub-units of the intra prediction picture over one or more sub-units of the one or more encoded other pictures and/or over one or more sub-units of the first encoded other picture.

2. A method of video decoding a sequence of encoded pictures, the method being implemented in a decoding device and comprising:
decoding an intra prediction picture comprising at least two sub-units, wherein the at least two sub-units of the intra prediction picture are video coding layer network abstraction layer (VCL NAL) units; and
decoding a first encoded other picture, wherein the first encoded other picture is an inter-coded random access picture, wherein the intra prediction picture and the inter-coded random access picture have a same Picture Order Count (POC) value;
wherein the at least two sub-units of the intra prediction picture are distributed over one or more sub-units of one or more encoded other pictures comprised in the sequence of encoded pictures and different from the intra prediction picture and the first encoded other picture and/or the at least two sub-units of the intra prediction picture are distributed over one or more sub-units of the first encoded other picture.

3. The method according to claim 2, wherein the decoded intra prediction picture is not provided for output.

4. The method according to claim 1, further comprising using a decoded version of the intra prediction picture as a reference picture for inter prediction encoding.

5. The method according to claim 2, further comprising using the decoded intra prediction picture as a reference picture for inter prediction decoding.

6. The method according to claim 2, further comprising
receiving a last one of the at least two sub-units of the intra prediction picture by a decoding device;
not using any of one or more reference pictures stored in a Decoded Picture Buffer (DPB) as reference pictures;
setting a Most Significant Bit (MSB) of the POC of the intra prediction picture to zero;
not outputting the intra prediction picture; and
decoding the intra prediction picture only after all of the at least two sub-units of the intra prediction picture are obtained by the decoder.

7. The method according to claim 2, further comprising decoding an access unit comprising a last one of the at least two sub-units of the intra prediction picture before decoding the entire intra prediction picture.

8. The method according to claim 2, further comprising splicing a bitstream starting with the first encoded other picture to an end of another bitstream.

9. The method according to claim 2, further comprising outputting the decoded inter-coded random access picture without outputting the decoded intra prediction picture.

10. The method according to claim 1, further comprising performing a sub-bit stream extraction process comprising determining whether an access unit comprising at least one of the at least two sub-units of the intra prediction picture has an identifier (ID) larger than a threshold defining a target set of access units and, if it is determined that the access unit has an ID larger than the threshold, redistributing the at least one of the at least two sub-units over access units with an ID less than or equal to the threshold.

11. The method according to claim 1, further comprising:
signaling a flag in a sequence level parameter set indicating whether or not the intra prediction picture and/or first encoded other picture is to be coded; and
signaling a second flag indicating that an Instantaneous Decoding Refresh picture without leading pictures (IDR_No_LP picture) is the intra prediction picture,
wherein the second flag is signaled in a Tile Group header of the IDR_No_LP picture.

12. The method according to claim 2, wherein the at least two sub-units of the intra prediction picture are Network Abstraction Layer (NAL) units.

13. The method according to claim 12, wherein the at least two NAL units of the intra prediction picture are Video Coding Layer (VCL) NAL units.

14. The method according to claim 2, wherein the intra prediction picture and the first encoded other picture are associated with each other.

15. The method according to claim 2, wherein the intra prediction picture and the first encoded other picture represent the same picture of the sequence of encoded pictures.

16. The method according to claim 2, wherein the one or more encoded other pictures are inter prediction pictures.

17. The method according to claim 2, wherein the first encoded other picture or the intra prediction picture is the first picture in a bitstream comprising the sequence of encoded pictures or the first picture of a Coded Video Sequence (CVS) comprising the sequence of encoded pictures in a decoding order.

18. An encoder, comprising:
one or more processors; and
a non-transitory computer-readable storage medium coupled to the one or more processors and storing programming for execution by the one or more processors, wherein the programming, when executed by the one or more processors, configures the encoder to carry out the method according to claim 1.

19. A decoder, comprising:
one or more processors; and
a non-transitory computer-readable storage medium coupled to the one or more processors and storing programming for execution by the one or more processors, wherein the programming, when executed by the one or more processors, configures the decoder to carry out the method according to claim 2.

20. A non-transitory computer-readable storage medium storing programming for execution by a processor, wherein the programming, when executed by the processor, configures the processor to carry out the method according to claim 2.

* * * * *

UNITED STATES PATENT AND TRADEMARK OFFICE
CERTIFICATE OF CORRECTION

| | | |
|---|---|---|
| PATENT NO. | : 12,069,250 B2 | Page 1 of 1 |
| APPLICATION NO. | : 17/472262 | |
| DATED | : August 20, 2024 | |
| INVENTOR(S) | : Sychev et al. | |

It is certified that error appears in the above-identified patent and that said Letters Patent is hereby corrected as shown below:

On the Title Page

Item (54) and in the Specification, Column 1, Lines 1-2, Title: "DISTRIBUTED DECODING REFRESH IN VIDEO CODING" should read -- DESIGN FOR DISTRIBUTED DECODING REFRESH IN VIDEO CODING --.

Signed and Sealed this
Sixth Day of May, 2025

Coke Morgan Stewart
*Acting Director of the United States Patent and Trademark Office*